United States Patent
Shikama et al.

(10) Patent No.: US 11,036,015 B2
(45) Date of Patent: Jun. 15, 2021

(54) CONNECTION STRUCTURE OF OPTICAL WAVEGUIDE CHIPS

(71) Applicant: NIPPON TELEGRAPH AND TELEPHONE CORPORATION, Tokyo (JP)

(72) Inventors: Kota Shikama, Tokyo (JP); Hiroshi Ishikawa, Tokyo (JP); Yuko Kawajiri, Tokyo (JP); Atsushi Aratake, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/619,911

(22) PCT Filed: Jun. 7, 2018

(86) PCT No.: PCT/JP2018/021854
§ 371 (c)(1),
(2) Date: Dec. 5, 2019

(87) PCT Pub. No.: WO2018/225820
PCT Pub. Date: Dec. 13, 2018

(65) Prior Publication Data
US 2020/0209477 A1    Jul. 2, 2020

(30) Foreign Application Priority Data

Jun. 7, 2017  (JP) .............................. JP2017-112436
Jun. 15, 2017 (JP) .............................. JP2017-117442
(Continued)

(51) Int. Cl.
G02B 6/36      (2006.01)
G02B 6/42      (2006.01)
(Continued)

(52) U.S. Cl.
CPC ............. *G02B 6/4231* (2013.01); *G02B 6/24* (2013.01); *G02B 6/36* (2013.01); *G02B 6/3636* (2013.01);
(Continued)

(58) Field of Classification Search
CPC .................................................... G02B 6/4231
See application file for complete search history.

(56) References Cited

U.S. PATENT DOCUMENTS 5,257,332 A * 10/1993 Pimpinella ............... G02B 6/32
                                                               385/33
5,611,014 A    3/1997  Basavanhally
(Continued)

FOREIGN PATENT DOCUMENTS

CN      1517729 A    8/2004
CN      2927081      7/2007
(Continued)

OTHER PUBLICATIONS

Office Action received for Chinese Patent Application No. 201880037946.1, dated Jul. 16, 2020, 19 pages (13 pages of English Translation and 6 pages of Office Action).
(Continued)

*Primary Examiner* — Michelle R Connelly
(74) *Attorney, Agent, or Firm* — Womble Bond Dickinson (US) LLP

(57) ABSTRACT

A connection structure of optical waveguide chips includes a base substrate (2003) in which grooves (2013) are formed, spacer optical fibers (2006) each disposed for a corresponding one of the grooves (2013) and fitted in the groove (2013) while partially projecting from the base substrate (2003), and silica-based PLCs (2001, 2002) that are a plurality of optical waveguide chips in each of which grooves (2007) fitted on the projecting portions of the spacer optical fibers
(Continued)

(2006) are formed at positions of an optical waveguide layer (2008) facing the grooves (2013), and each of which is mounted on the base substrate (2003) while being supported by the spacer optical fibers (2006). The silica-based PLCs (2001, 2002) are mounted on the base substrate (2003) such that incident/exit end faces of the optical waveguide layers (2008) face each other.

6 Claims, 45 Drawing Sheets

(30) Foreign Application Priority Data

Jun. 19, 2017 (JP) .............................. JP2017-119304
Nov. 29, 2017 (JP) .............................. JP2017-228660

(51) Int. Cl.
  *G02B 6/24* (2006.01)
  *G02B 6/125* (2006.01)
  *G02B 6/26* (2006.01)
  *G02B 6/12* (2006.01)

(52) U.S. Cl.
  CPC ......... *G02B 6/3648* (2013.01); *G02B 6/4219* (2013.01); *G02B 6/125* (2013.01); *G02B 6/12019* (2013.01); *G02B 6/26* (2013.01)

(56) References Cited

U.S. PATENT DOCUMENTS

| | | | | |
|---|---|---|---|---|
| 5,703,973 A * | 12/1997 | Mettler | .................... | G02B 6/30 |
| | | | | 385/14 |
| 5,909,524 A * | 6/1999 | Tabuchi | .................. | G02B 6/423 |
| | | | | 385/14 |
| 6,118,917 A * | 9/2000 | Lee | .......................... | G02B 6/30 |
| | | | | 385/49 |
| 6,160,936 A * | 12/2000 | You | .......................... | G02B 6/30 |
| | | | | 385/49 |
| 6,250,819 B1 * | 6/2001 | Porte | ................... | G02B 6/4224 |
| | | | | 385/130 |
| 6,621,961 B2 * | 9/2003 | Alibert | .................. | G02B 6/423 |
| | | | | 385/130 |
| 6,647,184 B2 * | 11/2003 | Ukechi | .............. | G02B 6/29368 |
| | | | | 385/45 |
| 6,826,324 B2 * | 11/2004 | Steinberg | ............. | G02B 6/3502 |
| | | | | 385/15 |
| 6,842,552 B1 * | 1/2005 | Steinberg | ............. | G02B 6/3506 |
| | | | | 385/15 |
| 6,853,764 B2 * | 2/2005 | Heiks | ................... | G02B 6/3506 |
| | | | | 385/18 |
| 6,973,253 B2 * | 12/2005 | Steinberg | ............... | G02B 6/266 |
| | | | | 385/140 |
| 9,575,267 B1 * | 2/2017 | Shastri | ................. | G02B 6/4243 |
| 2002/0164128 A1 | 11/2002 | Nekado et al. | | |

FOREIGN PATENT DOCUMENTS

| | | |
|---|---|---|
| CN | 202771066 | 3/2013 |
| CN | 205643770 U | 10/2016 |
| JP | 04-216509 A | 8/1992 |
| JP | 09-090161 | 4/1997 |
| JP | 2001-264573 A | 9/2001 |
| JP | 2002-277658 A | 9/2002 |
| JP | 2002-357731 A | 12/2002 |
| JP | 2007-316335 A | 12/2007 |
| JP | 2008-216905 A | 9/2008 |
| JP | 2009-139474 A | 6/2009 |
| JP | 2017-032950 A | 2/2017 |
| WO | 86/02172 A1 | 4/1986 |

OTHER PUBLICATIONS

International Preliminary Report on Patentability received for PCT Patent Application No. PCT/JP2018/021854, dated Dec. 19, 2019, 15 pages (9 pages of English Translation and 6 pages of Original Document).
International Search Report and Written Opinion received for PCT Patent Application No. PCT/JP2018/021854, dated Sep. 11, 2018, 17 pages (9 pages of English Translation and 8 pages of Original Document).
Office Action received for Japanese Patent Application No. 2019-523969, dated Jun. 30, 2020, 8 pages (4 pages of English Translation and 4 pages of Office Action).

* cited by examiner

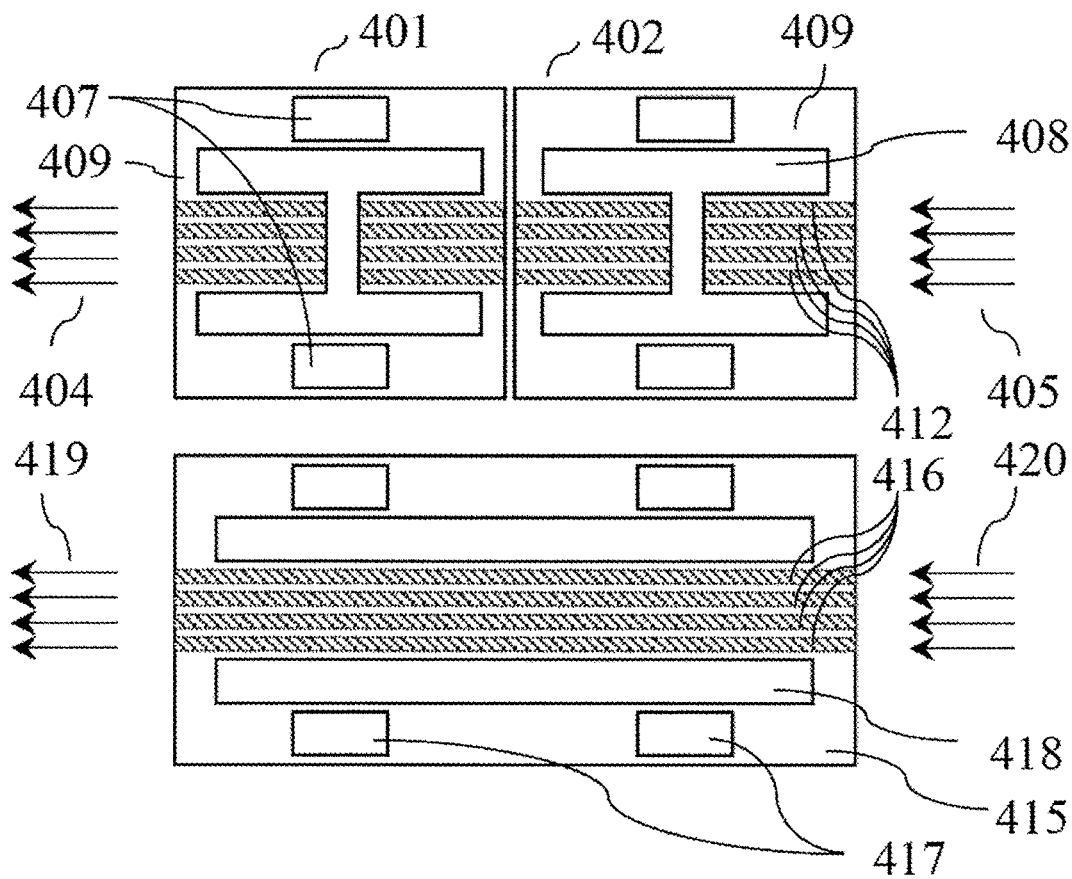
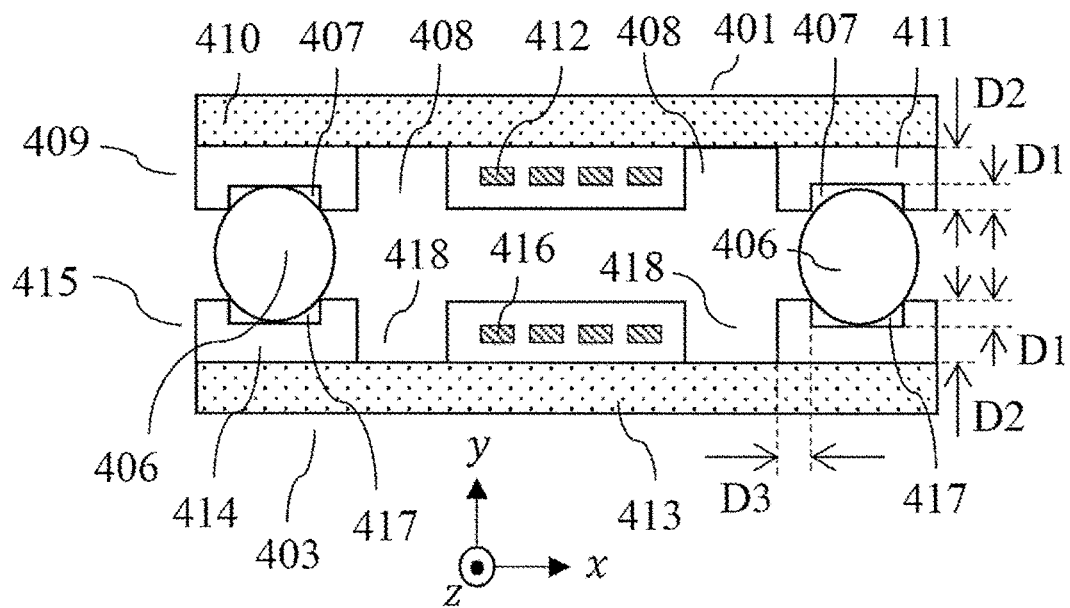

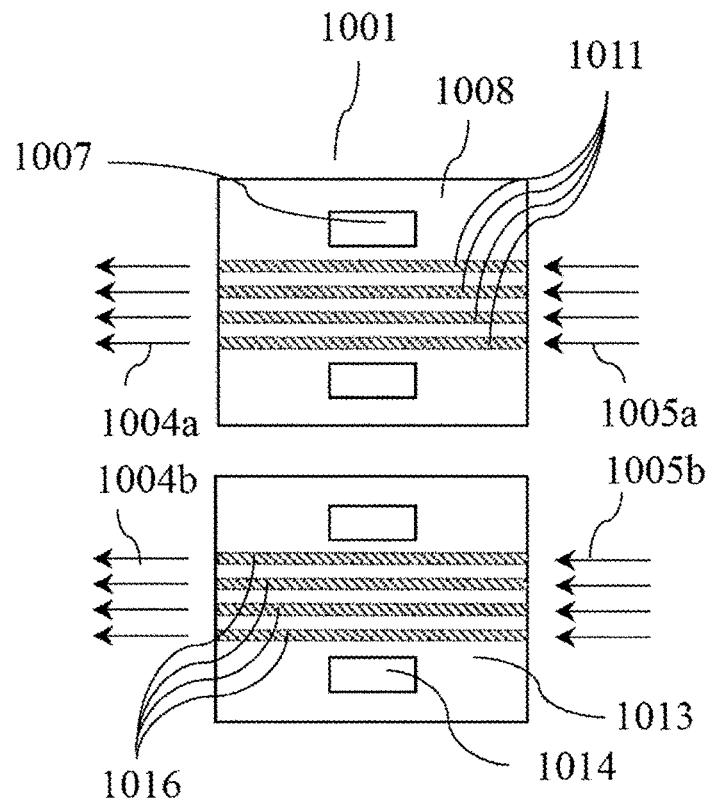
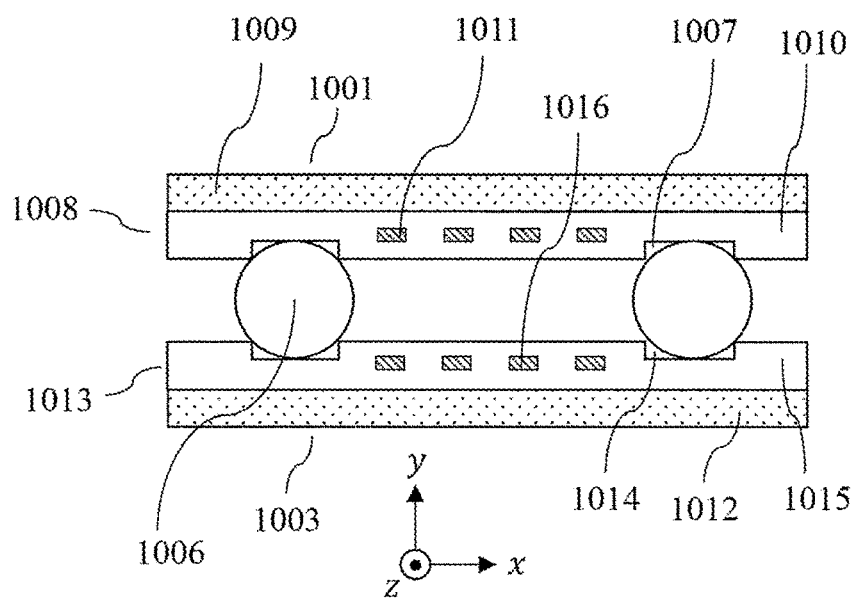

CONNECTION STRUCTURE OF OPTICAL WAVEGUIDE CHIPS

TECHNICAL FIELD

The present invention relates to a connection structure of optical waveguide chips used in a technical field that needs processing of an optical signal, such as optical communication or optical sensing.

BACKGROUND ART

Along with the development of optical communication networks, improvement of the integration properties of an optical communication device, that is, size reduction of an optical device is intensely demanded. In an optical circuit used as an optical communication device, conventionally, a planar lightwave circuit (PLC) using a silica glass based material is widely used. The PLC is applied to a variety of functional elements for optical communication such as a splitter, a wavelength multiplexer/demultiplexer, an optical switch, and a polarization control element because it is excellent in coupling with an optical fiber and is also reliable as a material.

In recent years, to cope with the above-described size reduction of an optical circuit, research on an optical circuit of high refractive index difference has progressed, in which the refractive index of a core is increased, and the refractive index difference between the core and a clad is increased, thereby designing a small minimum bending radius. In addition, for the last decade, using a silicon process required for an electronic component and the like, a silicon photonics technology using a silicon-based material with strong light confinement has progressed, and an optical circuit smaller than a glass-based circuit is implemented.

Also, as an optical modulation element, an optical circuit using a ferroelectric material represented by lithium niobate (N) or the like is also widely used. Furthermore, a periodically poled lithium niobate (PPLN) element using the same material is used as a wavelength conversion element or an optical amplification element. As a light-emitting element, a light-receiving element, or an optical modulation element, III-V semiconductors represented by indium phosphide (InP) and gallium arsenide (GaAs) have been put into practical use. A light-emitting element, a light-receiving element, or an optical modulation element such as an optical waveguide integrated laser formed by combining a light propagation mechanism with these materials is also widely applied. As for waveguides using these ferroelectric or semiconductor materials as well, since the refractive index is higher than that of glass, strong light confinement is possible, and size reduction of the circuit can be expected.

The optical functional element, the optical modulation element, the light-emitting element, the light-receiving element, the wavelength conversion element, and the optical amplification element described above will be referred to together as an optical waveguide chip hereinafter. As for the optical waveguide chip, there have been made various applications using light, such as an optical communication network, a photosensor, and a light source for a display. Additionally, in recent years, diversification of demanded functions, high functionalization, and the like have progressed, and a high-function/multi-function circuit that combines the above-described optical functions is demanded. To do this, a plurality of optical waveguide chips are often assembled to form a multi-chip device, instead of forming all devices using identical optical waveguide chips. In this case, it is necessary to optically connect light beams propagating in the above-described optical waveguide chips.

In a single mode waveguide used in a communication application or the like, a loss caused by connection is required to be as small as possible. When connecting two waveguides, in general, they need to be aligned to each other at a submicron position accuracy. When connecting optical waveguide chips, as disclosed in patent literature 1, it is necessary to optimize the positions of the two optical waveguide chips by inputting light to one optical waveguide chip using an optical fiber, receiving light on the output side of the other optical waveguide chip by an optical fiber, a large-diameter photodiode, or the like, and performing active alignment mounting such that the intensity of the output light is maximized.

In a case of a light-emitting element or a light-receiving element, the optical waveguide chip includes at least one connection end face. In a case of other elements, the optical waveguide chip includes at least one connection end face that inputs/outputs light. Hence, when performing the above-described active alignment mounting, as described above, the end face position of one optical waveguide chip needs to be aligned on six axes (a total of six axes including three, X-, Y-, and Z-axes and rotations $\theta x$, $\theta y$, and $\theta x$ about the X-, Y-, and Z-axes), and similarly, the end face position of the other optical waveguide chip also needs to be aligned on the six axes. For this reason, when aligning optical waveguide chips, as a result, it is necessary to perform alignment on $6 \times 6 = 36$ axes at maximum at a submicron accuracy. Furthermore, after the alignment, a cumbersome process of, for example, adhering and fixing the optical waveguide chips by filling the gap between them with an adhesive is needed.

Additionally, to perform active alignment mounting, an optical fiber array component or the like needs to be permanently fixed on an end face of each optical waveguide chip other than the above-described connection end face. Hence, there is large restrictions in mounting. Even in a case in which no optical fiber array is fixed on each optical waveguide chip, alignment of the optical waveguide chips can be performed by active alignment mounting. In this case, however, since an optical fiber needs to be temporarily connected, by active alignment, to an end face of each optical waveguide chip other than the above-described connection end face, axes of alignment increase for the temporary connection, and a more cumbersome process is needed.

If optical waveguide chips can be aligned only by the mechanical accuracy of members and the like without using a cumbersome process as described above and without inputting/outputting light, mounting can largely be simplified. This mounting method is called passive alignment. In the passive alignment mounting, however, achieving a submicron accuracy only by the mechanical accuracy is a great challenge, and the connection loss becomes large.

On the other hand, as a method of simultaneously implementing size reduction and easy stacking in the optical signal processing technique of an optical switch or the like, a method as disclosed in patent literature 2 has been proposed. In the structure disclosed in patent literature 2, a structure capable of accurately stacking optical waveguide chips (silica-based PLCs) using passive mounting can be implemented.

FIGS. 35A to 35D are schematic views showing the stacked structure of optical waveguide chips described in patent literature 2. FIG. 35A is a perspective view of the stacked structure of the optical waveguide chip, FIG. 35B is an exploded view of parts of the stacked structure, FIG. 35C is a view showing the joint surfaces of a silica-based PLC and a silica-based flat plate, and FIG. 35D is a sectional view of the stacked structure taken along an xy plane. In FIGS. 35A to 35D, a total of four members, that is, a silica-based PLC 1001 that is an optical waveguide chip formed by a silica-based glass layer including an Si substrate and a waveguide layer, a silica-based PLC 1003 that is also an optical waveguide chip, and two spacer optical fibers 1006 (spacer members) are combined, thereby forming a stacked structure. Accordingly, for an application purpose such as signal processing, when the silica-based PLC is used as a light input/output front end, light beam input/output ports for a space system can be increased even two-dimensionally, including the substrate direction, and optical signal processing of larger scale can be implemented.

The stacked structure shown in FIGS. 35A to 35D arms at outputting input optical signals 1005$a$ and 1005$b$ input from fibers or the like as output optical signals 1004$a$ and 1004$b$ as space beams via the silica-based PLCs 1001 and 1003 in which functional elements are integrated. As shown in FIGS. 35A and 35B, the silica-based PLC 1001 is mounted on the silica-based PLC 1003.

As shown in FIG. 35D, the silica-based PLC 1001 has a structure in which an optical waveguide layer 1008 is formed on an Si substrate 1009. The optical waveguide layer 1008 is formed by a clad layer 1010 made of $SiO_2$, and cores 1011 formed in the clad layer 1010. In addition, fitting grooves 1007 are formed in the clad layer 1010.

Similarly, the silica-based PLC 1003 has a structure in which an optical waveguide layer 1013 is formed on an Si substrate 1012. The optical waveguide layer 1013 is formed by a clad layer 1015 made of $SiO_2$, and cores 1016 formed in the clad layer 1015. In the clad layer 1015, fitting grooves 1014 are formed at positions facing the fitting grooves 1007 of the silica-based PLC 1001 when mounting the silica-based PLC 1001 on the silica-based PLC 1003.

As shown in FIGS. 35B and 35C, the silica-based PLC 1001 is stacked and fixed on the silica-based PLC 1003 while placing, between them, the spacer optical fibers 1006 that are fitted in the fitting grooves 1014 on the side of the silica-based PLC 1003 and the fitting grooves 1007 on the side of the silica-based PLC 1001.

With the above-described structure, it is possible to accurately align the relative positions of the output cores of the silica-based PLC 1001 and the silica-based PLC 1003 by passive alignment mounting only by the mechanical accuracy of members and the like.

In the stacked structure disclosed in patent literature 2, however, although the two optical waveguide chips (silica-based PLCs 1001 and 1003) can accurately be aligned, it is impossible to implement easy and accurate end face connection between the optical waveguide chips by passive alignment mounting.

RELATED ART LITERATURE

Patent Literature

Patent Literature 1: Japanese Patent Laid-Open No. 9-90161
Patent Literature 2: Japanese Patent Laid-Open No. 2017-32950

DISCLOSURE OF INVENTION

Problem to be Solved by the Invention

The present invention has been made to solve the above-described problem, and has as its object to provide a connection structure of optical waveguide chips, which can easily and accurately implement end face connection between optical waveguide chips by passive alignment mounting.

Means of Solution to the Problem

According to the present invention, there is provided a connection structure of optical waveguide chips, comprising a base substrate in which a plurality of first grooves are formed, a plurality of first spacer members respectively fitted in the plurality of first grooves while partially projecting from the base substrate, and a plurality of optical waveguide chips in each of which an optical waveguide layer is formed on a substrate, and second grooves fitted on the projecting portions of the first spacer members are formed at positions of the optical waveguide layer facing the first grooves, and each of which is mounted on the base substrate while being supported by the first spacer members, wherein the plurality of optical waveguide chips are mounted on the base substrate such that incident/exit end faces of optical waveguide layers of two adjacent optical waveguide chips face each other.

Effect of the Invention

According to the present invention, it is possible to easily and accurately implement end face connection between optical waveguide chips by passive alignment mounting, and it is possible to easily provide a multi-chip device. Additionally, in the present invention, since it is unnecessary to fix the optical waveguide chip to a base substrate by an adhesive or the like, it is possible to implement pluggable optical connection capable of connecting a necessary optical waveguide chip only when necessary, and it is possible to eliminate various restrictions in application from the viewpoint of mounting.

BRIEF DESCRIPTION OF DRAWINGS

FIGS. 19A to 19D are schematic views showing a connection structure of optical waveguide chips according to the 13th embodiment of the present invention;

FIGS. 35A to 35D are schematic views showing the conventional stacked structure of optical waveguide chips.

BEST MODE FOR CARRYING OUT THE INVENTION

The embodiments of the present invention will now be described in detail with reference to the accompanying drawings.

First Embodiment

Figure 1A:
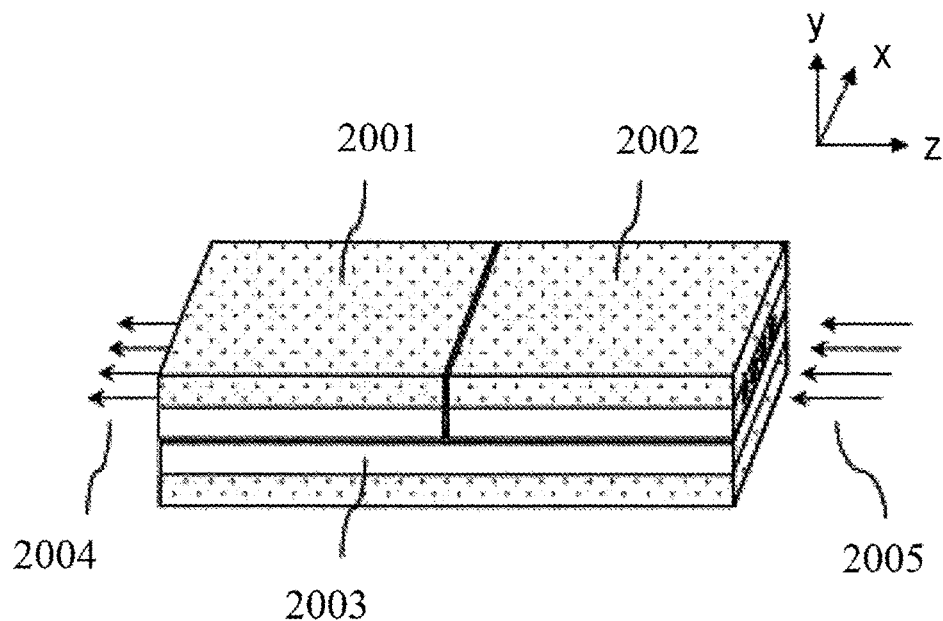
FIGS. 1A to 1D are schematic views showing a connection structure of optical waveguide chips according to the first embodiment of the present invention.
Figure 1B:
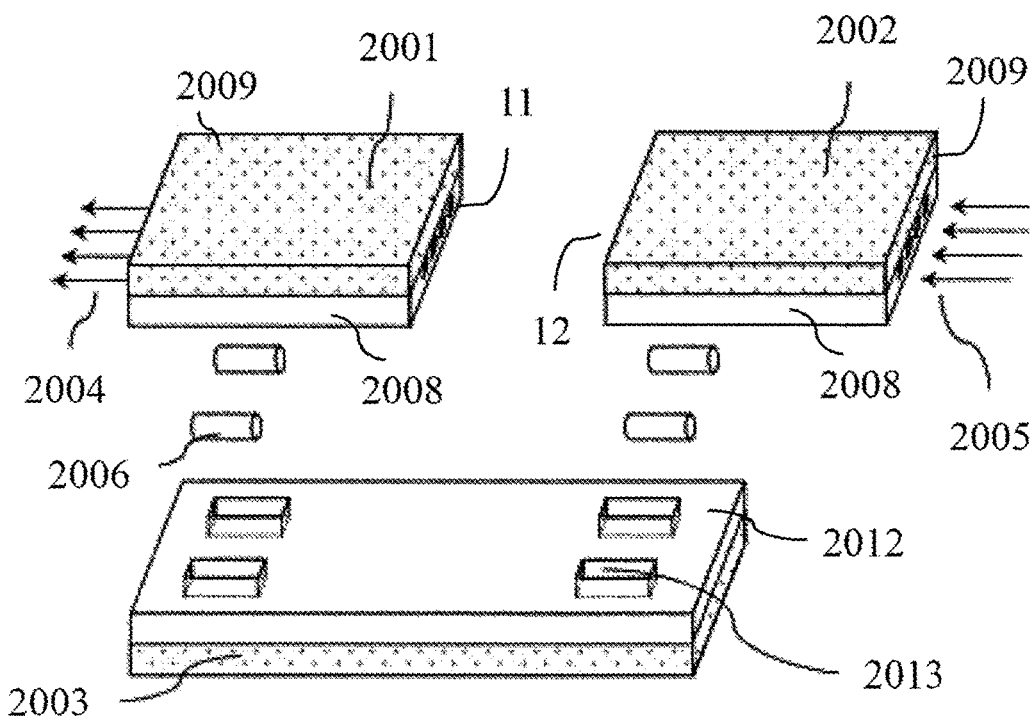
Figure 1C:
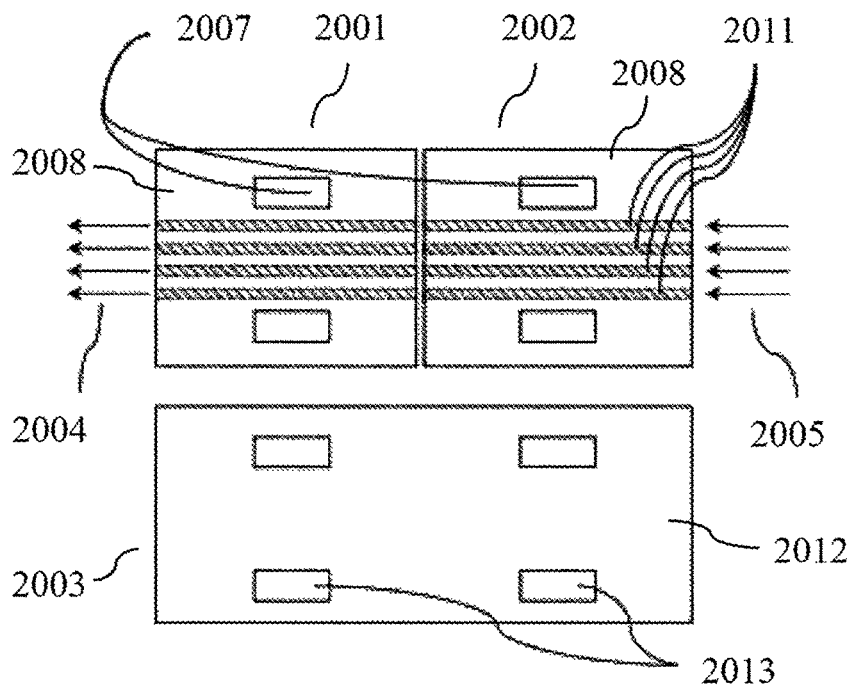
Figure 1D:
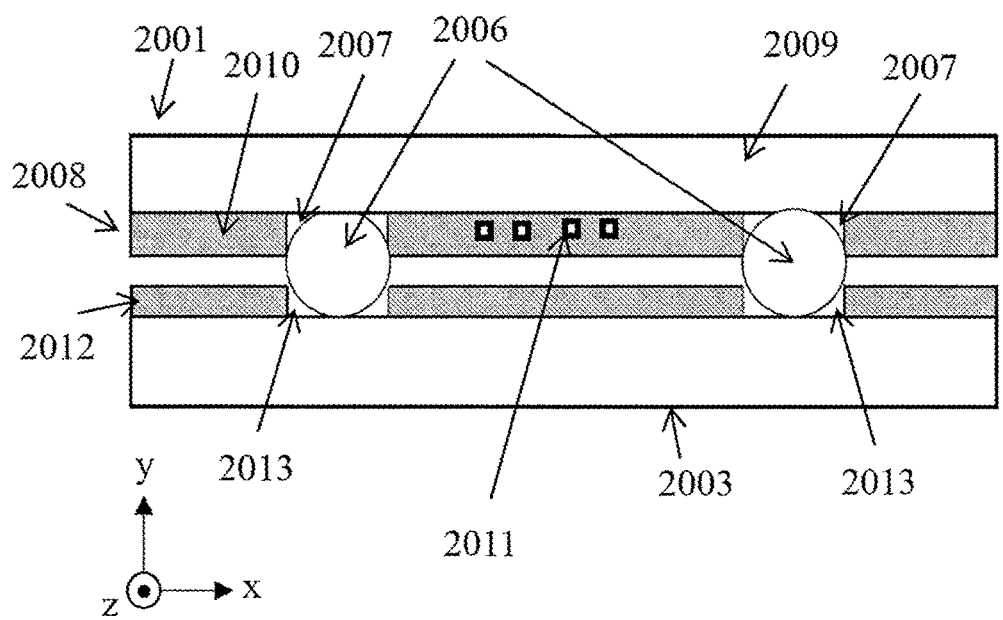

A connection structure of optical waveguide chips according to the first embodiment of the connection structure will be described. FIGS. 1A to 1D are schematic views showing a connection structure of optical waveguide chips according to the first embodiment of the present invention. FIG. 1A is a perspective view of the connection structure of optical waveguide chips, FIG. 1B is an exploded view of parts of the connection structure, FIG. 1C is a view showing the joint surfaces of optical waveguide chips and a base substrate, and FIG. 1D is a sectional view of the connection structure taken along an xy plane.

Note that various kinds of functional circuits configured to process a signal, such as a switch and a wavelength multiplexer/demultiplexer, are mounted as needed on an optical waveguide chip. However, this embodiment does not depend on the circuit arrangement in the optical waveguide chip and the functions of the circuits. In fact, an appropriate optical circuit is formed in the optical waveguide chip in an arrangement to avoid fitting grooves to be described later. However, since this embodiment does not depend on the arrangement of the circuit, FIGS. 1A to 1D show an example including only a linear waveguide, and other circuit arrangements are omitted for the sake of simple description.

In FIGS. 1A to 1D, a total of seven members, that is, silica-based PLCs 2001 and 2002 that are two optical waveguide chips each formed by a silica-based glass layer including an Si substrate and a waveguide layer, a silica-based base substrate 2003 that is manufactured by the same method as the silica-based PLCs 2001 and 2002 and includes no waveguide, and four spacer optical fibers (spacer members) 2006 are combined, thereby forming a connection structure.

The connection structure shown in FIGS. 1A to 1D is configured to be able to propagate input optical signals 2005 via the silica-based PLCs 2001 and 2002 and output them as output optical signals 2004.

As shown in FIG. 1D, the silica-based PLC 2001 has a structure in which an optical waveguide layer 2008 is formed on an Si substrate 2009. The optical waveguide layer 2008 is formed by a clad layer 2010 made of silica glass, and cores 2011 formed in the clad layer 2010 and made of silica glass containing a dopant. In addition, fitting grooves 2007 are formed in the clad layer 2010. The structure of the silica-based PLC 2002 is the same as that of the silica-based PLC 2001. FIG. 1C shows the joint surfaces of the optical waveguide layers 2008 (clad layers 2010) of the silica-based PLCs 2001 and 2002 to the silica-based base substrate 2003. As is apparent from FIG. 1C, two fitting grooves 2007 are formed in one PLC.

As shown in FIGS. 1A and 1B, the silica-based PLC 2001 and the silica-based PLC 2002 are arranged side by side such that connection end faces (incident/exit end faces) 11 and 12 face each other. The two silica-based PLCs 2001 and 2002 are mounted on the silica-based base substrate 2003.

A silica glass layer 2012 made of the same material as the clad layers 2010 of the silica-based PLCs 2001 and 2002 is formed on the surface of the silica-based base substrate 2003 on which the silica-based PLCs 2001 and 2002 are mounted. In the silica glass layer 2012, fitting grooves 2013 are formed at positions that face the fitting grooves 2007 of the silica-based PLCs 2001 and 2002 when mounting the silica-based PLCs 2001 and 2002 on the silica-based base substrate 2003 as will be described later.

FIG. 1C shows the joint surface of the silica glass layer 2012 to the silica-based PLCs 2001 and 2002. Since two fitting grooves 2007 are formed in one PLC, as described above, a total of four fitting grooves 2013, that is, two fitting grooves 2013 formed at positions facing the fitting grooves 2007 of the silica-based PLC 2001 and two fitting grooves 2013 formed at positions facing the fitting grooves 2007 of the silica-based PLC 2002 are formed in the silica glass layer 2012.

To manufacture the connection structure according to this embodiment, the spacer optical fibers 2006 are respectively fitted in the four fitting grooves 2013 formed in the silica glass layer 2012 of the silica-based base substrate 2003. Then, the two spacer optical fibers 2006 fitted in the fitting grooves 2013 of the silica glass layer 2012 are fitted in the two fitting grooves 2007 formed in the optical waveguide layer 2008 of the silica-based PLC 2001 such that the joint surface of the silica glass layer 2012 and the joint surface of the optical waveguide layer 2008 (clad layer 2010) of the silica-based PLC 2001 face each other, as shown in FIG. 1B, that is, such that the Si substrate 2009 is located on the upper side, and the optical waveguide layer 2008 is located on the lower side, thereby mounting the silica-based PLC 2001 on the silica-based base substrate 2003.

Similarly, the two spacer optical fibers 2006 fitted in the fitting grooves 2013 of the silica glass layer 2012 are fitted in the two fitting grooves 2007 formed in the optical waveguide layer 2008 of the silica-based PLC 2002 such that the joint surface of the silica glass layer 2012 and the joint surface of the optical waveguide layer 2008 (clad layer 2010) of the silica-based PLC 2002 face each other, thereby mounting the silica-based PLC 2002 on the silica-based base substrate 2003.

In this way, the silica-based PLCs 2001 and 2002 can be mounted on the silica-based base substrate 2003 such that the connection end face 11 of the silica-based PLC 2001 and the connection end face 12 of the silica-based PLC 2002 face each other at close range, and the optical connection between the silica-based PLC 2001 and the silica-based PLC 2002 can be implemented.

As shown in FIG. 1A, the input optical signals 2005 that have entered the silica-based PLC 2002 propagate through the optical waveguide layer 2008 of the silica-based PLC 2002 to give various kinds of optical functions integrated in the optical waveguide, then exit from the silica-based PLC 2002 and enter the silica-based PLC 2001, propagate through the optical waveguide layer 2008 of the silica-based PLC 2001, and exit from the silica-based PLC 2001 as the output optical signals 2004.

In this embodiment, the fitting grooves 2007 of the optical waveguide layers 2008 of the silica-based PLCs 2001 and 2002 are formed up to positions reaching the Si substrate 2009 such that the Si substrate 2009 is exposed to the bottoms of the fitting grooves 2007. Similarly, the fitting grooves 2013 of the silica glass layer 2012 of the silica-based base substrate 2003 are formed up to positions reaching the silica-based base substrate 2003 such that the silica-based base substrate 2003 is exposed to the bottoms of the fitting grooves 2013.

This can reduce the influence of an error in the height direction of the optical waveguide layers 2008 of the silica-based PLCs 2001 and 2002 with respect to the silica-based base substrate 2003 when the spacer optical fibers 2006 are fitted in the fitting grooves 2007 and 2013. That is, when the optical waveguide layer 2008 is formed on the Si substrate 2009, an error occurs in the thickness of the optical waveguide layer 2008. However, since a polished, very flat substrate is used as the Si substrate 2009, the core positions from the Si substrate 2009 are accurately decided.

For this reason, as shown in FIG. 1D, the spacer optical fibers 2006 fitted in the fitting grooves 2007 come into contact with the Si substrate 2009 exposed to the bottoms of the fitting grooves 2007. In addition, the spacer optical fibers 2006 fitted in the fitting grooves 2013 come into contact with the silica-based base substrate 2003 exposed to the bottoms of the fitting grooves 2013. This makes it possible to decide the relative height of the core positions in the two silica-based PLCs 2001 and 2002 at a very high accuracy. Hence, a height accuracy of submicron level can be expected.

In addition, the fitting grooves 2007 and 2013 are formed by photolithography. Hence, the width (the dimension in the left-right direction of FIG. 1D), the length (the dimension in the left-right direction of FIGS. 1B and 1C), and the positions of the fitting grooves 2007 and 2013 can be decided at a very high accuracy. Accordingly, the axis deviation of the optical waveguide layer 2008 in the direction in the waveguide layer plane can be aligned at a very high accuracy.

In addition, the spacer optical fibers 2006 with the same diameter are fitted in the four fitting grooves 2013 on the side of the silica-based base substrate 2003, the fitting grooves 2007 on the side of the silica-based PLC 2001 are fitted on two of the four spacer optical fibers 2006, and the fitting grooves 2007 on the side of the silica-based PLC 2002 are fitted on the remaining two spacer optical fibers 2006. For this reason, the tilts of the silica-based PLCs 2001 and 2002 with respect to the silica-based base substrate 2003 can be made small enough to be neglected.

When the above-described structure is employed, the core positions in the two silica-based PLCs 2001 and 2002 with respect to the silica-based base substrate 2003 are decided at a high accuracy. An array of the cores 2011 is formed on each of the opposing connection end faces 11 and 12 of the two silica-based PLCs 2001 and 2002. When the silica-based PLCs 2001 and 2002 are mounted on the silica-based base substrate 2003, the positions of the cores 2011 in the two silica-based PLCs 2001 and 2002 are aligned on the same lines, and low-loss connection of light can be implemented. In this embodiment, simple multi-chip mounting can thus be implemented at an accuracy of submicron level by passive alignment mounting without inputting/outputting light.

Note that in this embodiment, an example in which the silica glass layer 2012 of the silica-based base substrate 2003 is manufactured by the same process as that of the optical waveguide layers 2008 of the silica-based PLCs 2001 and 2002 has been described. However, the silica glass layer 2012 may be manufactured by another manufacturing method. For example, the same effect as described above can be obtained even by V-groove machining or machining using dicing or the like or laser machining as long as uniform fitting grooves 2007 and 2013 can be formed.

In addition, FIGS. 1A to 1D show an example in which the fitting grooves 2007 and 2013 are formed such that the direction orthogonal to the connection end faces 11 and 12 of the silica-based PLCs 2001 and 2002 is the longitudinal direction of the fitting grooves 2007 and 2013.

In the arrangement of the fitting grooves 2007 and 2013 as shown in FIGS. 1A to 1D, if the length of the spacer optical fibers 2006 equals the length of the fitting grooves 2007 and 2013, the positions of the silica-based PLCs 2001 and 2002 in the z-axis direction (the optical axis direction and the left-right direction of FIGS. 1A to 1C) are uniquely decided.

Here, if the length of the spacer optical fibers 2006 is set smaller than the length of the fitting grooves 2007 and 2013, the positions of the silica-based PLCs 2001 and 2002 in the Z-axis direction are not uniquely decided. From a different viewpoint, that the positions in the Z-axis direction are not uniquely decided means that the silica-based PLCs 2001 and 2002 can be slide-adjusted in the Z-axis direction even after mounting as if they were parts mounted on a rail.

Accordingly, even if a small error exists in the length of the silica-based PLCs 2001 and 2002 in the optical axis direction, the silica-based PLCs 2001 and 2002 can be slid and adjusted in the Z-axis direction such that the gap between the silica-based PLCs 2001 and 2002 becomes as small as possible. The smaller the gap between the silica-based PLCs 2001 and 2002 is, the smaller the optical loss is. Hence, connection of a lower loss can be implemented by making the silica-based PLCs 2001 and 2002 have a slide-adjustable structure. In addition, since the accuracy in the optical axis direction at the time of mounting of the silica-based PLCs 2001 and 2002 can be low, the mounting operation can be simplified.

In the example shown in FIGS. 1A to 1D, the longitudinal direction of the fitting grooves 2007 and 2013 is set in parallel to the optical axis direction of light that exits from the silica-based PLC 2002 to the silica-based PLC 2001 and the optical axis direction of light that enters the silica-based PLC 2001.

Figure 2A:
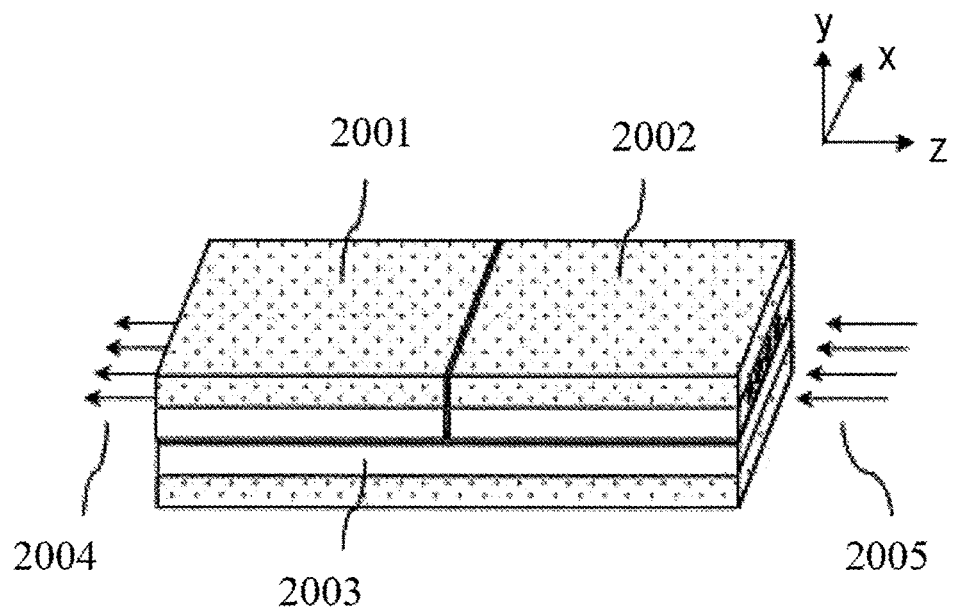
FIGS. 2A to 2D are schematic views showing another connection structure of optical waveguide chips according to the first embodiment of the present invention.
Figure 2B:
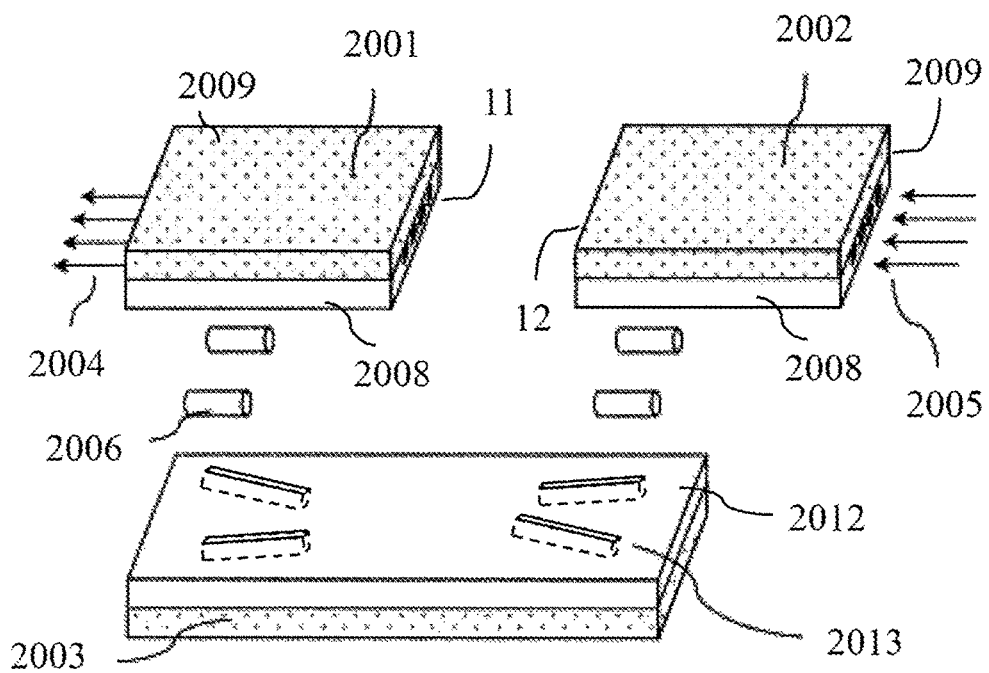
Figure 2C:
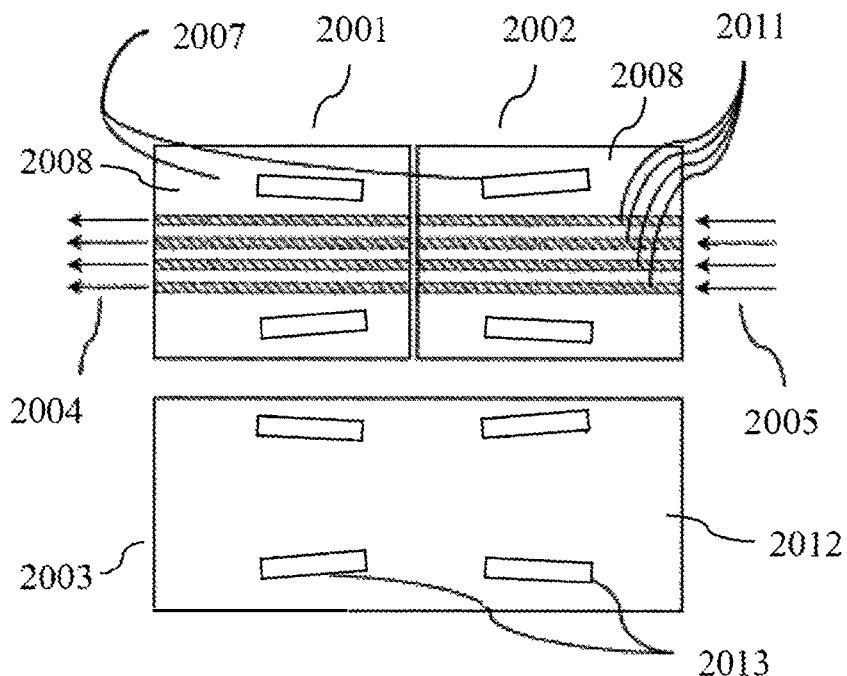
Figure 2D:
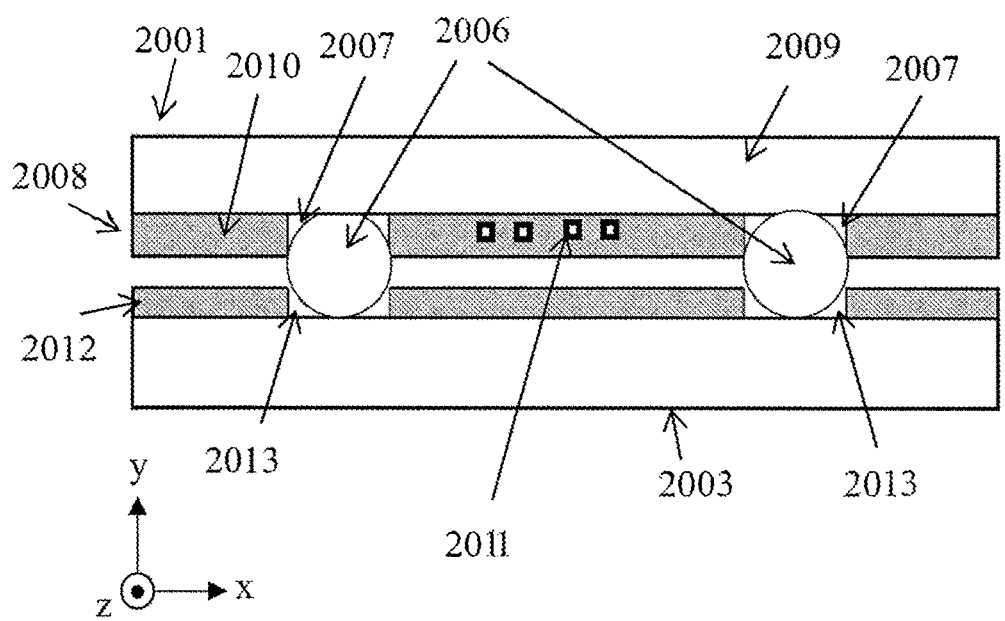

On the other hand, when the longitudinal direction of the fitting grooves 2007 and 2013 are slightly tilted from the optical axis direction, as shown in FIGS. 2A to 2C, the positions of the silica-based PLCs 2001 and 2002 in the Z-axis direction can uniquely be decided. Like FIGS. 1A to 1D, FIG. 2A is a perspective view of the connection structure of the silica-based PLCs 2001 and 2002, FIG. 2B is an exploded view of parts of the connection structure, FIG. 2C is a view showing the joint surfaces of the silica-based PLCs 2001 and 2002 and silica-based base substrate 2003, and FIG. 2D is a sectional view of the connection structure taken along the xy plane.

In the example shown in FIGS. 2A to 2D, if a setting is done such that the gap between the silica-based PLCs 2001 and 2002 becomes zero when each of the two silica-based PLCs 2001 and 2002 has an outer dimension as designed, there is a fear that the silica-based PLCs 2001 and 2002 mechanically interfere near the connection end faces 11 and 12 of the silica-based PLCs 2001 and 2002 because of a slight outer diameter error of the silica-based PLCs 2001 and 2002. Hence, a margin is preferably provided in advance for the gap between the silica-based PLCs 2001 and 2002 at the time of design. Even in a case in which the silica-based PLCs 2001 and 2002 have a slight outer diameter error, this can prevent the silica-based PLCs 2001 and 2002 from colliding when the silica-based PLCs 2001 and 2002 are mounted on the silica-based base substrate 2003.

In both of the cases shown in FIGS. 1A to 1D and 2A to 2D, the gap between the connection end faces 11 and 12 of the two silica-based PLCs 2001 and 2002 is filled with a refractive index matching resin. When the gap is filled with the refractive index matching resin, Fresnel reflection of light caused by air existing in the gap between the silica-based PLCs 2001 and 2002 can be suppressed.

Additionally, in this embodiment, the silica-based PLCs 2001 and 2002 are only placed on the silica-based base substrate 2003 in a form in which they are supported by the spacer optical fibers 2006, but are not fixed. For this reason, the silica-based PLCs 2001 and 2002 are detachable from the silica-based base substrate 2003, and pluggable connection can be implemented in which the necessary silica-based PLCs 2001 and 2002 can be connected only when necessary, like a connector. This form is called a PPCP (Pluggable Photonic Circuit Platform).

In some cases, the silica-based PLCs 2001 and 2002 may be adhered by filling the gap between the silica-based base substrate 2003 and the silica-based PLCs 2001 and 2002 with an optical adhesive of a matching refractive index, or both the silica-based PLCs 2001 and 2002 may be adhered and fixed after mounted on the silica-based base substrate 2003. Alternatively, one silica-based PLC of the two silica-based PLCs 2001 and 2002 may be fixed to the silica-based base substrate 2003, and the other may be detachable.

When the silica-based PLCs 2001 and 2002 were actually mounted in the form shown in FIGS. 2A to 2D, it was confirmed that at a wavelength of 1.55 µm, a connection loss of 0.4 dB or less could be achieved in four cores using the silica-based PLCs 2001 and 2002 with a mode diameter of about 6 µm. The value of this loss indicates that the two silica-based PLCs 2001 and 2002 can be mounted at a position accuracy of submicron level or less. Such a low loss can be achieved because the accuracy of the mounting form of this embodiment is high, and also because the structure of this embodiment can make the gap between the silica-based PLCs 2001 and 2002 as small as possible, and therefore, the influence of a position error such as an axis deviation can be minimized.

Here, the optical loss caused by the axis deviation is known to have a large influence as the light beam diameter becomes small. More preferably, spot size conversion to increase the beam diameter is used near the connection end faces of the silica-based PLCs 2001 and 2002. As a method of spot size conversion a known spot size conversion structure such as a tapered shape that increases the core diameter toward the end face, an inverted tapered shape that decreases the core diameter toward the end face, a segment structure, a structure of adding a second core to the inverted tapered shape, or a structure of burying a second core layer of a different material is preferably appropriately set.

Second Embodiment

Figure 3A:
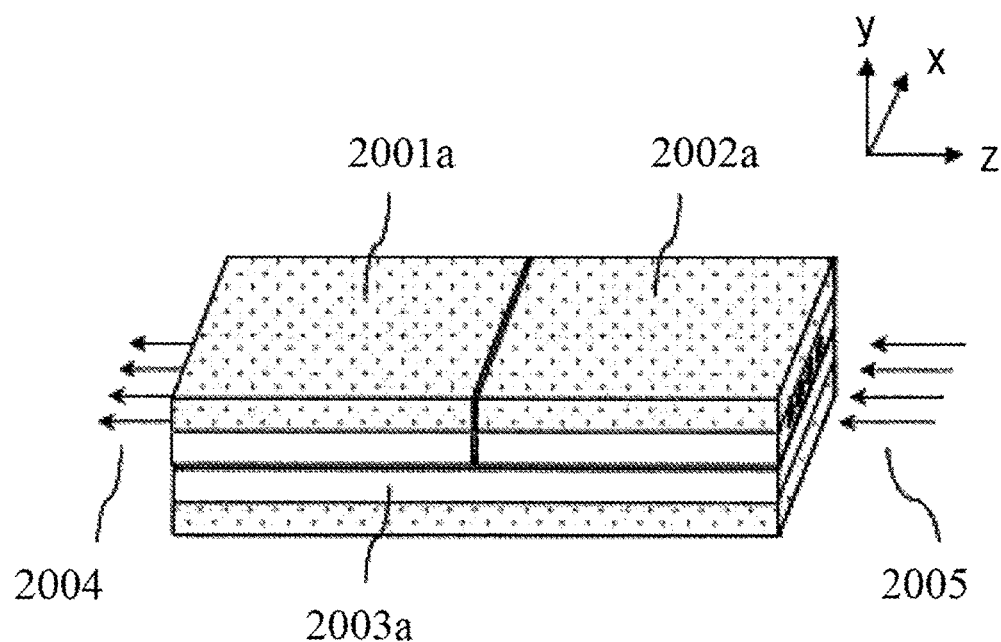
FIGS. 3A to 3D are schematic views showing a connection structure of optical waveguide chips according to the second embodiment of the present invention.
Figure 3B:
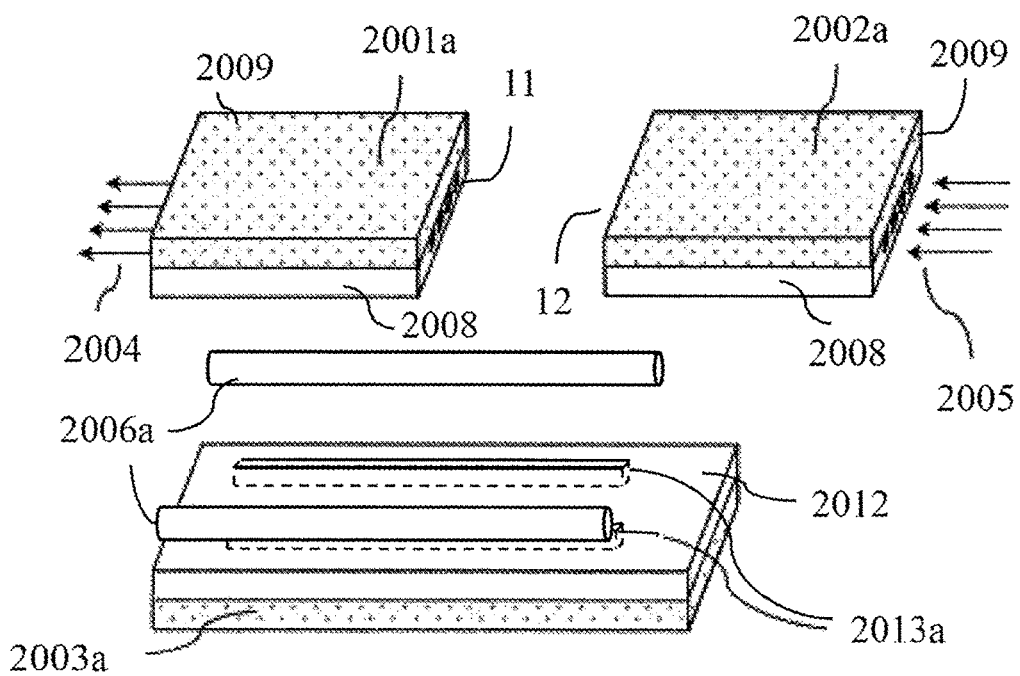
Figure 3C:
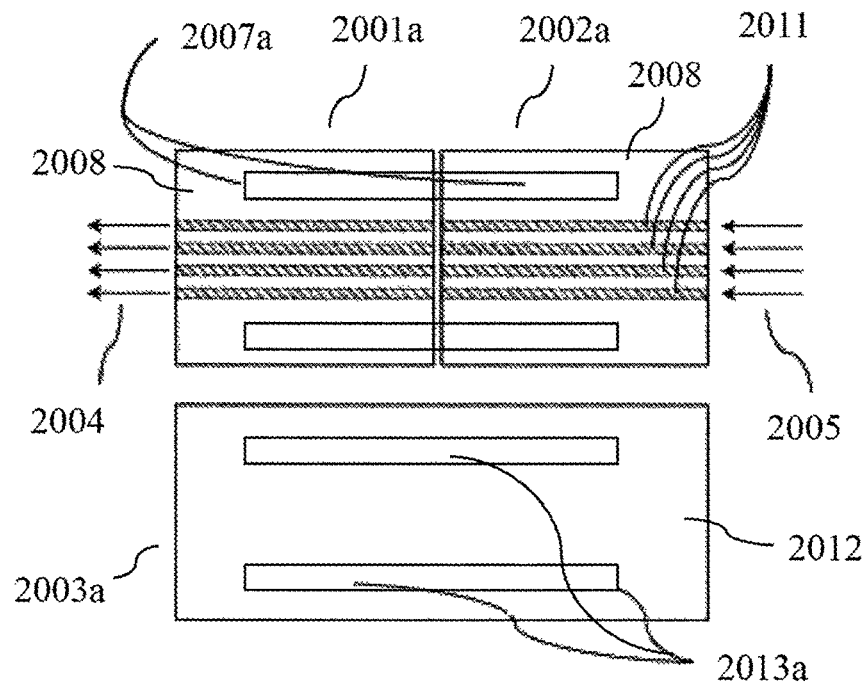
Figure 3D:
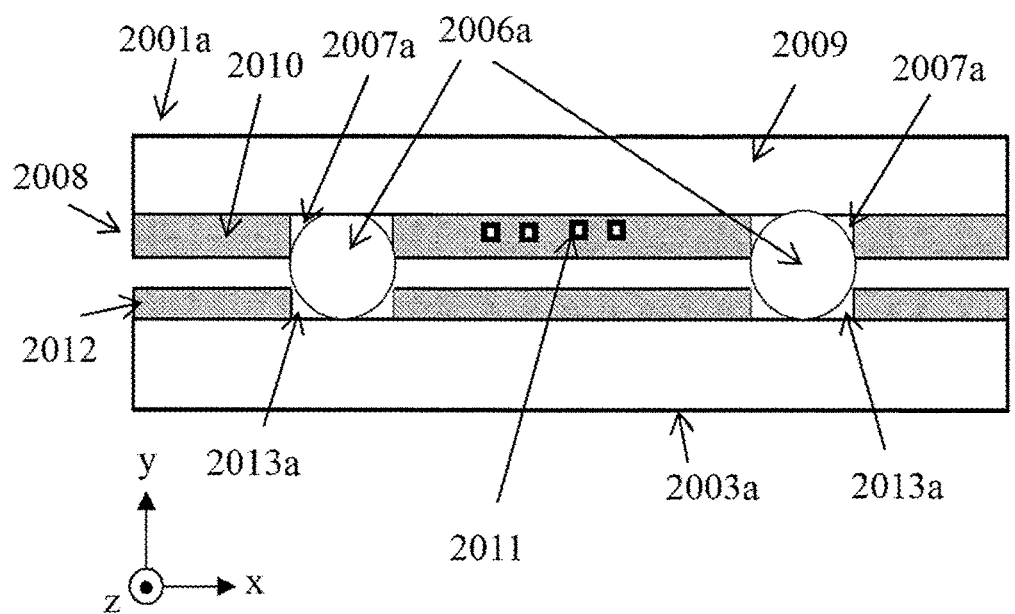

The second embodiment of the present invention will be described next. FIGS. 3A to 3D are schematic views showing a connection structure of optical waveguide chips according to the second embodiment of the present invention, and the same reference numerals as in FIGS. 1A to 1D and 2A to 2D denote the same components in FIGS. 3A to 3D. FIG. 3A is a perspective view of the connection structure of silica-based PLCs 2001*a* and 2002*a*, FIG. 3B is an exploded view of parts of the connection structure, FIG. 3C is a view showing the joint surfaces of the silica-based PLCs 2001*a* and 2002*a* and a silica-based base substrate 2003*a*, and FIG. 3D is a sectional view of the connection structure taken along an xy plane.

The basic structure of this embodiment is the same as in the first embodiment. In this embodiment, fitting grooves formed in a silica glass layer 2012 of the silica-based base substrate 2003*a* are shared by the silica-based PLCs 2001*a* and 2002*a*. That is, two fitting grooves 2013*a* are formed in the silica glass layer 2012. Furthermore, spacer optical fibers 2006*a* (spacer members) fitted in the fitting grooves 2013*a* are also shared by the silica-based PLCs 2001*a* and 2002*a*, and only two spacer optical fibers 2006*a* are used.

In an optical waveguide layer 2008 (clad layer 2010) of each of the silica-based PLCs 2001*a* and 2002*a*, two fitting grooves 2007*a* are formed, as in the first embodiment. However, since the spacer optical fibers 2006*a* are shared by the silica-based PLCs 2001*a* and 2002*a*, the fitting grooves 2007*a* formed in the optical waveguide layer 2008 of the silica-based PLC 2001*a* need to reach a connection end face 11 of the silica-based PLC 2001*a*. Similarly, the fitting grooves 2007*a* formed in the optical waveguide layer 2008 of the silica-based PLC 2002*a* need to reach a connection end face 12 of the silica-based PLC 2002*a*.

When manufacturing the connection structure according to this embodiment, the spacer optical fibers 2006*a* are respectively fitted in the two fitting grooves 2013*a* formed in the silica glass layer 2012 of the silica-based base substrate 2003*a*. Then, the two spacer optical fibers 2006*a* fitted in the fitting grooves 2013*a* are fitted in the two fitting grooves 2007*a* formed in the optical waveguide layer 2008 of the silica-based PLC 2001*a* such that the joint surface of the silica glass layer 2012 and the joint surface of the optical waveguide layer 2008 (clad layer 2010) of the silica-based PLC 2001*a* face each other, as shown in FIG. 3B, thereby mounting the silica-based PLC 2001*a* on the silica-based base substrate 2003*a*.

Similarly, the two spacer optical fibers 2006*a* fitted in the fitting grooves 2013*a* are fitted in the two fitting grooves 2007*a* formed in the optical waveguide layer 2008 of the silica-based PLC 2002*a* such that the joint surface of the silica glass layer 2012 and the joint surface of the optical waveguide layer 2008 (clad layer 2010) of the silica-based PLC 2002*a* face each other, thereby mounting the silica-based PLC 2002*a* on the silica-based base substrate 2003*a*.

As described above, in this embodiment, more accurate mounting can be expected because the influence of a formation error of the spacer optical fibers 2006*a*, a formation error of the fitting grooves 2007*a* and 2013*a*, and the like is difficult to exert as compared to the first embodiment in which the silica-based PLCs 2001 and 2002 use different spacer optical fibers 2006 and different fitting grooves 2007 and 2013.

In addition, when the fitting grooves 2013*a* on the side of the silica-based base substrate 2003*a* are shared by the silica-based PLCs 2001*a* and 2002*a*, the specification of the accuracy of the fitting grooves 2013*a* can greatly be relaxed. That is, when the four fitting grooves 2013 on the side of the silica-based base substrate 2003 are formed to correspond to the fitting grooves 2007 of the silica-based PLCs 2001 and 2002, as in the first embodiment, the accuracy of the depth and width of the fitting grooves 2013 needs to be guaranteed at a submicron accuracy not to shift the relative positions of the two silica-based PLCs 2001 and 2002.

On the other hand, in this embodiment, the fitting grooves 2013*a* on the side of the silica-based base substrate 2003*a* are shared by the silica-based PLCs 2001*a* and 2002*a*. Accordingly, if the two fitting grooves 2013*a* are formed to have the same absolute accuracy in the longitudinal direction of the fitting grooves 2013*a*, the relative position accuracy of the two silica-based PLCs 2001*a* and 2002*a* does not change. It is therefore possible to relax the manufacturing tolerance of the fitting grooves 2013*a*.

For this reason, as for the fitting grooves 2013*a* on the side of the silica-based base substrate 2003*a*, it is not always necessary to perform etching or the like using materials formed by two layers such as a substrate and a glass layer as described in the first embodiment. For example, even if the fitting grooves 2013*a* are formed by etching or machining such as dicing in a substrate made of silica glass, the position accuracy between the silica-based PLCs 2001*a* and 2002*a* is not influenced.

Third Embodiment

Figure 4A:
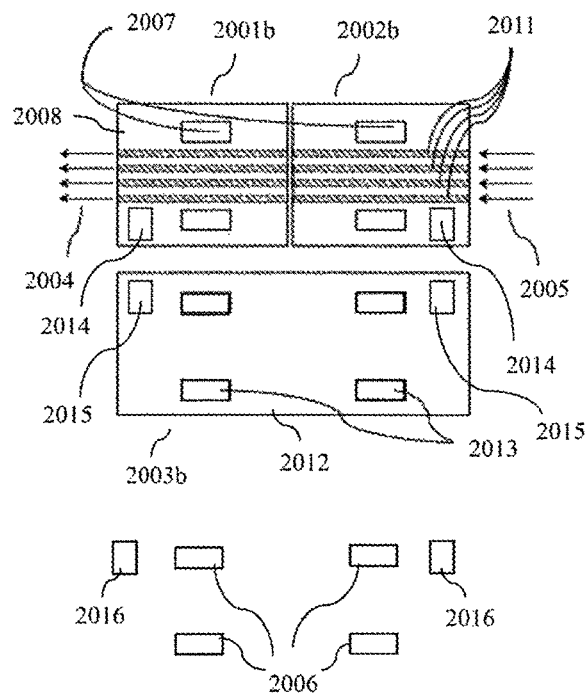
FIGS. 4A and 4B are schematic views showing a connection structure of optical waveguide chips according to the third embodiment of the present invention.
Figure 4B:
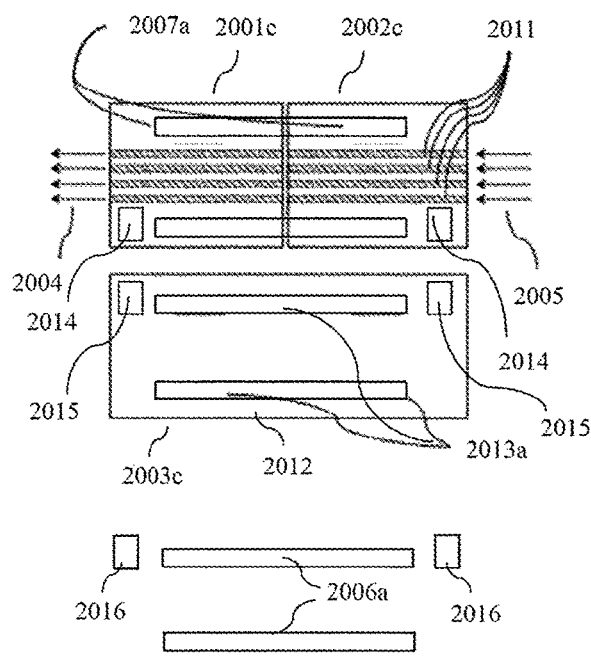

The third embodiment of the present invention will be described next. FIGS. 4A and 4B are schematic views showing a connection structure of optical waveguide chips according to the third embodiment of the present invention, and the same reference numerals as in FIGS. 1A to 1D, FIGS. 2A to 2D, and FIGS. 3A to 3D denote the same components in FIGS. 4A and 4B.

FIG. 4A shows the joint surfaces of silica-based PLCs 2001*b* and 2002*b* and a silica-based base substrate 2003*b*, which have the same structures as in the first embodiment. In this embodiment, in the connection structure described in the first embodiment, one fitting groove 2014 whose longitudinal direction is perpendicular in the surface to the optical axis direction of light that exits from the silica-based PLC 2002*b* to the silica-based PLC 2001*b* and the optical axis direction (the left-right direction of FIG. 4A) of light that enters the silica-based PLC 2001*b* is added per PLC in an optical waveguide layer 2008 (clad layer 2010) of each of the two silica-based PLCs 2001*b* and 2002*b*.

In a silica glass layer 2012 of the silica-based base substrate 2003*b*, fitting grooves 2015 are added at positions that face the fitting grooves 2014 when mounting the silica-based PLCs 2001*b* and 2002*b* on the silica-based base substrate 2003*b*. Since one fitting groove 2014 is formed in one PLC, as described above, a total of two fitting grooves 2015, that is, one formed at a position facing the fitting groove 2014 of the silica-based PLC 2001*b* and one formed at a position facing the fitting groove 2014 of the silica-based PLC 2002*b* are formed in the silica glass layer 2012.

When manufacturing the connection structure of the silica-based PLCs 2001*b* and 2002*b*, spacer optical fibers 2006 are respectively fitted in fitting grooves 2013 on the side of the silica-based base substrate 2003*b*, and simultaneously, similar spacer optical fibers 2016 are respectively fitted in the fitting grooves 2015. Then, the spacer optical fibers 2006 and 2016 fitted in the fitting grooves 2013 and 2015 are fitted in fitting grooves 2007 and 2014 on the side of the silica-based PLC 2001*b* such that the joint surface of the silica-based base substrate 2003*b* and the joint surface of the silica-based PLC 2001*b* face each other, thereby mounting the silica-based PLC 2001*b* on the silica-based base substrate 2003*b*. Similarly, the spacer optical fibers 2006 and 2016 fitted in the fitting grooves 2013 and 2015 are fitted in the fitting grooves 2007 and 2014 on the side of the silica-based PLC 2002b such that the joint surface of the silica-based base substrate 2003b and the joint surface of the silica-based PLC 2002b face each other, thereby mounting the silica-based PLC 2002b on the silica-based base substrate 2003b.

FIG. 4B shows the joint surfaces of the silica-based PLCs 2001c and 2002c and a silica-based base substrate 2003c, which have the same structures as in the second embodiment. In the example shown in FIG. 4B as well, the fitting grooves 2014 and 2015 are formed in the silica-based PLCs 2001c and 2002c and the silica-based base substrate 2003c.

When manufacturing the connection structure of the silica-based PLCs 2001c and 2002c, spacer optical fibers 2006a are respectively fitted in fitting grooves 2013a on the side of the silica-based base substrate 2003c, and simultaneously, the spacer optical fibers 2016 are respectively fitted in the fitting grooves 2015. Then, the spacer optical fibers 2006a and 2016 fitted in the fitting grooves 2013a and 2015 are fitted in fitting grooves 2007a and 2014 on the side of the silica-based PLC 2001c such that the joint surface of the silica-based base substrate 2003c and the joint surface of the silica-based PLC 2001c face each other, thereby mounting the silica-based PLC 2001c on the silica-based base substrate 2003c. Similarly, the spacer optical fibers 2006a and 2016 fitted in the fitting grooves 2013a and 2015 are fitted in the fitting grooves 2007a and 2014 on the side of the silica-based PLC 2002c such that the joint surface of the silica-based base substrate 2003c and the joint surface of the silica-based PLC 2002c face each other, thereby mounting the silica-based PLC 2002c on the silica-based base substrate 2003c.

Since the fitting grooves 2014 formed in the silica-based PLCs 2001b, 2002b, 2001c, and 2002c are orthogonal to the optical axis direction, the layout of the optical waveguides and the positions of the fitting grooves 2014 are appropriately set to prevent the fitting grooves 2014 from dividing the optical waveguides. Like the fitting grooves 2007 and 2007a, the fitting grooves 2014 are formed up to such a depth that the Si substrate is exposed to the bottoms of the fitting grooves 2014, and the spacer optical fibers 2016 fitted in the fitting grooves 2014 come into contact with the Si substrate.

Additionally, like the fitting grooves 2013 and 2013a, when the fitting grooves 2015 are formed in the silica glass layer on the silica-based base substrate 2003b or 2003c, the fitting grooves 2015 are formed up to such a depth that silica-based base substrate 2003b or 2003c is exposed to the bottoms of the fitting grooves 2015, and the spacer optical fibers 2016 fitted in the fitting grooves 2015 come into contact with the silica-based base substrate 2003b or 2003c.

By the above-described structure, in this embodiment, the positions of the silica-based PLCs 2001b, 2002b, 2001c, and 2002c in the Z-axis direction can uniquely be decided. In this embodiment, passive mounting simultaneously for six axes can thus be implemented.

In this embodiment, however, considering the influence of the outer dimension errors of the silica-based PLCs 2001b, 2002b, 2001c, and 2002c, the width of the fitting grooves 2014 and 2015 in the optical axis direction is set to be slightly wider than the width (diameter) of the spacer optical fibers 2016 that are fitted in the fitting grooves 2014 and 2015. In addition, the lengths of the fitting grooves 2007, 2013, 2007a, and 2013a in the optical axis direction are set to be slightly longer than the lengths of the spacer optical fibers 2006 and 2006a fitted in the fitting grooves 2007, 2013, 2007a, and 2013a.

With the setting of the width and lengths, even if the outer dimensions of the silica-based PLCs 2001b, 2002b, 2001c, and 2002c have errors, the silica-based PLCs 2001b, 2002b, 2001c, and 2002c can be slid in the Z-axis direction to adjust their positions using the clearances between the spacer optical fibers 2016 fitted in the fitting grooves 2014 and 2015 and the fitting grooves 2014 and 2015 and the clearances between the spacer optical fibers 2006 and 2006a fitted in the fitting grooves 2007, 2013, 2007a, and 2013a and the fitting grooves 2007, 2013, 2007a, and 2013a.

Accordingly, in this embodiment, it is possible to avoid the problem that the two silica-based PLCs 2001b and 2002b (or 2001c and 2002c) mechanically interfere, as described above, and the two silica-based PLCs 2001b and 2002b (or 2001c and 2002c) cannot be mounted.

Additionally, in this embodiment, after mounting, the silica-based PLCs 2001b and 2002b (or 2001c and 2002c) can be slid and adjusted in the Z-axis direction such that the gap between the silica-based PLCs 2001b and 2002b (or 2001c and 2002c) becomes as small as possible, as in the first embodiment. As a result, the connection loss between the silica-based PLCs 2001b and 2002b (or 2001c and 2002c) can be minimized.

Fourth Embodiment

Figure 5A:
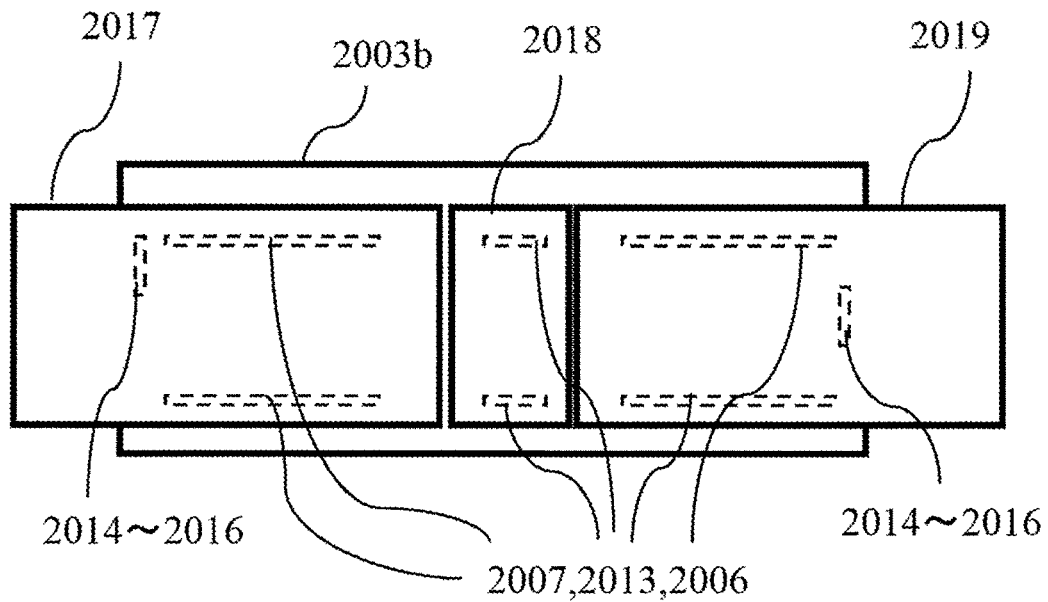
FIGS. 5A and 5B are schematic views showing a connection structure of optical waveguide chips according to the fourth embodiment of the present invention.
Figure 5B:
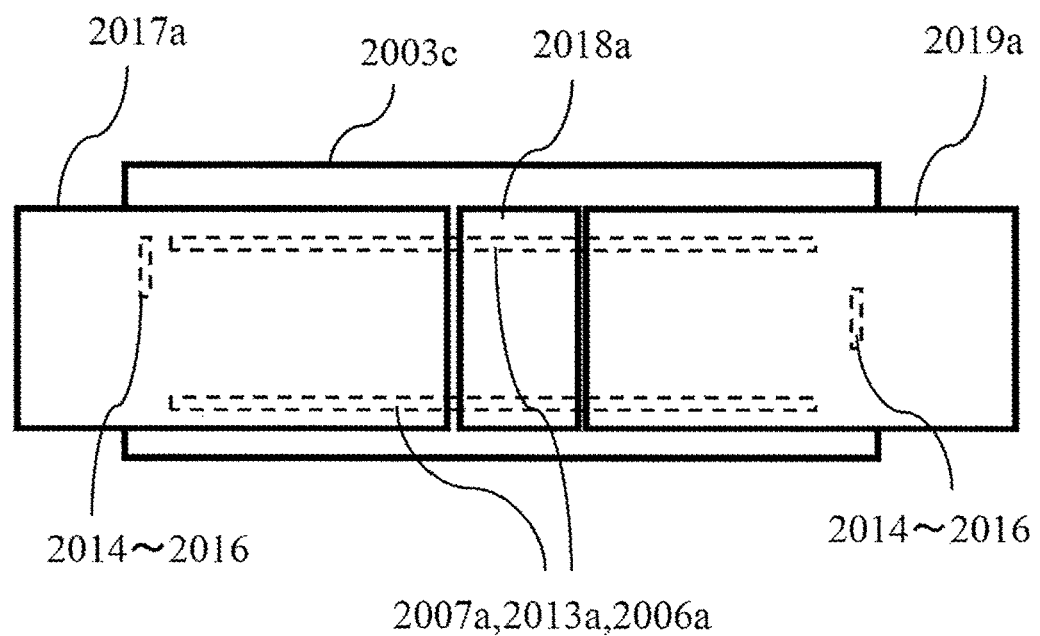

The fourth embodiment of the present invention will be described next. FIGS. 5A and 5B are schematic views showing a connection structure of optical waveguide chips according to the fourth embodiment of the present invention, and the same reference numerals as in FIGS. 1A to 1D, 2A to 2D, 3A to 3D, 4A, and 4B denote the same components in FIGS. 5A and 5B.

FIG. 5A is a plan view showing a connection structure in which three silica-based PLCs 2017, 2018, and 2019 are mounted on a silica-based base substrate 2003b when viewed from the upper side. The structure of the PLCs 2017 and 2019 is the same as the structure of the silica-based PLCs 2001b and 2002b explained with reference to FIG. 4A. On the other hand, the structure of the PLC 2018 is the same as the structure of the silica-based PLCs 2001 and 2002 explained with reference to FIGS. 1A to 1D.

FIG. 5B is a plan view showing a connection structure in which three silica-based PLCs 2017a, 2018a, and 2019a are mounted on a silica-based base substrate 2003c when viewed from the upper side. The structure of the PLCs 2017a and 2019a is the same as the structure of the silica-based PLCs 2001c and 2002c explained with reference to FIG. 4B. On the other hand, the structure of the PLC 2018a is the same as the structure of the silica-based PLCs 2001a and 2002a explained with reference to FIGS. 3A to 3D. However, since spacer optical fibers 2006a are shared by the three silica-based PLCs 2017a, 2018a, and 2019a, fitting grooves 2007a formed in the optical waveguide layer of the silica-based PLC 2018a at the center need to reach the left and right end faces of the silica-based PLC 2018a.

In this embodiment, the three silica-based PLCs 2017, 2018, and 2019 (2017a, 2018a, and 2019a) are arranged on the same line and mounted by the same passive alignment method as described above. The two silica-based PLCs 2017 and 2019 (2017a and 2019a) on both sides are mounted on the silica-based base substrate 2003b (2003c) and then adhesively fixed and integrated with the silica-based base substrate 2003b (2003c). On the other hand, the silica-based PLC 2018 (2018*a*) at the center has a pluggable detachable structure. The silica-based PLC 2018 (2018*a*) can be used as a simple evaluation kit for examination or sensing. All of the three silica-based PLCs 2017, 2018, and 2019 may be detachable without being adhesively fixed, as a matter of course.

As can be seen from this embodiment, the present invention is applicable without depending on the number of connected optical waveguide chips (PLCs). For example, not connection of three optical waveguide chips, as in this embodiment, but connection of four or more optical waveguide chips is also possible.

Additionally, in the above-described embodiments, an example in which all the inputs/outputs are connected at the opposing connection end faces (all the connection end faces are parallel) has been described. However, the present invention is not limited to this. In the present invention, the opposing connection end faces of adjacent optical waveguide chips need only be parallel. Another connection end face (for example, an orthogonal connection end face) that is not parallel to these connection end faces may exist.

Note that in the first to fourth embodiments, the description has been made by exemplifying, as an optical waveguide chip, a silica-based planar lightwave circuit (PLC) of a thin glass film formed on a silicon substrate. However, the present invention can be applied to any optical waveguide chip including a waveguide mechanism. For example, as the material of the substrate or the optical waveguide, quartz, a polymer made of an organic substance, a semiconductor or a compound semiconductor waveguide using Si, silicon nitride (SiN), gallium arsenide, indium phosphide (InP), or the like, and a dielectric such as lithium niobate (LN), periodically poled lithium niobate (PPLN), or lithium tantalate (LT) can be used in addition to silica glass.

In the first to fourth embodiments, two or more fitting grooves 2007 or 2007*a* suffice per PLC. The fitting grooves 2013 or 2013*a* formed in the silica-based base substrate 2003, 2003*a* to 2003*c* need only be provided in number according to the fitting grooves 2007 or 2007*a*. As described above, the number of fitting grooves 2013 or 2013*a* is equal to the total number of fitting grooves 2007 or 2007*a* (FIGS. 1, 2, and 4A), or smaller than the total number of fitting grooves 2007 or 2007*a* (FIG. 3). The spacer optical fibers 2006 or 2006*a* need only be provided in number according to the fitting grooves 2007, 2007*a*, 2013, or 2013*a*. The number of spacer optical fibers 2006 or 2006*a* is equal to the total number of fitting grooves 2007 or 2007*a* (FIGS. 1, 2, and 4A), or smaller than the total number of fitting grooves 2007 or 2007*a* (FIG. 3).

Additionally, in the third and fourth embodiments, one or more fitting grooves 2014 suffice per PLC. The fitting grooves 2015 formed in the silica-based base substrate 2003*b* or 2003*c* need only be provided as many as the fitting grooves 2014. The spacer optical fibers 2016 are provided in number according to the fitting grooves 2014 and 2015.

In the first to fourth embodiments, an example in which the fitting grooves 2007, 2007*a*, 2013, 2013*a*, 2014, and 2015 formed in the silica-based PLCs 2001, 2001*a* to 2001*c*, 2002, 2002*a* to 2002*c*, 2017 to 2019, and 2017*a* to 2019*a* and the silica-based base substrates 2003 and 2003*a* to 2003*c* are grooves each having a rectangular section has been described. However, grooves whose groove widths become narrow toward the substrates 2009, 2003, and 2003*a* to 2003*c*, for example, grooves each having a V-shaped or W-shaped section or grooves each having a U-shaped section may be used. Additionally, in the first to fourth embodiments, the shape of each of the fitting grooves 2007, 2007*a*, 2013, 2013*a*, 2014, and 2015 viewed from the upper side is rectangular. However, if the same effect can be obtained, the planar shape may be an arbitrary shape such as a round, polygonal, or elliptical shape. That is, the fitting grooves 2007, 2007*a*, 2013, 2013*a*, 2014, and 2015 may change the widths along the longitudinal direction.

Additionally, in the first to fourth embodiments, the fitting grooves 2007, 2007*a*, and 2014 have the same depth, and the fitting grooves 2013, 2013*a*, and 2015 have the same depth. In addition, the spacer optical fibers 2006, 2006*a*, and 2016 have the same height. The height of the spacer optical fibers 2006, 2006*a*, and 2016 is preferably larger than the sum of the depth of the fitting grooves 2013, 2013*a*, and 2015 on the base substrate side and the depth of the fitting grooves 2007, 2007*a*, and 2014 on the optical waveguide chip side. This can provide a gap between the base substrate and the optical waveguide chip.

Additionally, in the first to fourth embodiments, the cylindrical spacer optical fibers 2006, 2006*a*, and 2016 are used as spacer members. However, the present invention is not limited to this. The material of the spacer member can be an arbitrary material such as an inorganic substance such as glass, a metal, or a polymer. In addition, the shape is not limited as long as it can appropriately be fitted in one of the fitting grooves 2007, 2007*a*, 2013, 2013*a*, 2014, and 2015. That is, the spacer member may have a cylindrical shape, a parallelopiped shape, a spherical shape, or a similar shape. In addition, if the height of the spacer member changes when it is fitted in the fitting groove, the optical waveguide chip may tilt with respect to the base substrate. Hence, the material, dimensions, and shape of the spacer member are preferably set such that the height of the spacer member is difficult to change when it is fitted in the fitting groove.

Fifth Embodiment

Figure 6A:
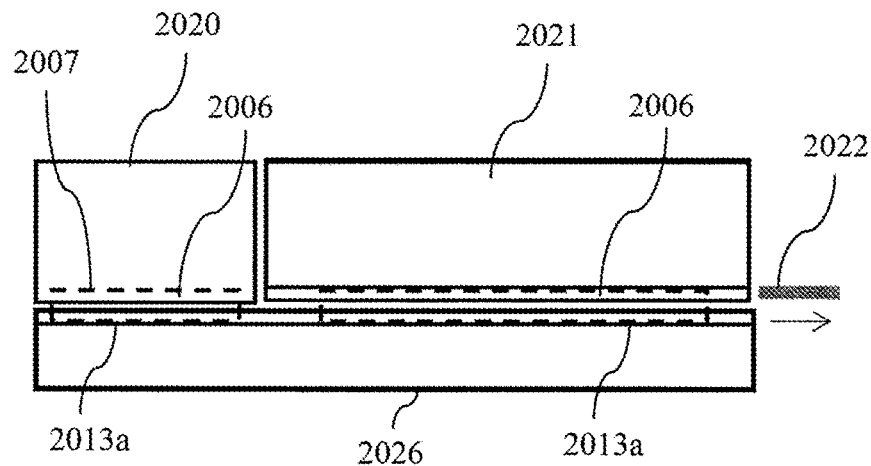
FIGS. 6A and 6B are schematic views showing the connection structure between a light-emitting element and an optical waveguide according to the fifth embodiment of the present invention.
Figure 6B:
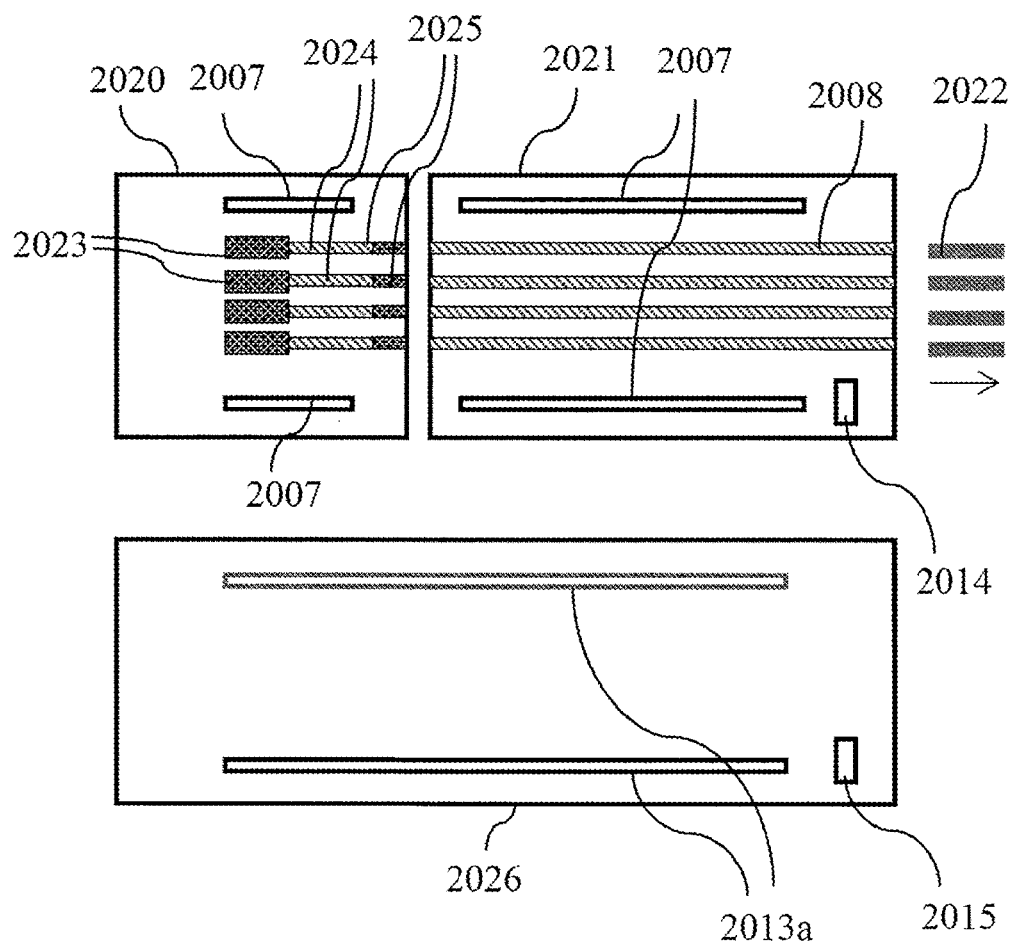

The fifth embodiment of the present invention will be described next. FIGS. 6A and 6B are schematic views showing a connection structure of optical waveguide chips according to the fifth embodiment of the present invention, and the same reference numerals as in FIGS. 1A to 1D, 2A to 2D, and 3A to 3D denote the same components in FIGS. 6A and 6B. FIG. 6A is a sectional view of the connection structure, and FIG. 6B is a view showing the joint surfaces of optical waveguide chips.

FIG. 6A is a sectional view showing a connection structure in which an optical waveguide chip (laser chip) 2020 and an optical waveguide chip 2021 that transmits light from the optical waveguide chip 2020 to an optical fiber 2022 are mounted on a base substrate 2026. As the optical waveguide chip 2020, a DFB (Distributed Feedback) laser chip made of a III-V material such as InP is used. Other than a DFB laser, a DBR (Distributed Bragg Reflector) laser, an SOA (Semiconductor Optical Amplifier), or the like may be used. An electrical wire and a connection pad, which electrically connect a driver configured to drive the DFB laser, are not illustrated in the drawing.

Here, the optical waveguide chip 2020 includes above-described DFB lasers 2023, and an optical waveguide layer 2024. A structure in which two fitting grooves 2007 are formed in the clad layer of the optical waveguide layer 2024 is the same as described in the first embodiment. Spot size converters 2025 that make the diameter of light beams from the DFB lasers 2023 close to the diameter of cores in an optical waveguide layer 2008 of the optical waveguide chip 2021 are integrated near the connection end face of the optical waveguide layer 2024 to the optical waveguide chip 2021.

The optical waveguide chip 2020 is mounted such that the output light is connected to the core of the connection end face of the optical waveguide chip 2021 by the PPCP technique of the present invention. A structure in which fitting grooves 2007 and 2014 are formed in the clad layer of the optical waveguide layer 2008 of the optical waveguide chip 2021 is the same as described in the third embodiment. Light that has propagated through the optical waveguide layer 2008 of the optical waveguide chip 2021 is output from an end face on the opposite side of the optical waveguide chip 2020 to the optical fiber 2022 via a lens (not shown), or directly output to the optical fiber 2022.

The base substrate 2026 according to this embodiment is made of Si, a ceramic such as LTCC (Low Temperature Co-fired Ceramics), aluminum nitride, or the like. In one of the manufacturing process of the base substrate 2026 and the post-process (etching or machining), fitting grooves 2013a and 2015 to be fitted on the spacer optical fibers 2006 are formed.

When manufacturing the connection structure of the optical waveguide chips 2020 and 2021, two spacer optical fibers 2006 are fitted in one fitting groove 2013a on the side of the base substrate 2026, and simultaneously, a spacer optical fiber 2016 described in the third embodiment is fitted in the fitting groove 2015. Then, the spacer optical fibers 2006 and 2016 fitted in the fitting grooves 2013a and 2015 are fitted in the fitting grooves 2007 and 2014 on the side of the optical waveguide chip 2020 such that the joint surface of the base substrate 2026 and the joint surface of the optical waveguide chip 2020 face each other, thereby mounting the optical waveguide chip 2020 on the base substrate 2026. Similarly, the spacer optical fibers 2006 and 2016 fitted in the fitting grooves 2013a and 2015 are fitted in the fitting grooves 2007 and 2014 on the side of the optical waveguide chip 2021 such that the joint surface of the base substrate 2026 and the joint surface of the optical waveguide chip 2021 face each other, thereby mounting the optical waveguide chip 2021 on the base substrate 2026. The positions of the two optical waveguide chips 2020 and 2021 can thus uniquely be decided.

Conventionally, to mount a laser chip by active alignment, a complex mounting process is needed in which light is output from the laser chip, the light is input to the optical waveguide chip of the connection partner, and the output light of the optical waveguide chip is further monitored. To the contrary, in this embodiment, passive alignment mounting of the optical waveguide chips 2020 and 2021 can be implemented without outputting light from the optical waveguide chip 2020.

As described in the first embodiment, in addition to a light-emitting element such as a laser chip, this embodiment can be applied to any optical waveguide chip such as an optical functional element (a switch or a wavelength multiplexer/demultiplexer) having a light propagation/waveguide mechanism, an optical modulation element, a light-emitting element, a light-receiving element, a wavelength conversion element, or an optical amplification element. The embodiment can also be expanded to connection of different kinds of materials.

Principle of Sixth to Ninth Embodiments

Figure 7A:
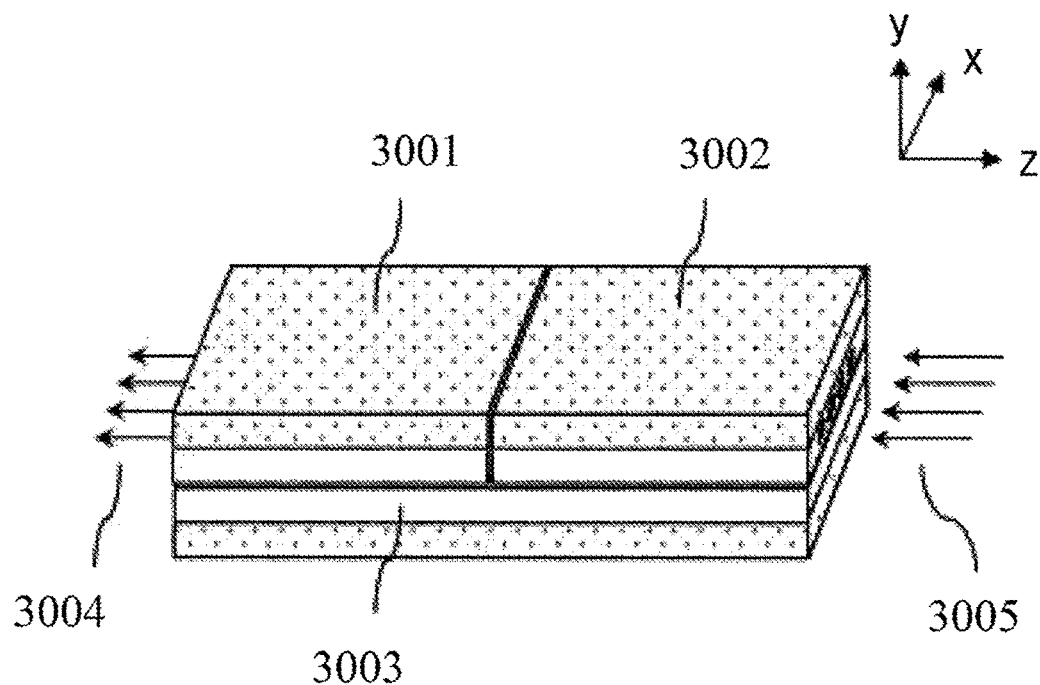
FIGS. 7A to 7D are schematic views showing a connection structure of optical waveguide chips as the base of the sixth to ninth embodiments of the present invention.
Figure 7B:
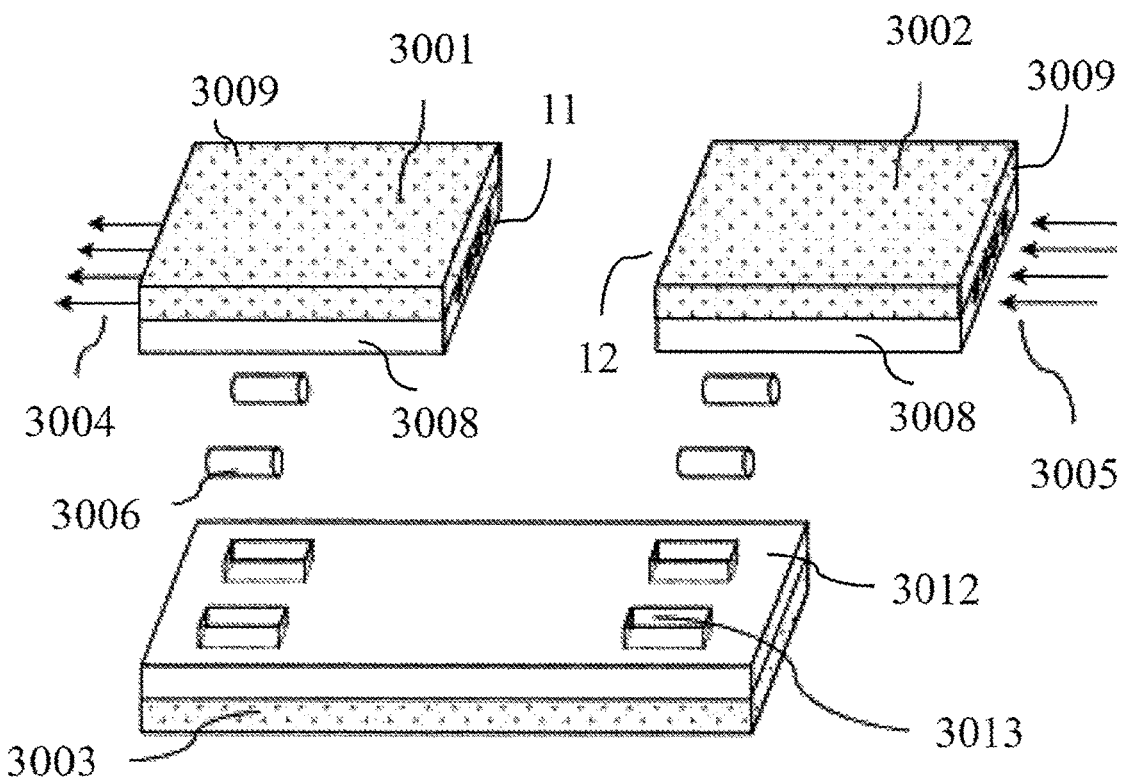
Figure 7C:
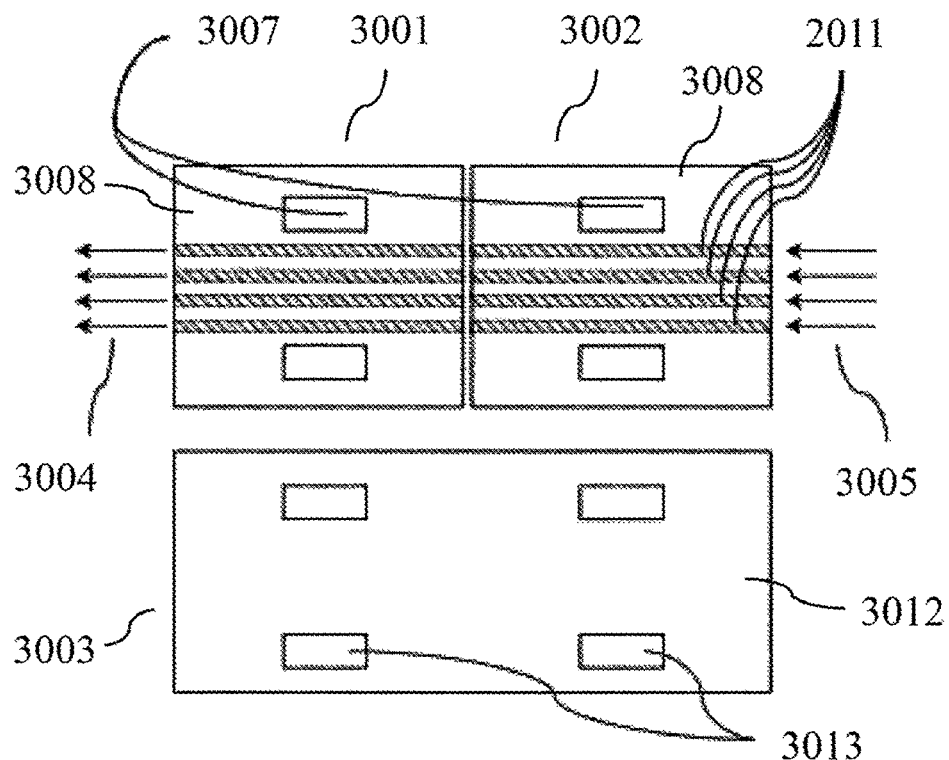
Figure 7D:
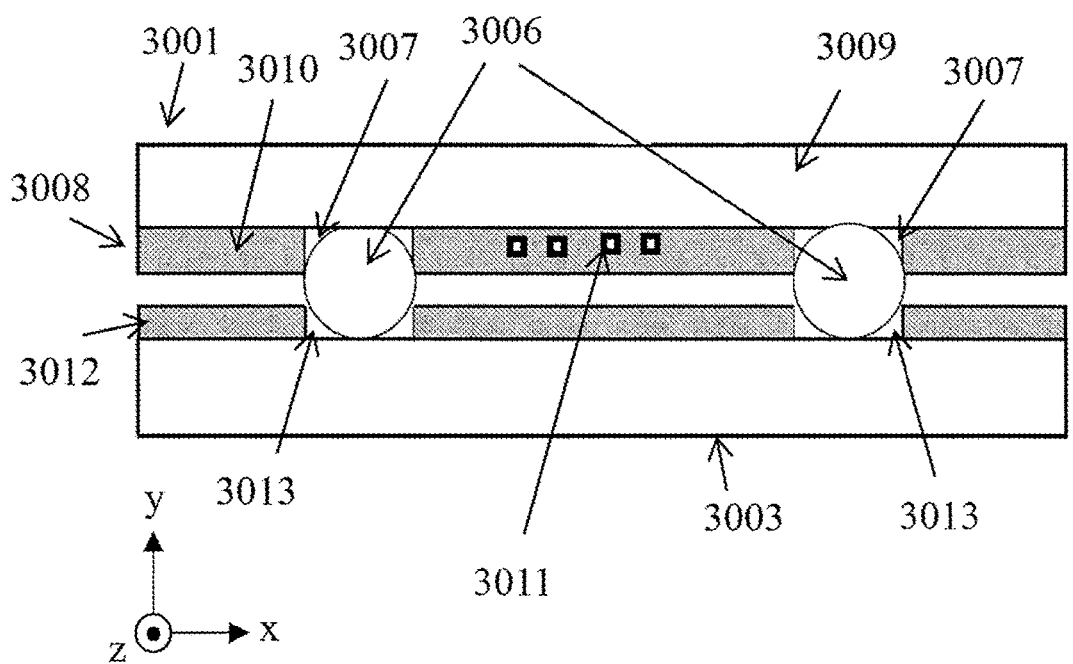

FIGS. 7A to 7D are schematic views showing a connection structure of optical waveguide chips as the base of the sixth to ninth embodiments of the present invention. FIG. 7A is a perspective view of the connection structure of optical waveguide chips, FIG. 7B is an exploded view of parts of the connection structure, FIG. 7C is a view showing the joint surfaces of optical waveguide chips and a base substrate, and FIG. 7D is a sectional view of the connection structure taken along an xy plane.

In FIGS. 7A to 7D, a total of seven members, that is, silica-based PLCs 3001 and 3002 that are two optical waveguide chips each formed by a silica glass layer including an Si substrate and a waveguide layer, a silica-based base substrate 3003 that is manufactured by the same method as the silica-based PLCs 3001 and 3002 and includes no waveguide, and four spacer optical fibers 3006 are combined, thereby forming a connection structure.

The connection structure shown in FIGS. 7A to 7D is configured to be able to propagate input optical signals 3005 via the silica-based PLCs 3001 and 3002 and output them as output optical signals 3004.

As shown in FIG. 7D, the silica-based PLC 3001 has a structure in which an optical waveguide layer 3008 is formed on an Si substrate 3009. The optical waveguide layer 3008 is formed by a clad layer 3010 made of silica glass, and cores 3011 formed in the clad layer 3010 and made of silica glass containing a dopant. In addition, fitting grooves 3007 each having a rectangular shape in a planar view are formed in the clad layer 3010. The structure of the silica-based PLC 3002 is the same as that of the silica-based PLC 3001. FIG. 7C shows the joint surfaces of the optical waveguide layers 3008 (clad layers 3010) of the silica-based PLCs 3001 and 3002 to the silica-based base substrate 3003. As is apparent from FIG. 7C, two fitting grooves 3007 are formed in one PLC.

As shown in FIGS. 7A and 7B, the silica-based PLC 3001 and the silica-based PLC 3002 are arranged side by side such that connection end faces 11 and 12 face each other. The two silica-based PLCs 3001 and 3002 are mounted on the silica-based base substrate 3003.

A silica glass layer 3012 made of the same material as the clad layers 3010 of the silica-based PLCs 3001 and 3002 is formed on the surface of the silica-based base substrate 3003 on which the silica-based PLCs 3001 and 3002 are mounted. In the silica glass layer 3012, fitting grooves 3013 having the same shape as the fitting grooves 3007 are formed at positions that face the fitting grooves 3007 of the silica-based PLCs 3001 and 3002 when mounting the silica-based PLCs 3001 and 3002 on the silica-based base substrate 3003 as will be described later.

FIG. 7C shows the joint surface of the silica glass layer 3012 to the silica-based PLCs 3001 and 3002. Since two fitting grooves 3007 are formed in one PLC, as described above, a total of four fitting grooves 3013, that is, two fitting grooves 3013 formed at positions facing the fitting grooves 3007 of the silica-based PLC 3001 and two fitting grooves 3013 formed at positions facing the fitting grooves 3007 of the silica-based PLC 3002 are formed in the silica glass layer 3012.

To manufacture the connection structure shown in FIG. 7A, the spacer optical fibers 3006 are respectively fitted in the four fitting grooves 3013 formed in the silica glass layer 3012 of the silica-based base substrate 3003. Then, the two spacer optical fibers 3006 fitted in the fitting grooves 3013 of the silica glass layer 3012 are fitted in the two fitting grooves 3007 formed in the optical waveguide layer 3008 of the silica-based PLC 3001 such that the joint surface of the silica glass layer 3012 and the joint surface of the optical waveguide layer 3008 (clad layer 3010) of the silica-based PLC 3001 face each other, as shown in FIG. 7B, that is, such that the Si substrate 3009 is located on the upper side, and the optical waveguide layer 3008 is located on the lower side, thereby mounting the silica-based PLC 3001 on the silica-based base substrate 3003.

Similarly, the two spacer optical fibers 3006 fitted in the fitting grooves 3013 of the silica glass layer 3012 are fitted in the two fitting grooves 3007 formed in the optical waveguide layer 3008 of the silica-based PLC 3002 such that the joint surface of the silica glass layer 3012 and the joint surface of the optical waveguide layer 3008 (clad layer 3010) of the silica-based PLC 3002 face each other, thereby mounting the silica-based PLC 3002 on the silica-based base substrate 3003.

In this way, the silica-based PLCs 3001 and 3002 can be mounted on the silica-based base substrate 3003 such that the connection end face 11 of the silica-based PLC 3001 and the connection end face 12 of the silica-based PLC 3002 face each other at close range, and the optical connection between the silica-based PLC 3001 and the silica-based PLC 3002 can be implemented.

As shown in FIG. 7A, the input optical signals 3005 that have entered the silica-based PLC 3002 propagate through the optical waveguide layer 3008 of the silica-based PLC 3002, exit from the silica-based PLC 3002, enter the silica-based PLC 3001, propagate through the optical waveguide layer 3008 of the silica-based PLC 3001, and exit from the silica-based PLC 3001 as the output optical signals 3004.

As is apparent from FIG. 7D, the fitting grooves 3007 of the optical waveguide layers 3008 of the silica-based PLCs 3001 and 3002 are formed up to positions reaching the Si substrate 3009 such that the Si substrate 3009 is exposed to the bottoms of the fitting grooves 3007. Similarly, the fitting grooves 3013 of the silica glass layer 3012 of the silica-based base substrate 3003 are formed up to positions reaching the silica-based base substrate 3003 such that the silica-based base substrate 3003 is exposed to the bottoms of the fitting grooves 3013.

This can reduce the influence of an error in the height direction of the optical waveguide layers 3008 of the silica-based PLCs 3001 and 3002 with respect to the silica-based base substrate 3003 when the spacer optical fibers 3006 are fitted in the fitting grooves 3007 and 3013. That is, when the optical waveguide layer 3008 is formed on the Si substrate 3009, an error occurs in the thickness of the optical waveguide layer 3008. However, since a polished, very flat substrate is used as the Si substrate 3009, the core positions from the Si substrate 3009 are accurately decided.

For this reason, as shown in FIG. 7D, the spacer optical fibers 3006 fitted in the fitting grooves 3007 come into contact with the Si substrate 3009 exposed to the bottoms of the fitting grooves 3007. In addition, the spacer optical fibers 3006 fitted in the fitting grooves 3013 come into contact with the silica-based base substrate 3003 exposed to the bottoms of the fitting grooves 3013. This makes it possible to decide the relative height of the core positions in the two silica-based PLCs 3001 and 3002 at a very high accuracy. Hence, a height accuracy of submicron level can be expected.

In addition, the fitting grooves 3007 and 3013 are formed by photolithography. Hence, the width (the dimension in the left-right direction of FIG. 7D), the length (the dimension in the left-right direction of FIGS. 7B and 7C), and the positions of the fitting grooves 3007 and 3013 can be decided at a very high accuracy. Accordingly, the axis deviation of the optical waveguide layer 3008 in the direction in the waveguide layer plane can be aligned at a very high accuracy.

In addition, the spacer optical fibers 3006 with the same diameter are fitted in the four fitting grooves 3013 on the side of the silica-based base substrate 3003, the fitting grooves 3007 on the side of the silica-based PLC 3001 are fitted on two of the four spacer optical fibers 3006, and the fitting grooves 3007 on the side of the silica-based PLC 3002 are fitted on the remaining two spacer optical fibers 3006. For this reason, the tilts of the silica-based PLCs 3001 and 3002 with respect to the silica-based base substrate 3003 can be made small enough to be neglected.

When the above-described structure is employed, the core positions in the two silica-based PLCs 3001 and 3002 with respect to the silica-based base substrate 3003 are decided at a high accuracy. An array of the cores 3011 is formed on each of the opposing connection end faces 11 and 12 of the two silica-based PLCs 3001 and 3002. When the silica-based PLCs 3001 and 3002 are mounted on the silica-based base substrate 3003, the positions of the cores 3011 in the two silica-based PLCs 3001 and 3002 are aligned on the same lines, and low-loss connection of light can be implemented. Simple multi-chip mounting can thus be implemented at an accuracy of submicron level by passive alignment mounting without inputting/outputting light.

In the connection structure shown in FIGS. 7A to 7D, however, since the optical waveguide chips are aligned by the accuracy of components such as the dimensions of the optical waveguide chips themselves, the positions of the grooves, the shape of the grooves, and the spacer shape, the necessary condition is that the accuracy of the components is high. The accuracy of the positions of the grooves can be made high by the photolithography technique. The accuracy of the shape of the grooves can be made high by optimization using etching or the like. The accuracy of the shape of the spacers can be relatively easily made high by selecting appropriate components. On the other hand, the accuracy of the dimensions of the optical waveguide chips themselves can be guaranteed by the machining method using dicing or the like. However, if the machining of the optical waveguide chips is performed by dicing, roughening may be caused on the connection end faces of the optical waveguide chips by the dicing.

When the gap between the adjacent optical waveguide chips (between the silica-based PLCs 3001 and 3002) is filled with a refractive index matching resin or the like, the influence of the roughening of the connection end faces of the optical waveguide chips can be reduced. However, if the gap between the optical waveguide chips is filled with an adhesive such as a refractive index matching resin to fix them, the reliability of the adhesive may be lowered by the roughening of the connection end faces of the optical waveguide chips. In addition, if chipping (cracking) occurs in the connection end faces of the optical waveguide chips by dicing or the like, the optical loss of the connection end faces may degrade.

Figure 8A:
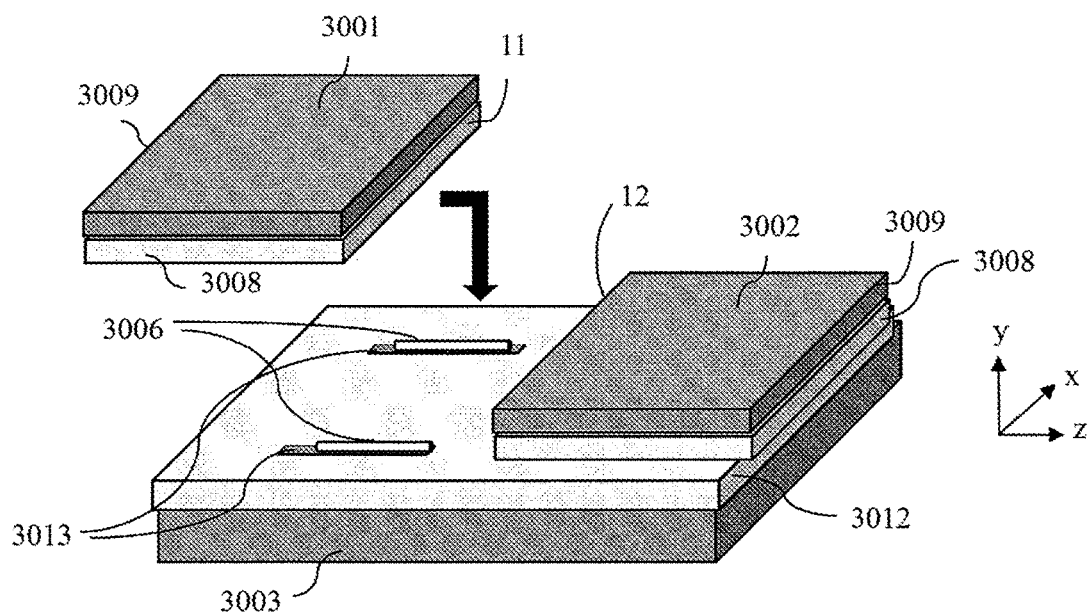
FIGS. 8A and 8B are views for explaining a problem of the connection structure of optical waveguide chips shown in FIGS. 7A to 7D.
Figure 8B:
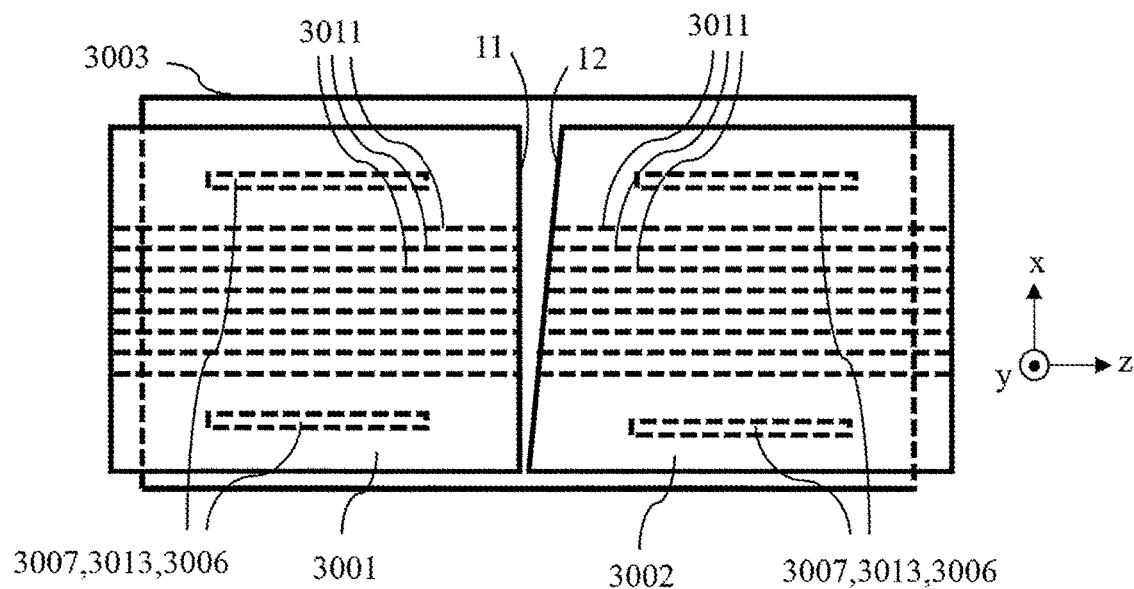

In conventional active alignment mounting, the connection end face of each optical waveguide chip is polished or etched after dicing to remove the roughening of the connection end face, thereby ensuring reliability. However, when the connection end face is polished, a polishing error is generated, and an angle deviation of the connection end face occurs. Hence, when additional machining of the connection end faces 11 and 12 of the optical waveguide chips (silica-based PLCs 3001 and 3002) is applied to the connection structure shown in FIGS. 7A to 7D, as shown in the perspective view of FIG. 8A and the plan view of FIG. 8B, errors are generated in the angles of the connection end faces 11 and 12 and the relative angles of the fitting grooves 3007 and 3013.

By the angle error, the gap between the two optical waveguide chips varies when the optical waveguide chips are mounted on the silica-based base substrate 3003, and, in the optical waveguide array formed in the optical waveguide layer 3008 of each optical waveguide chip, the chip connection loss of the core 3011 located in a portion where the gap is wide increases, and as a result, the loss difference in the optical waveguide array may increase.

Hence, in the present invention, based on the connection structure described with reference to FIGS. 7A to 7D, the influence of the angle error shift caused by the additional machining of the connection end faces is reduced.

Sixth Embodiment

Figure 9A:
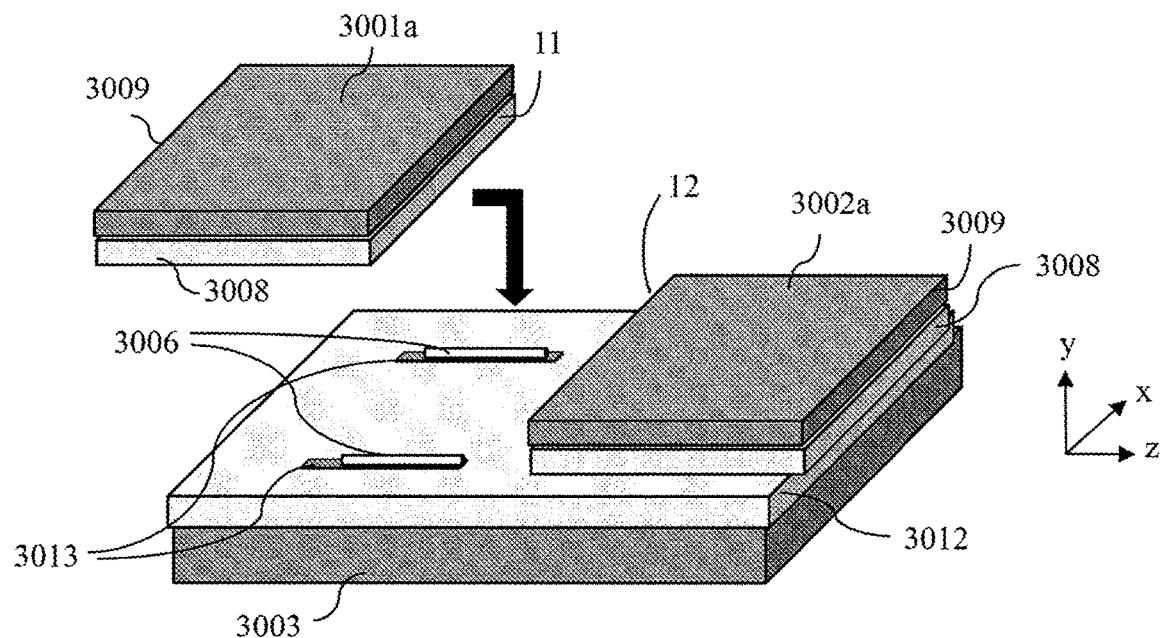
FIGS. 9A and 9B are schematic views showing a connection structure of optical waveguide chips according to the sixth embodiment of the present invention.
Figure 9B:
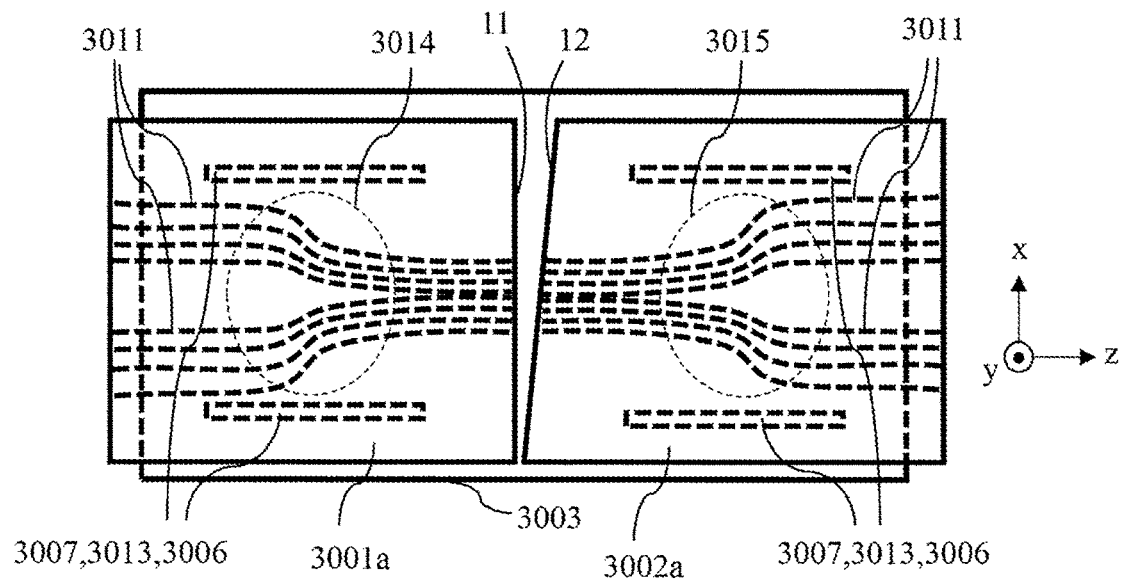

An optical connection structure according to the sixth embodiment of the present invention will be described below. FIGS. 9A and 9B are schematic views showing a connection structure of optical waveguide chips according to the sixth embodiment of the present invention, and the same reference numerals as in FIGS. 7A to 7D, 8A, and 8B denote the same components in FIGS. 9A and 9B. FIG. 9A is a perspective view of a connection structure of optical waveguide chips, and FIG. 9B is a plan view of the connection structure viewed from the upper side.

Note that various kinds of functional circuits configured to process a signal, such as a switch and a wavelength multiplexer/demultiplexer, are mounted as needed on an optical waveguide chip. However, this embodiment does not depend on the circuit arrangement in the optical waveguide chip and the functions of the circuits. In fact, an appropriate optical circuit is formed in the optical waveguide chip in an arrangement to avoid fitting grooves. However, since this embodiment does not depend on the arrangement of the circuit, FIGS. 9A and 9B show an example including only a linear waveguide, and other circuit arrangements are omitted for the sake of simple description.

Like the above-described silica-based PLCs 3001 and 3002, each of silica-based PLCs 3001a and 3002a has a structure in which an optical waveguide layer 3008 is formed on an Si substrate 3009. The structure of the optical waveguide layer 3008 is the same as described with reference to FIGS. 7A to 7D. Fitting grooves 3007 are formed in the clad layer of the optical waveguide layer 3008. Like the silica-based PLCs 3001 and 3002, two fitting grooves 3007 are formed in each of the silica-based PLCs 3001a and 3002a.

The structure of a silica-based base substrate 3003 is the same as described with reference to FIGS. 7A to 7D. In addition, a method of mounting the silica-based PLCs 3001a and 3002a on the silica-based base substrate 3003 and implementing optical connection between the silica-based PLCs 3001a and 3002a is the same as the method described with reference to FIGS. 7A to 7D, and a description thereof will be omitted.

The fitting grooves 3007 on the side of the silica-based PLCs 3001a and 3002a are formed up to such a depth that the Si substrate 3009 is exposed to the bottoms of the fitting grooves 3007, and spacer optical fibers 3006 (spacer members) fitted in the fitting grooves 3007 come into contact with the Si substrate 3009. Similarly, fitting grooves 3013 on the side of the silica-based base substrate 3003 are formed up to such a depth that the silica-based base substrate 3003 is exposed to the bottoms of the fitting grooves 3013, and the spacer optical fibers 3006 fitted in the fitting grooves 3013 come into contact with the silica-based base substrate 3003. Accordingly, a height accuracy of submicron level can be expected.

Additionally, in this embodiment, the longitudinal direction of the fitting grooves 3007 and 3013 is set in parallel to the Z-axis direction (the optical axis direction of light that exits from the silica-based PLC 3002a to the silica-based PLC 3001a and the optical axis direction of light that enters the silica-based PLC 3001a or the left-right direction of FIGS. 9A and 9B). As the spacer members, the cylindrical spacer optical fibers 3006 each having a diameter of 125 μm are used. The length of the spacer optical fibers 3006 in the Z-axis direction is set to be less than the length of the fitting grooves 3007 and 3013. Hence, in this embodiment, the silica-based PLCs 3001a and 3002a can be slide-adjusted in the Z-axis direction even after mounting.

Accordingly, the silica-based PLCs 3001a and 3002a can be slid and adjusted in the Z-axis direction such that the gap between the silica-based PLCs 3001a and 3002a becomes as small as possible. The smaller the gap between the silica-based PLCs 3001a and 3002a is, the smaller the optical loss is. Hence, connection of a lower loss can be implemented by making the silica-based PLCs 3001a and 3002a have a slide-adjustable structure.

On the other hand, the gap between the silica-based PLCs 3001a and 3002a is filled with an adhesive (not shown) after mounting to fix them. At this time, connection end faces 11 and 12 (incident/exit end faces) of the silica-based PLCs 3001a and 3002a, which face each other, are accurately polished by mechanical polishing in advance. With this mechanical polishing, roughening of the connection end faces 11 and 12 becomes small enough to be neglected, and chipping (cracking) caused by dicing does not exist. As a result, it is possible to improve the reliability of the adhesive after the gap between the silica-based PLCs 3001a and 3002a is filled with it to fix them.

However, as described above, a slight angle error may be generated in the connection end faces 11 and 12 by polishing. In the example shown in FIG. 9B, the tilt of the connection end face 12 is illustrated large to make it easy to understand. The actual angle error in the connection end faces 11 and 12 in the substrate plane is on a sub-degree order, and is, for example, about 0.4°.

However, even with this degree of angle error, there is a fear that the interval between the silica-based PLCs 3001a and 3002a varies between cores 3011 in the optical waveguide array, and the dependence of loss on the optical waveguide ports (the incident/exit end faces of the cores 3011) increases. That is, there is a fear that the influence becomes large as the number of cores 3011 in the optical waveguide array in the optical waveguide layer 3008 becomes large, as the pitch between the cores 3011 becomes large, and as the width of the connection end faces 11 and 12 in the X-axis direction (the direction perpendicular to the optical axis direction in the substrate plane) becomes large.

In this embodiment, pitch conversion portions 3014 and 3015 that make the X-axis direction interval between the cores 3011 of the optical waveguide arrays on the connection end faces 11 and 12 narrower than the X-axis direction interval between the cores 3011 in portions apart from the connection end faces 11 and 12 are provided near the connection end faces 11 and 12 of the silica-based PLCs 3001a and 3002a. In this embodiment, the X-axis direction interval between the cores 3011 of the optical waveguide array on the connection end faces 11 and 12 is set to about 20 μm.

The interval between the optical waveguides (cores 3011) in the optical waveguide array can be made arbitrarily narrow within such a range that confinement of optical propagation in the optical waveguide can sufficiently be ensured and crosstalk caused by light leakage from other optical waveguides does not influence. For example, in a case of, for example, an Si waveguide array using Si for cores, since the light confinement effect is sufficiently large, the interval between the optical waveguides can be made narrower. According to this embodiment, it is possible to reduce an increase in the loss caused by the angle error of the connection end faces 11 and 12 and variations in the loss between the optical waveguide ports.

In the structure shown in FIGS. 7A to 7D, if eight optical waveguide ports exist at an optical waveguide interval of about 250 pm, the X-axis direction interval between the two ends of the optical waveguide array is 1.75 mm. Here, if the width of the siica-based PLCs 3001a and 3002a in the X-axis direction is 8 mm, and the actual angle error in the connection end faces 11 and 12 in the substrate plane (in the sheet surface of FIG. 9B) is 0.4° with respect to the design value, a difference of about 8×tan(0.4°)=55 µm is generated in the gap between the siica-based PLCs 3001a and 3002a between the narrowest portion and the widest portion. A difference of about 12 µm is generated in the gap between the optical waveguide port of the siica-based PLC 3001a and the optical waveguide port of the silica-based PLC 3002a between the narrowest portion and the widest portion.

On the other hand, in this embodiment, since the X-axis direction interval between the cores 3011 of the optical waveguide array is set to 20 µm, the X-axis direction interval between the two ends of the optical waveguide array becomes 140 µm. Hence, the difference in the gap between the optical waveguide port of the silica-based PLC 3001a and the optical waveguide port of the silica-based PLC 3002a is about 1 µm between the narrowest portion and the widest portion.

With the employment of the above-described structure, in this embodiment, when the silica-based PLCs 3001a and 3002a are mounted on the silica-based base substrate 3003, the positions of the cores 3011 in the two silica-based PLCs 3001a and 3002a are aligned on the same lines, and low-loss connection of light can be implemented. In this embodiment, simple multi-chip mounting can thus be implemented at an accuracy of submicron level by passive alignment mounting without inputting/outputting light.

Additionally, in this embodiment, the pitch conversion portions 3014 and 3015 are provided near the connection end faces 11 and 12 of the siica-based PLCs 3001a and 3002a. This makes it possible to reduce an increase in the loss due to the axis deviation and gap expansion between the silica-based PLCs 3001a and 3002a caused by the angle error of the connection end faces 11 and 12 and variations in the loss between the optical waveguide ports, and reduce the influence of the angle error of the connection end faces 11 and 12.

Note that in this embodiment, an example in which the silica glass layer 3012 of the silica-based base substrate 3003 is manufactured by the same process as that of the optical waveguide layers 3008 of the silica-based PLCs 3001a and 3002a has been described. However, the silica glass layer 3012 may be manufactured by another manufacturing method. For example, the same effect as described above can be obtained even by V-groove machining or machining using dicing or the like or laser machining as long as uniform fitting grooves 3007 and 3013 can be formed. In addition, the base substrate need not always include the optical waveguide layer, and it is only necessary that the width and depth of the fitting grooves 3013 are the same as those of the fitting grooves 3007 on the chip side. For example, as for the base substrate, the fitting grooves 3013 may be formed by machining such as dicing or an etching technique on an Si substrate, a glass substrate, a ceramic substrate, or a metal substrate.

Additionally, in this embodiment, the silica-based PLCs 3001a and 3002a are only placed on the silica-based base substrate 3003 in a form in which they are supported by the spacer optical fibers 3006, but are not fixed. For this reason, the silica-based PLCs 3001a and 3002a are detachable from the silica-based base substrate 3003, and pluggable connection can be implemented in which the necessary silica-based PLCs 3001a and 3002a can be connected only when necessary, like a connector. This form is called a PPCP, as described above.

In some cases, the silica-based PLCs 3001a and 3002a may be fixed to the silica-based base substrate 3003 by filling the gap between the silica-based base substrate 3003 and the silica-based PLCs 3001a and 3002a with an optical adhesive of a matching refractive index. Alternatively, one silica-based PLC of the two silica-based PLCs 3001a and 3002a may be fixed to the silica-based base substrate 3003, and the other may be detachable.

Seventh Embodiment

Figure 10A:
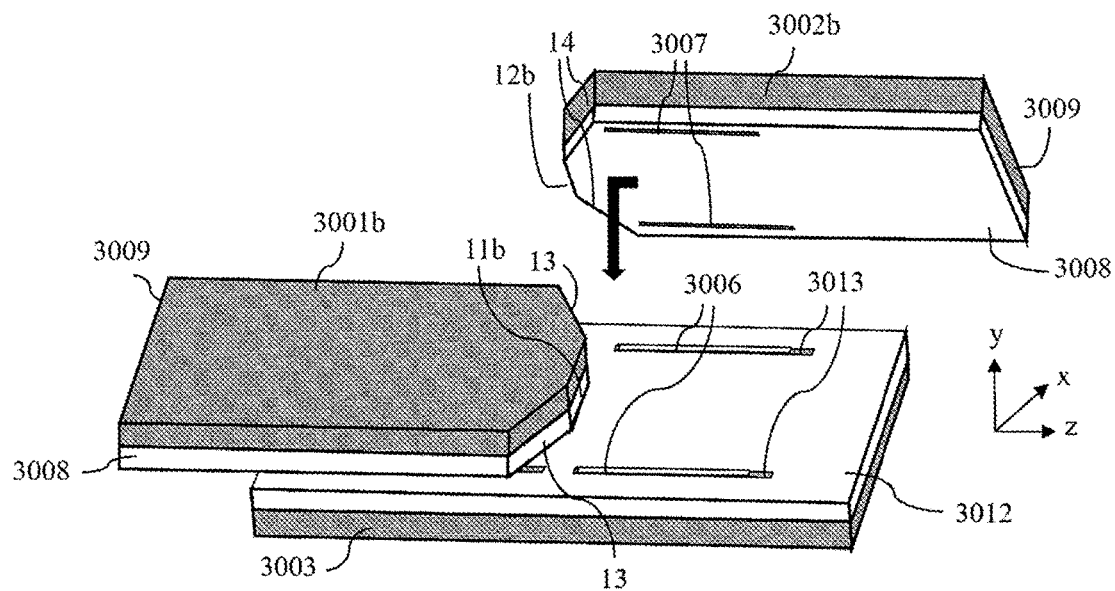
FIGS. 10A and 10B are schematic views showing a connection structure of optical waveguide chips according to the seventh embodiment of the present invention.
Figure 10B:
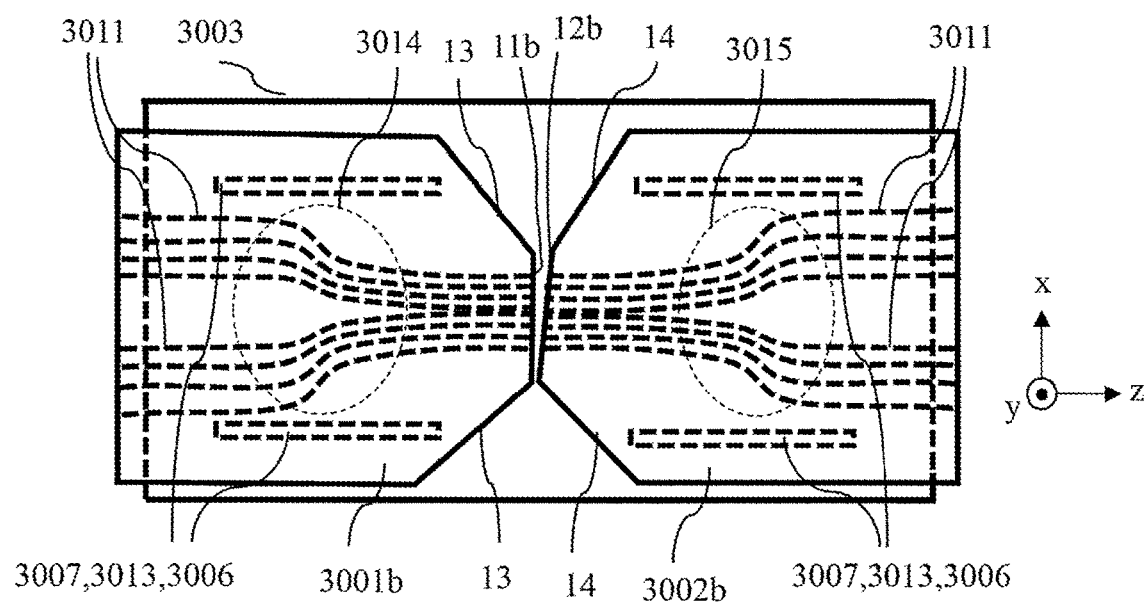

The seventh embodiment of the present invention will be described next. FIGS. 10A and 10B are schematic views showing a connection structure of optical waveguide chips according to the seventh embodiment of the present invention, and the same reference numerals as in FIGS. 7A to 7D, 8A, 8B, 9A, and 9B denote the same components in FIGS. 10A and 10B. FIG. 10A is a perspective view of a connection structure of optical waveguide chips, and FIG. 10B is a plan view of the connection structure viewed from the upper side.

In silica-based PLCs 3001b and 3002b according to this embodiment, notches 13 and 14 are added, in the silica-based PLCs 3001a and 3002a according to the sixth embodiment, to the corners of connection end faces (incident/exit end faces) 11b and 12b such that the opposing areas of the connection end faces 11b and 12b become small.

In this embodiment, the following effect can be obtained by adding the notches 13 and 14. In the sixth embodiment, the interval between the cores 3011 of the optical waveguide arrays in the connection end faces 11 and 12 is narrowed, thereby making the difference in the gap between the silica-based PLCs 3001a and 3002a caused by the angle error of the connection end faces 11 and 12 relatively small. However, if the angle error of the connection end faces 11 and 12 in the substrate plane (in the sheet surface of FIG. 9B) is 0.4° with respect to the design value, a difference of about 50 µm still exist in the gap between the silica-based PLCs 3001a and 3002a between the narrowest portion and the widest portion.

On the other hand, in this embodiment, relative to the X-axis direction width of 8 mm in the silica-based PLCs 3001a and 3002a, the notches 13 and 14 are provided on the connection end faces 11b and 12b such that the X-axis direction width of the connection end faces 11b and 12b of the silica-based PLCs 3001b and 3002b becomes smaller, that is, 4 mm, thereby processing each of the silica-based PLCs 3001a and 3002a into a hexagonal shape in a planar view. Accordingly, in this embodiment, even if the angle error of the connection end faces 11b and 12b in the substrate plane is 0.4°, as described above, the difference in the gap between the connection end faces 11*b* and 12*b* can be 28 µm between the narrowest portion and the widest portion.

In this embodiment, for the gap between the silica-based PLCs 3001*b* and 3002*b*, the relative gap difference can be made small by pitch conversion portions 3014 and 3015, and additionally, the absolute gap difference is made small by the notches 13 and 14. As a result, it is possible to decrease the connection loss between the silica-based PLCs 3001*b* and 3002*b* and further decrease the loss difference between the optical waveguide ports.

The notches 13 and 14 can be formed by dicing. In addition, the arbitrary notches 13 and 14 can be provided using a laser dicing technique or the like. Furthermore, it can easily be seen that the shape and angle of the notches 13 and 14 can arbitrarily be set if it is possible to obtain the effect of this embodiment.

Figure 11:
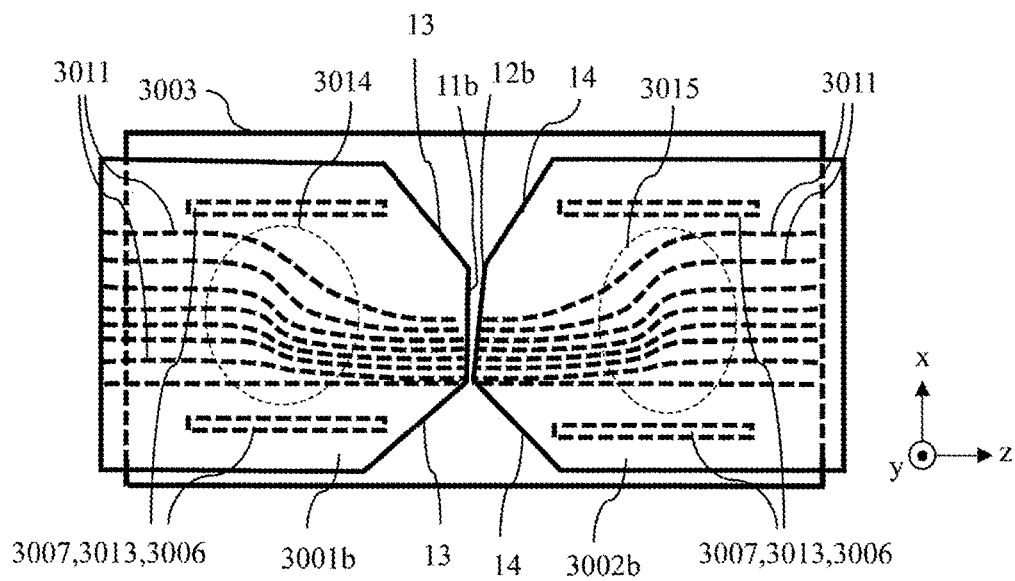
FIG. 11 is a plan view showing another example of the pitch conversion portions of the optical waveguide chips according to the seventh embodiment of the present invention.

As for the pitch conversion portions 3014 and 3015, in the examples shown in FIGS. 9B and 10B, the cores 3011 of the optical waveguide arrays are concentrated at the center, and the cores 3011 are arranged to be symmetric with respect to the center line of the silica-based PLCs 3001*b* and 3002*b* (3001*a* and 3002*a*) in the optical axis direction (Z-axis direction). However, the pitch conversion portions 3014 and 3015 can have an arbitrary layout. As shown in the plan view of FIG. 11, the cores 3011 may be arranged to be asymmetric with respect to the center line of the silica-based PLCs 3001*b* and 3002*b* (3001*a* and 3002*a*) in the optical axis direction.

In addition, arranging the connection end faces 11*b* and 12*b* at the center of the silica-based PLCs 3001*b* and 3002*b* is not always necessary. The pitch conversion portions 3014 and 3015 may be provided near one-side ends of the ends of the silica-based PLCs 3001*b* and 3002*b* in the X-axis direction, and notches may be provided in the silica-based PLCs 3001*b* and 3002*b* to leave the ends as connection end faces. That is, notches may be provided only at one-side corners of the connection end faces 11*b* and 12*b* in the X-axis direction.

Figure 12:
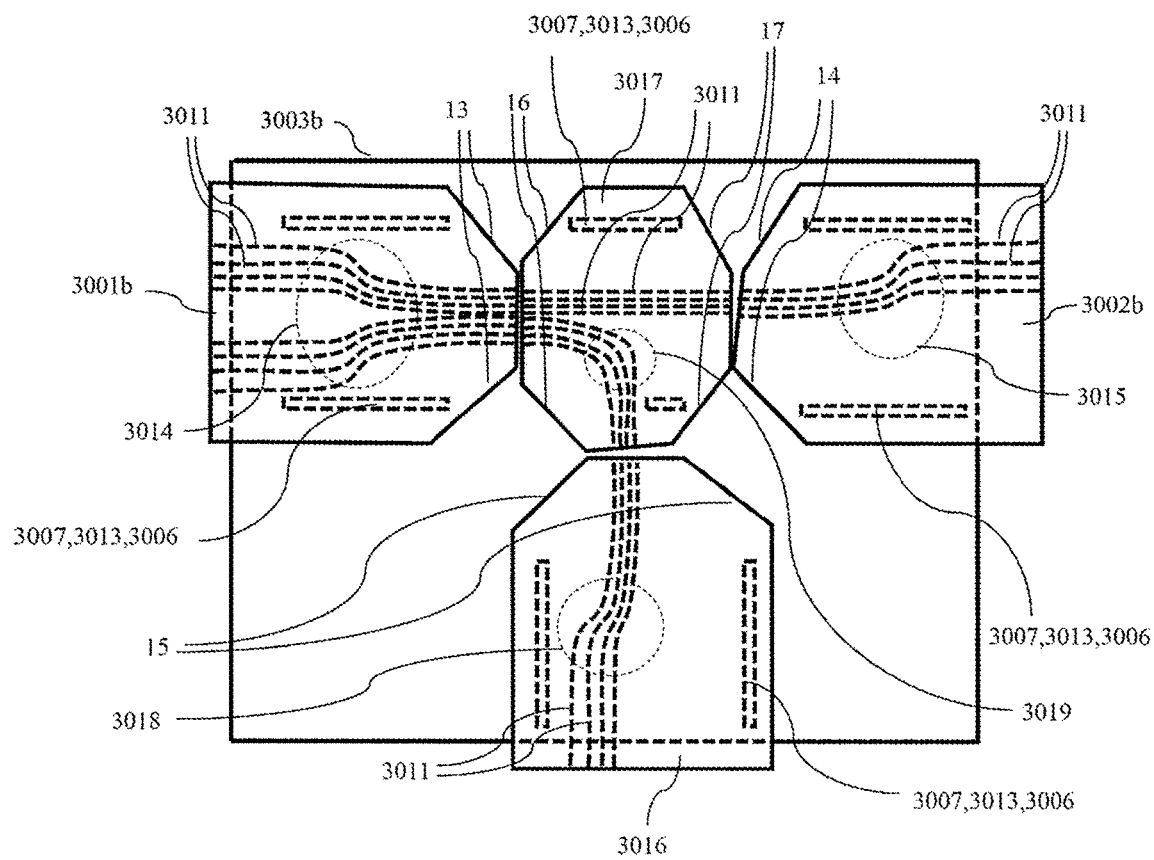
FIG. 12 is a plan view showing another connection structure of optical waveguide chips according to the seventh embodiment of the present invention.

In addition, the number of optical waveguide chips is not always limited to connection of two chips, and three optical waveguide chips may be mounted by the PPCP technique, or four optical waveguide chips may be mounted by the PPCP technique, as shown in FIG. 12. FIG. 12 is a plan view showing a connection structure with four silica-based PLCs 3001*b*, 3002*b*, 3016, and 3017 mounted on the silica-based base substrate 3003*b* viewed from the upper side. In this example, each of the four silica-based PLCs 3001*b*, 3002*b*, 3016, and 3017 is mounted by the passive alignment method as in the sixth embodiment.

The structure of each of the silica-based PLCs 3001*b* and 3002*b* is the same as described above. The silica-based PLC 3016 corresponds to a structure obtained by rotating the silica-based PLC 3002*b* by 90° in the substrate plane. A pitch conversion portion 3018 and notches 15 of the connection end faces to the silica-based PLC 3017 are formed on the silica-based PLC 3016. A pitch conversion portion 3019, notches 16 provided on the connection end face to the silica-based PLC 3001*b* and the connection end face to the silica-based PLC 3016, and notches 17 provided on the connection end face to the silica-based PLC 3002*b* and the connection end face to the silica-based PLC 3016 are formed on the silica-based PLC 3017.

By the structure as shown in FIG. 12, a three-forked waveguide connection structure can be implemented. In the sixth and seventh embodiments, an example of only simple waveguide connection is shown. However, an arbitrary optical function structure may be integrated. For example, a switch, a wavelength multiplexer/demultiplexer, a polarization integration function, a Mach-Zehnder interference circuit, a ring resonator, a phase adjustment circuit, or the like may be provided. Alternatively, a laser including a waveguide mechanism, a photodiode, or the like may be provided. In addition, a waveguide with a large nonlinear effect may be used.

Eighth Embodiment

Figure 13:
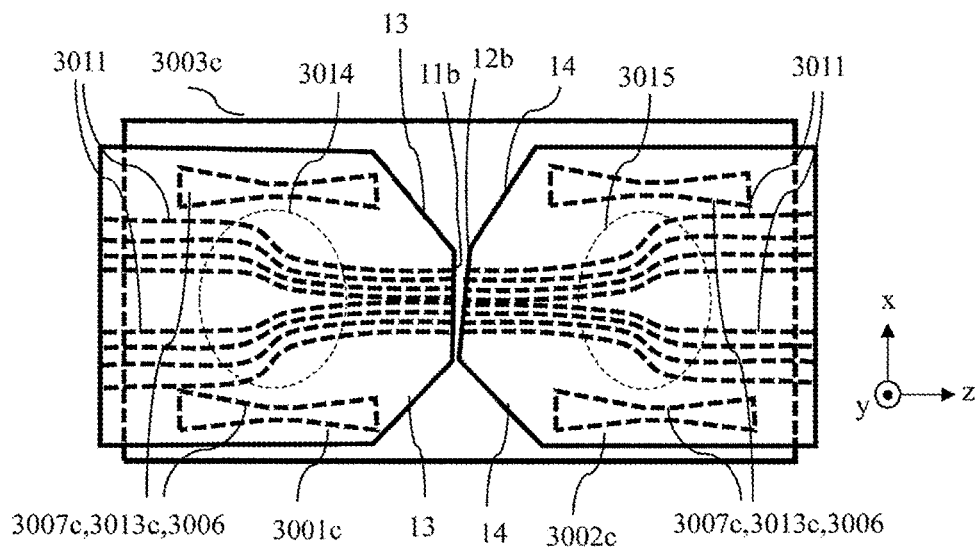
FIG. 13 is a plan view showing a connection structure of optical waveguide chips according to the eighth embodiment of the present invention.

The eighth embodiment of the present invention will be described next. FIG. 13 is a plan view showing a connection structure of optical waveguide chips according to the eighth embodiment of the present invention, and the same reference numerals as in FIGS. 7A to 7D, 8A, 8B, 9A, and 9B, 10A, 10B, and 11 denote the same components in FIG. 13.

Silica-based PLCs 3001*c* and 3002*c* according to this embodiment have the same structure as the silica-based PLCs 3001*b* and 3002*b* according to the seventh embodiment except the shape of fitting grooves 3007*c*. A silica-based base substrate 3003*c* has the same structure as the silica-based base substrate 3003 except the shape of fitting grooves 3013*c*.

Figure 14A:
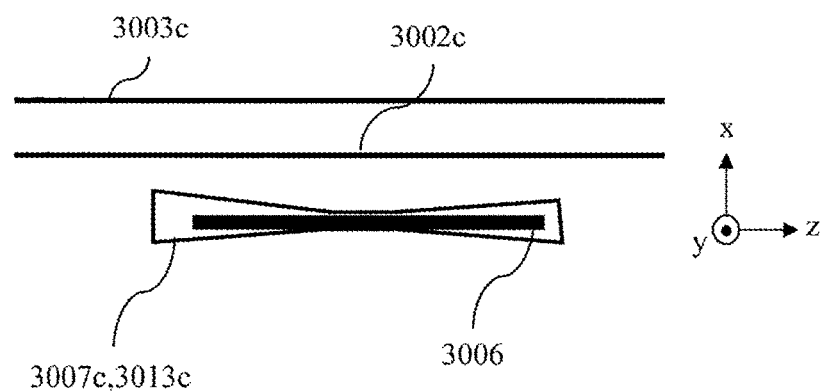
FIGS. 14A and 14B are plan views showing the shape of the fitting grooves of the optical waveguide chip and a silica-based base substrate according to the eighth embodiment of the present invention.
Figure 14B:
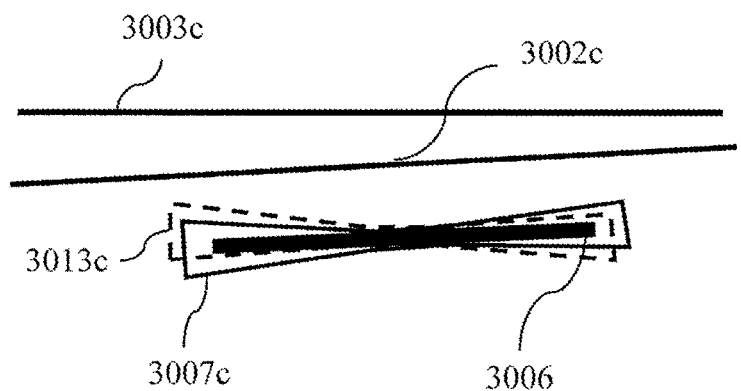

FIGS. 14A and 14B are plan views showing the shape of the fitting grooves 3007*c* and 3013*c*. The fitting grooves 3007*c* each have such a shape that the longitudinal direction is parallel to the Z-axis direction (the optical axis direction and the left-right direction of FIGS. 13, 14A, and 14B), and the width in the X-axis direction (the direction perpendicular to the optical axis direction in the substrate plane) changes along the longitudinal direction.

The width of the narrowest portion in the central portion of the fitting groove 3007*c* is set such that it is in contact with a spacer optical fiber 3006 when the spacer optical fiber 3006 is fitted in the fitting groove 3007*c*. The central portion contributes to alignment of the silica-based PLCs 3001*c* and 3002*c* in the in-plane direction at the time of fitting. On the other hand, the width of the fitting groove 3007*c* other than the central portion is smaller than the width of the spacer optical fiber 3006, and the width becomes large as the point separates from the central portion along the longitudinal direction. In addition, the length of the fitting groove 3007*c* is set to be longer than the spacer optical fiber 3006.

The fitting grooves 3013*c* formed in a silica glass layer 3012 of the silica-based base substrate 3003*c* are formed in the same shape as the fitting grooves 3007*c* at positions facing the fitting grooves 3007*c* when mounting the silica-based PLCs 3001*c* and 3002*c* on the silica-based base substrate 3003*c*.

Changing the fitting grooves to the shape of the fitting grooves 3007*c* and 3013*c* can easily be implemented by changing the mask of lithography.

When the fitting grooves 3007*c* and 3013*c* are formed, in this embodiment, the following remarkable effect can be obtained. If the angle error of connection end faces 11*b* and 12*b* of the silica-based PLCs 3001*c* and 3002*c* in the substrate plane is small, the spacer optical fibers 3006 are fitted in the fitting grooves 3007*c* and 3013*c* such that the longitudinal direction of the spacer optical fiber 3006 becomes parallel to the longitudinal direction of the fitting grooves 3007*c* and 3013*c*, as shown in FIG. 14A.

On the other hand, if the angle error of the connection end faces 11*b* and 12*b* of the silica-based PLCs 3001*c* and 3002*c* in the substrate plane is large, fine adjustment can be done to make the angle error of the connection end faces 11*b* and 12b small. More specifically, after the silica-based PLCs 3001c and 3002c are mounted on the silica-based base substrate 3003c, at least one of the two silica-based PLCs 3001c and 3002c is rotated in the substrate surface such that the gap between the silica-based PLCs 3001c and 3002c becomes small.

With the above-described structure, each spacer optical fiber 3006 is fitted in the corresponding fitting grooves 3007c and 3013c at the center of the fitting grooves 3007c and 3013c. At a portion apart from the center, a gap exists between the fitting grooves 3007c and 3013c and the spacer optical fiber 3006. Hence, the silica-based PLCs 3001c and 3002c can be rotated in the substrate plane. In the example shown in FIG. 14B, the silica-based PLC 3002c is rotated to make the gap between the silica-based PLCs 3001c and 3002c small.

As described above, in this embodiment, passive alignment mounting described in the sixth and seventh embodiments can be implemented. In addition, even if the angle error of the connection end faces exists, it is possible to reduce the influence as much as possible and reduce an increase in the loss due to the axis deviation and gap expansion between the silica-based PLCs 3001c and 3002c and variations in the loss between the optical waveguide ports.

Ninth Embodiment

Figure 15A:
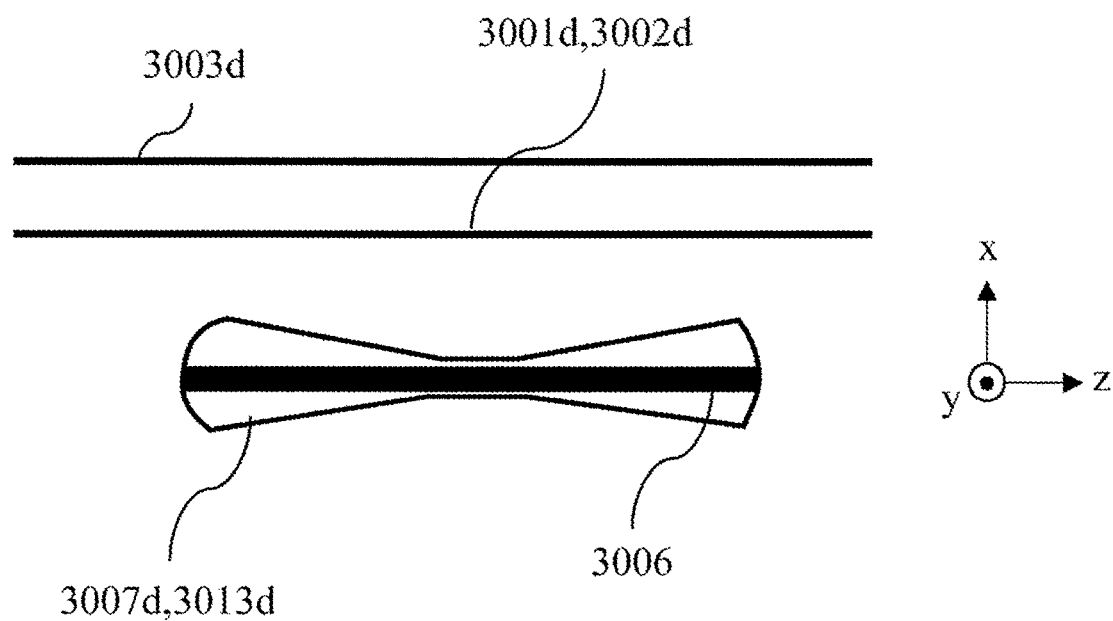
FIGS. 15A and 15B are plan views showing the shape of the fitting grooves of an optical waveguide chip and a silica-based base substrate according to the ninth embodiment of the present invention.
Figure 15B:
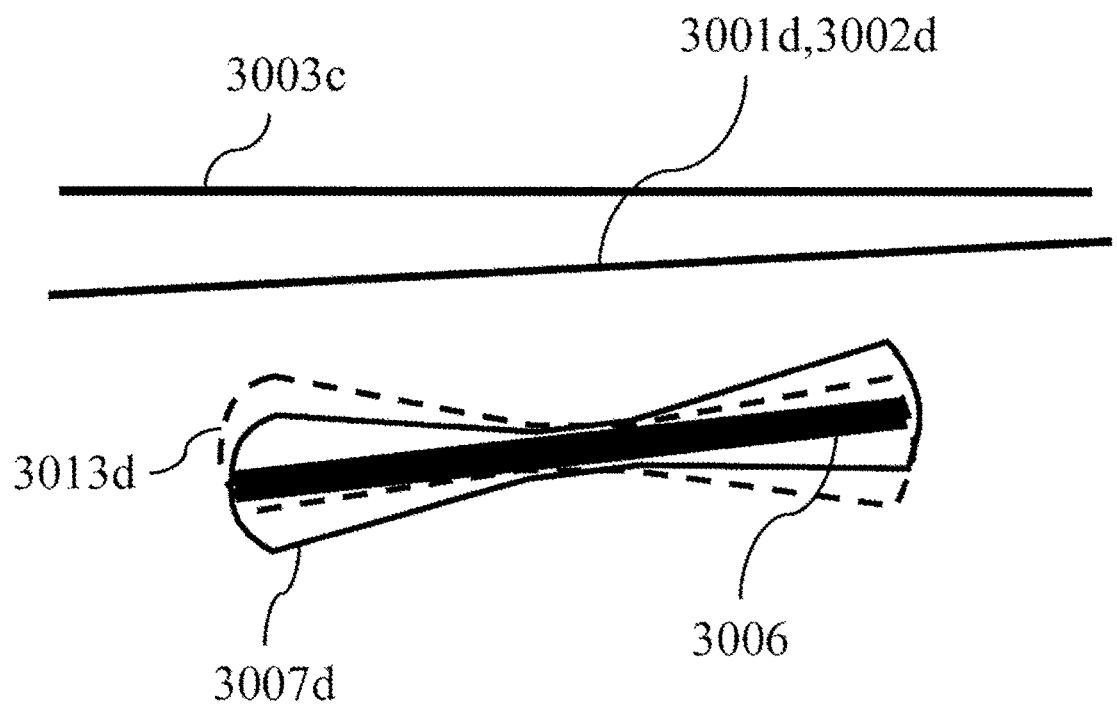

The ninth embodiment of the present invention will be described next. FIGS. 15A and 15B are plan views showing the shape of the fitting grooves of an optical waveguide chip and a silica-based base substrate according to the ninth embodiment of the present invention, and the same reference numerals as in FIGS. 13, 14A, and 14B denote the same components in FIGS. 15A and 15B.

Silica-based PLCs 3001d and 3002d according to this embodiment have the same structure as the silica-based PLCs 3001c and 3002c according to the eighth embodiment except the shape of fitting grooves 3007d. A silica-based base substrate 3003d has the same structure as the silica-based base substrate 3003c except the shape of fitting grooves 3013d.

In each fitting groove 3007d, the longitudinal direction is parallel to the Z-axis direction, and the X-axis direction width of the narrowest portion at the central portion is a width corresponding to a spacer optical fiber 3006, and the width becomes large as the point separates from the central portion along the longitudinal direction, like the fitting grooves 3007c.

The fitting grooves 3013d formed in a silica glass layer 3012 of the silica-based base substrate 3003d are formed in the same shape as the fitting grooves 3007d at positions facing the fitting grooves 3007d when mounting the silica-based PLCs 3001d and 3002d on the silica-based base substrate 3003d.

Accordingly, as in the eighth embodiment, after the silica-based PLCs 3001d and 3002d are mounted on the silica-based base substrate 3003d, at least one of the two silica-based PLCs 3001d and 3002d can be rotated in the substrate surface such that the gap between the silica-based PLCs 3001d and 3002d becomes small, and the effect described in the eighth embodiment can be obtained (FIG. 15B).

The fitting groove 3007d and the fitting groove 3007c are different in that the two ends in the longitudinal direction have an arc shape in a planar view. That is, the arc has a predetermined distance in the substrate plane from the center of the fitting groove 3007d. The distance in the substrate plane between the arcs of the two ends in the longitudinal direction is set such that the two ends of the fitting groove 3007d and the two ends of the spacer optical fiber 3006 come into contact when the spacer optical fiber 3006 is fitted in the fitting groove 3007d.

The length of the fitting grooves 3007c described in the eighth embodiment is set to be longer than the spacer optical fibers 3006. For this reason, there is a fear that when the silica-based PLCs 3001c and 3002c are rotated in the substrate plane, the positions of the silica-based PLCs 3001c and 3002c in the Z-axis direction shift.

On the other hand, in this embodiment, when the spacer optical fibers 3006 are fitted in the fitting grooves 3007d, the two ends of each fitting groove 3007d are always in contact with the spacer optical fiber 3006. For this reason, even if the silica-based PLCs 3001d and 3002d are rotated in the substrate plane after the silica-based PLCs 3001d and 3002d are mounted on the silica-based base substrate 3003d, the positions of the silica-based PLCs 3001d and 3002d in the Z-axis direction do not shift, and more accurate passive alignment mounting can be performed.

Because of the characteristics of process of photolithography, it is difficult to form the two ends of each of the fitting grooves 3007d and 3013d into a perfect arc shape. However, based on the resolution of lithography, each of the fitting grooves 3007d and 3013d is formed into a polygonal shape in a planar view such that a pseudo-arc shape in which the distance in the substrate plane from the center of the fitting groove 3007d or 3013d is almost constant is obtained, thereby obtaining an effect comparable to that of a perfect arc shape.

Note that examples in which the eighth and ninth embodiments are applied to the seventh embodiment have been described concerning FIGS. 13, 14A, 14B, 15A, and 15B. However, the embodiments may be applied to the sixth embodiment, as a matter of course.

In the sixth to ninth embodiments, the description has been made by exemplifying, as an optical waveguide chip, a planar lightwave circuit (PLC) of a thin glass film formed on a silicon substrate. However, the present invention can be applied to any optical waveguide chip including a waveguide mechanism. For example, as the material of the substrate or the optical waveguide, quartz, a polymer made of an organic substance, a semiconductor or a compound semiconductor waveguide using Si, silicon nitride (SiN), gallium arsenide, indium phosphide (InP), or the like, and a dielectric such as lithium niobate (LN), periodically poled lithium niobate (PPLN), or lithium tantalate (LT) can be used in addition to silica glass.

In the sixth to ninth embodiments, two or more fitting grooves 3007, 3007c, or 3007d suffice per PLC. The fitting grooves 3013, 3013c, or 3013d formed in the silica-based base substrate 3003, 3003c, or 3003d need only be provided in number according to the fitting grooves 3007, 3007c, or 3007d. The spacer optical fibers 3006 need only be provided in number according to the fitting grooves 3007, 3007c, 3007d, 3013, 3013c, or 3013d.

Additionally, in the sixth to ninth embodiments, an example in which the fitting grooves 3007, 3007c, 3007d, 3013, 3013c, and 3013d are grooves each having a rectangular section has been described. However, grooves whose groove widths become narrow toward the substrates 3009, 3003, 3003c, and 3003d, for example, grooves each having a V-shaped or W-shaped section or grooves each having a U-shaped section may be used.

In the sixth to ninth embodiments, the height of the spacer optical fibers 3006 is preferably larger than the sum of the depth of the fitting grooves 3013, 3013c, and 3013d on the base substrate side and the depth of the fitting grooves 3007, 3007c, and 3007d on the optical waveguide chip side. This can provide a gap between the base substrate and the optical waveguide chip.

Additionally, in the sixth to ninth embodiments, the cylindrical spacer optical fibers 3006 are used as spacer members. However, the present invention is not limited to this. The material of the spacer member can be an arbitrary material such as an inorganic substance such as glass, a metal, or a polymer. In addition, the shape is not limited as long as it can appropriately be fitted in the fitting groove 3007, 3007c, 3007d, 3013, 3013c, or 3013d. That is, the spacer member may have a cylindrical shape, a parallelopiped shape, a spherical shape, or a similar shape. In addition, if the height of the spacer member changes when it is fitted in the fitting groove, the optical waveguide chip may tilt with respect to the base substrate. Hence, the material, dimensions, and shape of the spacer member are preferably set such that the height of the spacer member is difficult to change when it is fitted in the fitting groove.

10th Embodiment

In an siica-based PLC or a siica-based flat-plate including an Si substrate, which is used in a PPCP, a stress derived from the difference in thermal expansion coefficient between Si and SiO$_2$ is generated in many cases, and warping occurs. Such warping is sometimes problematic even for a normal application purpose of PLC, and is particularly problematic in a case of a PPCP that requires passive alignment mounting. In many cases, a deviation occurs in the optical connection between PLCs, resulting in an increase in insertion loss. In addition, a PPCP can be used to integrate optical waveguides of a multilayered structure. At this time, the PLCs are sometimes made thin by polishing. By this polishing, the warping tends to be larger than in a PLC of a normal thickness.

Hence, thinning and passive alignment performed for size reduction and simple connection, which are the characteristics of a PPCP, are affected by warping caused by the difference between the thermal expansion coefficients of materials, and an excessive insertion loss occurs.

The 10th to 15th embodiments of the present invention arm at relaxing warping caused by a physical property value and suppressing an increase in the loss of optical connection while maintaining an accurate and simple mounting method.

Figure 16A:
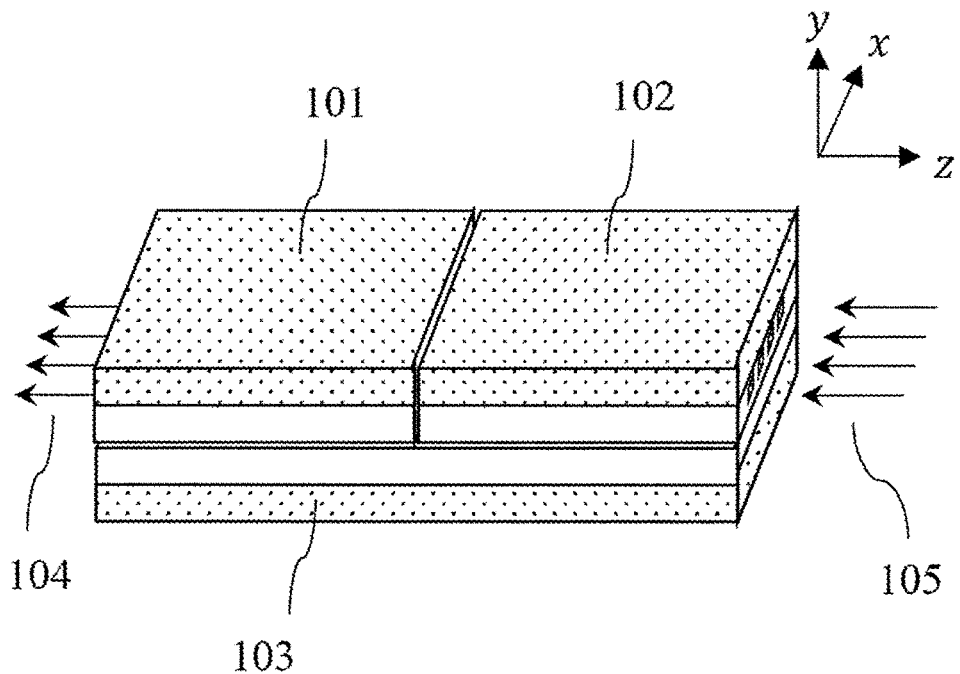
FIGS. 16A to 16D are schematic views showing a connection structure of optical waveguide chips according to the 10th embodiment of the present invention.
Figure 16B:
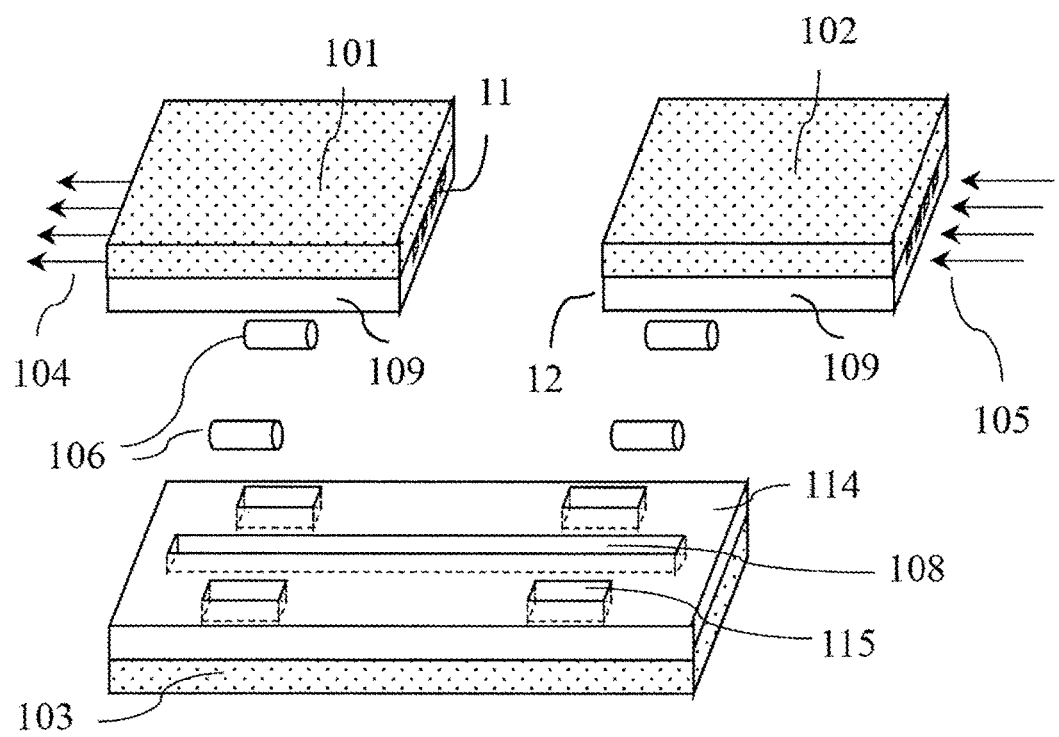
Figure 16C:
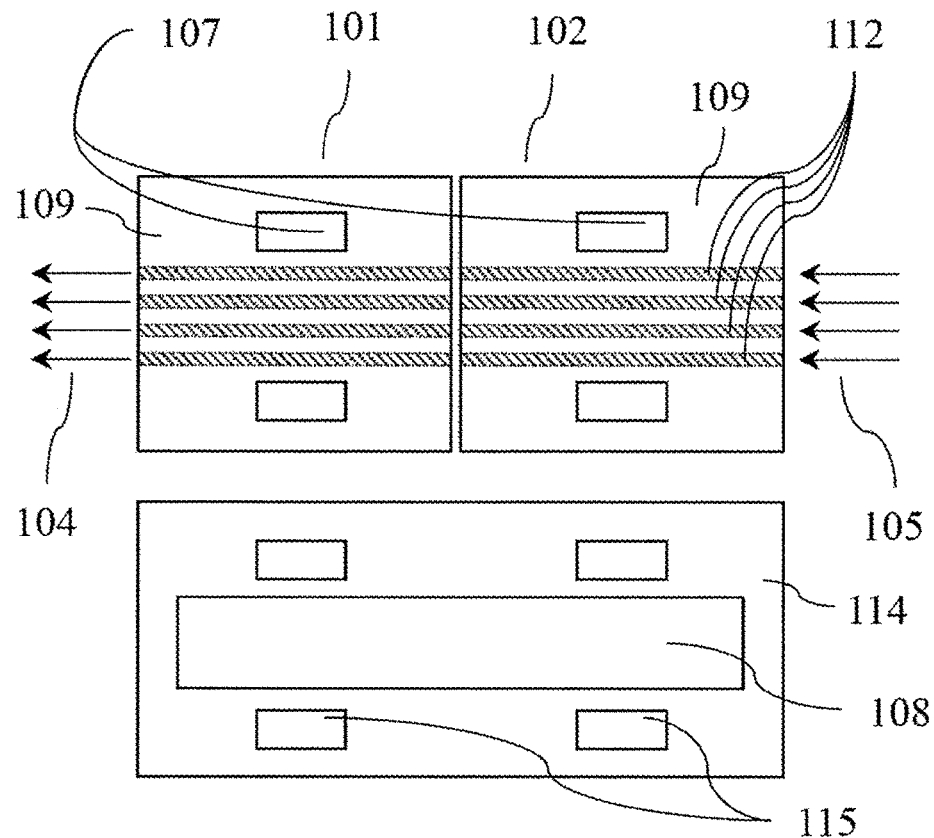
Figure 16D:
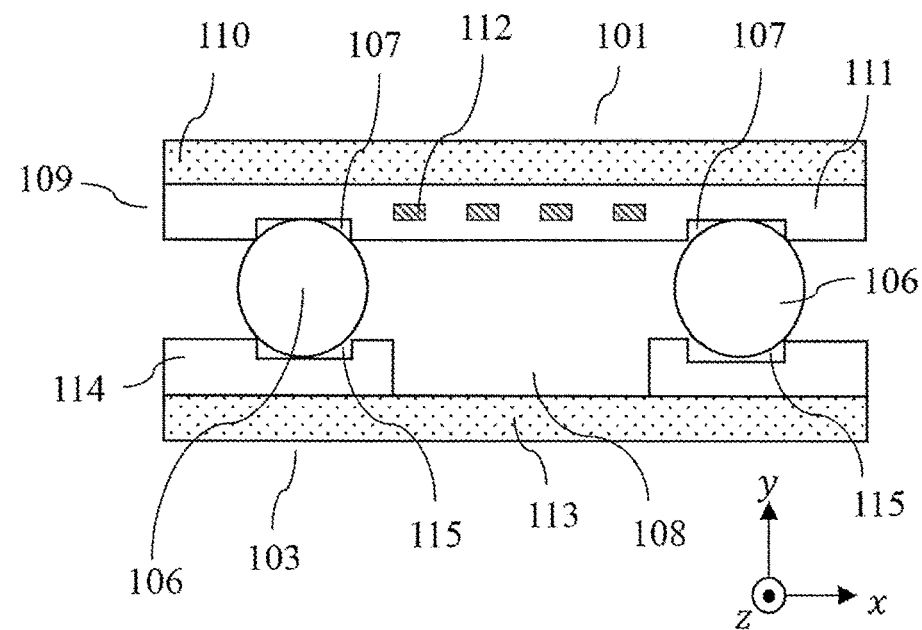

FIGS. 16A to 16D are schematic views showing a connection structure of optical waveguide chips according to the 10th embodiment of the present invention. FIG. 16A is a perspective view of the connection structure of optical waveguide chips, FIG. 16B is an exploded view of parts of the connection structure, FIG. 16C is a view showing the joint surfaces of optical waveguide chips and a base substrate, and FIG. 16D is a sectional view of the connection structure taken along an xy plane. In FIGS. 16A to 16D, a total of seven members, that is, silica-based PLCs 101 and 102 that are two optical waveguide chips each formed by a silica-based glass layer including an Si substrate and an optical waveguide layer, a base substrate 103 that is manufactured by the same method as the silica-based PLCs 101 and 102 and includes no waveguide, and four spacer optical fibers 106 (spacer members) are combined, thereby forming a PPCP.

As shown in FIG. 16A, input optical signals 105 that have entered the silica-based PLC 102 propagate through the optical waveguide layer of the silica-based PLC 102, exit from the silica-based PLC 102 and enter the silica-based PLC 101, propagate through the optical waveguide layer of the silica-based PLC 101, and exit from the silica-based PLC 101 as output optical signals 104.

As shown in FIG. 16D, the silica-based PLC 101 has a structure in which an optical waveguide layer 109 configured to transmit the input signal light 105 is formed on a support substrate 110 made of Si. The optical waveguide layer 109 is formed by a clad layer 111 made of SiO$_2$, and cores 112 formed in the clad layer 111 and made of SiO$_2$ containing a dopant. In addition, fitting grooves 107 are formed in the clad layer 111. The structure of the silica-based PLC 102 is the same as that of the silica-based PLC 101. FIG. 16C shows the joint surfaces of the optical waveguide layers 109 (clad layers 111) of the silica-based PLCs 101 and 102 to the base substrate 103. As is apparent from FIG. 16C, two fitting grooves 107 are formed in one PLC.

As shown in FIGS. 16A and 16B, the silica-based PLC 101 and the silica-based PLC 102 are arranged side by side such that connection end faces 11 and 12 face each other. The two silica-based PLCs 101 and 102 are mounted on the base substrate 103.

A glass layer 114 made of the same material as the clad layers 111 of the silica-based PLCs 101 and 102 is formed on the surface of a support substrate 113 made of Si in the base substrate 103 on which the silica-based PLCs 101 and 102 are mounted. In the glass layer 114 (clad layer), fitting grooves 115 having the same shape as the fitting grooves 107 are formed at positions that face the fitting grooves 107 of the silica-based PLCs 101 and 102 when mounting the silica-based PLCs 101 and 102 on the base substrate 103.

FIG. 16C shows the joint surface of the glass layer 114 to the silica-based PLCs 101 and 102. Since two fitting grooves 107 are formed in one PLC, as described above, a total of four fitting grooves 115, that is, two fitting grooves 115 formed at positions facing the fitting grooves 107 of the silica-based PLC 101 and two fitting grooves 115 formed at positions facing the fitting grooves 107 of the silica-based PLC 102 are formed in the glass layer 114. In this embodiment, the longitudinal direction of the fitting grooves 107 and 115 is set in parallel to the Z-axis direction (the optical axis direction of light that exits from the silica-based PLC 102 to the silica-based PLC 101 and the optical axis direction of light that enters the silica-based PLC 101 or the left-right direction of FIGS. 16A to 16C).

Furthermore, in the glass layer 114, a warping relaxing groove 108 is formed for the purpose of relaxing warping of the base substrate 103. The warping relaxing groove 108 is formed up to a position reaching the support substrate 113 such that the support substrate 113 is exposed to the bottom of the warping relaxing groove 108. When the glass layer 114 is cut until the support substrate 113 is exposed, the effect of relaxing the warping of the base substrate 103 can be maximized. In this embodiment, the warping relaxing groove 108 is formed to extend along the Z-axis direction from a position facing the silica-based PLC 101 to a position facing the silica-based PLC 102.

To manufacture the PPCP according to this embodiment, the spacer optical fibers 106 are respectively fitted in the four fitting grooves 115 formed in the glass layer 114 of the base substrate 103. Then, the two spacer optical fibers 106 fitted in the fitting grooves 115 of the glass layer 114 are fitted in the two fitting grooves 107 formed in the optical waveguide layer 109 of the silica-based PLC 101 such that the joint surface of the glass layer 114 and the joint surface of the optical waveguide layer 109 (clad layer 111) of the silica-based PLC 101 face each other, as shown in FIG. 16B, that is, such that the support substrate 110 is located on the upper side, and the optical waveguide layer 109 is located on the lower side, thereby mounting the silica-based PLC 101 on the base substrate 103.

Similarly, the two spacer optical fibers 106 fitted in the fitting grooves 115 of the glass layer 114 are fitted in the two fitting grooves 107 formed in the optical waveguide layer 109 of the silica-based PLC 102 such that the joint surface of the glass layer 114 and the joint surface of the optical waveguide layer 109 of the silica-based PLC 102 face each other, thereby mounting the silica-based PLC 102 on the base substrate 103.

In this way, the silica-based PLCs 101 and 102 can be mounted on the base substrate 103 such that the connection end face 11 of the silica-based PLC 101 and the connection end face 12 of the silica-based PLC 102 face each other at close range, and the optical connection between the silica-based PLC 101 and the silica-based PLC 102 can be implemented.

The fitting grooves 107 and 115 and the warping relaxing groove 108 are formed by photolithography. Hence, the width (the dimension in the left-right direction of FIG. 16D), the length (the dimension in the left-right direction of FIGS. 16B and 16C), and the positions of the fitting grooves 107 and 115 can be decided at a very high accuracy.

Accordingly, the axis deviation of the optical waveguide layer 109 in the direction in the substrate plane can be aligned at a very high accuracy.

In addition, the spacer optical fibers 106 with the same diameter are fitted in the four fitting grooves 115 on the side of the base substrate 103, the fitting grooves 107 on the side of the silica-based PLC 101 are fitted on two of the four spacer optical fibers 106, and the fitting grooves 107 on the side of the silica-based PLC 102 are fitted on the remaining two spacer optical fibers 106. For this reason, the tilts of the silica-based PLCs 101 and 102 with respect to the base substrate 103 can be made small enough to be neglected.

When the above-described PPCP structure is employed, the core positions in the two silica-based PLCs 101 and 102 with respect to the base substrate 103 are decided at a high accuracy. When the silica-based PLCs 101 and 102 are mounted on the base substrate 103, the positions of the cores 112 in the two silica-based PLCs 101 and 102 are aligned on the same lines, and low-loss connection of light can be implemented. In this embodiment, simple multi-chip mounting can thus be implemented at an accuracy of submicron level by passive alignment mounting without inputting/outputting light. Size reduction of the optical circuit can also be implemented by enabling integration of the PLCs 101 and 102.

Furthermore, in this embodiment, since the warping relaxing groove 108 reaching the support substrate 113 is formed in the glass layer 114 of the base substrate 103, it is possible to relax warping of the base substrate 103 caused by the difference in the thermal expansion coefficient between the support substrate 113 made of Si and the glass layer 114, and suppress an increase in the loss of optical connection due to the axis deviation and gap expansion between the silica-based PLCs 101 and 102 caused by the warping of the base substrate 103.

11th Embodiment

Figure 17A:
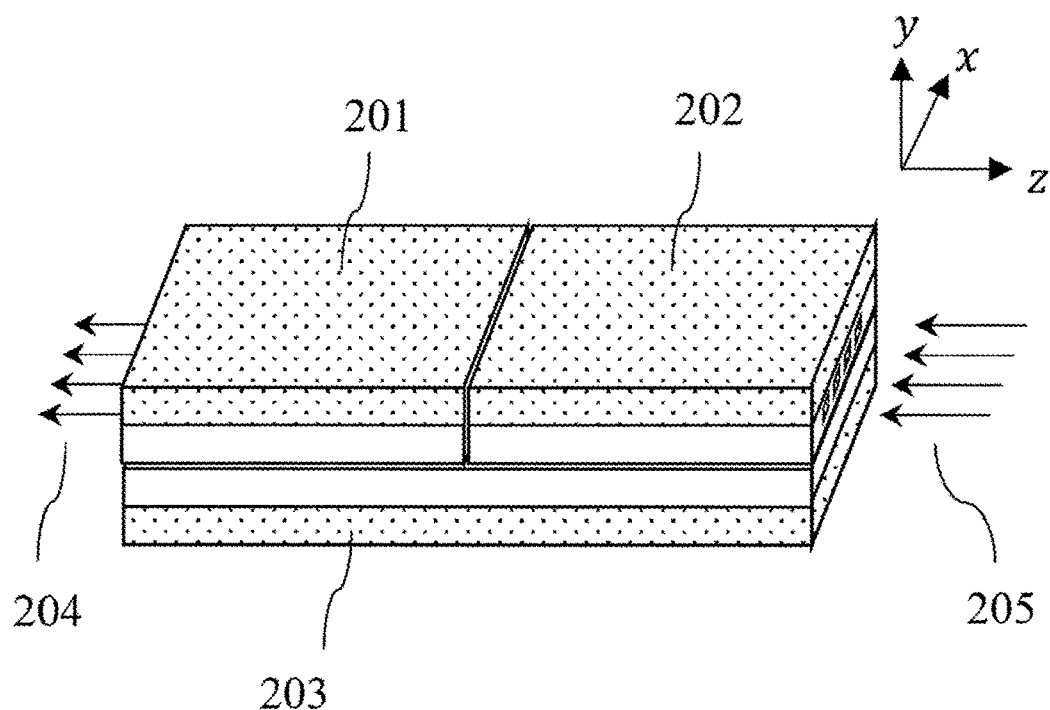
FIGS. 17A to 17D are schematic views showing a connection structure of optical waveguide chips according to the 11th embodiment of the present invention.
Figure 17B:
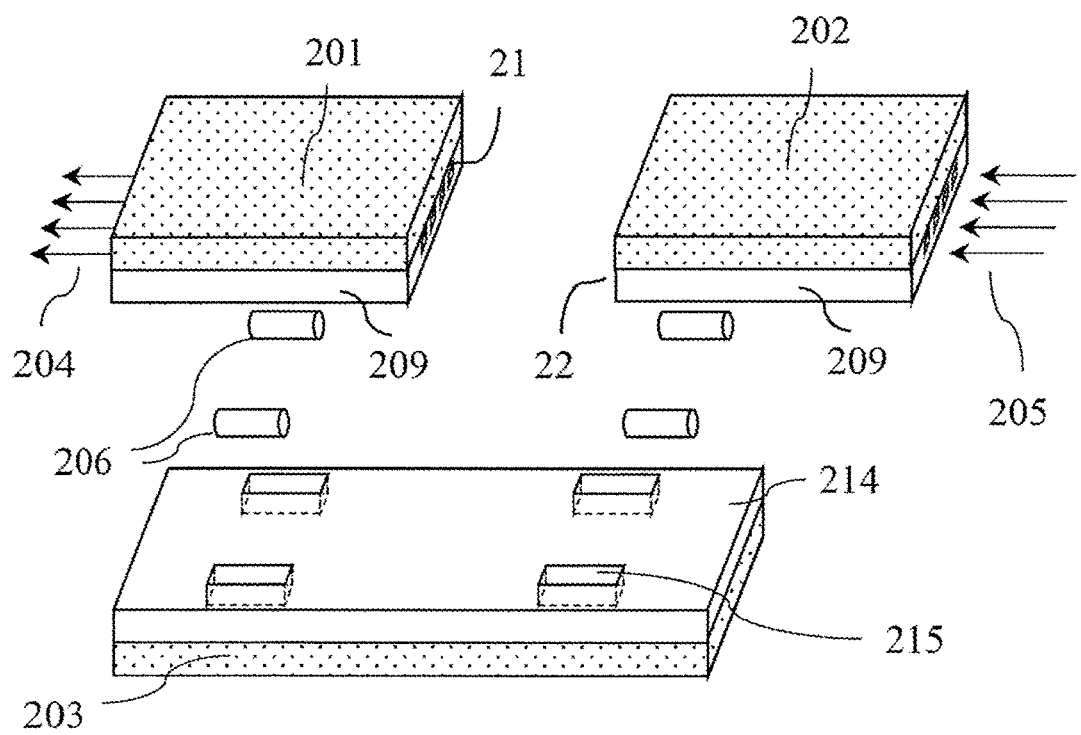
Figure 17C:
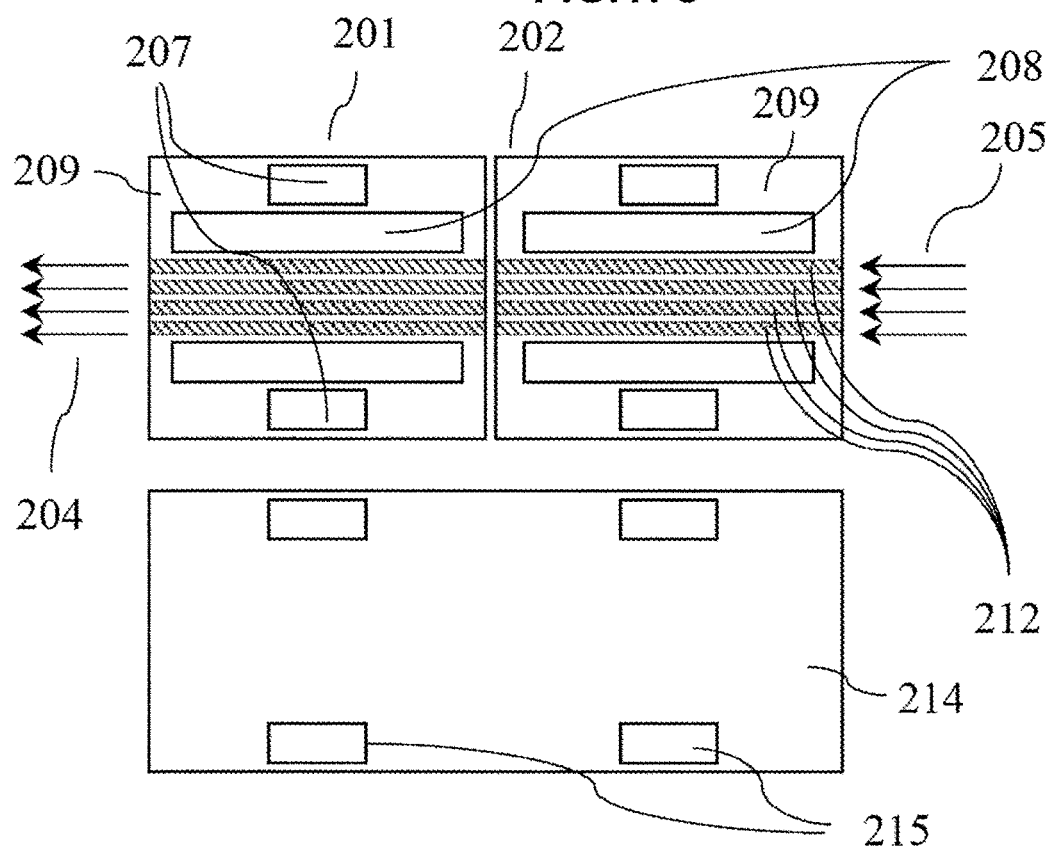
Figure 17D:
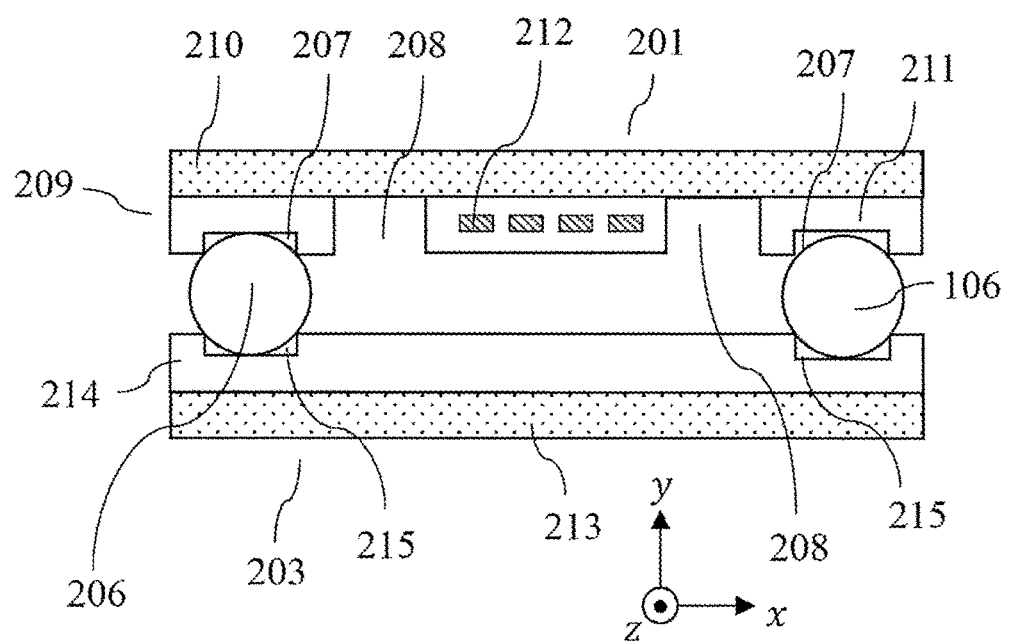

The 11th embodiment of the present invention will be described next. FIGS. 17A to 17D are schematic views showing a connection structure of optical waveguide chips according to the 11th embodiment of the present invention. FIG. 17A is a perspective view of the connection structure of optical waveguide chips, FIG. 17B is an exploded view of parts of the connection structure, FIG. 17C is a view showing the joint surfaces of optical waveguide chips and a base substrate, and FIG. 17D is a sectional view of the connection structure taken along an xy plane.

As shown in FIG. 17A, input optical signals 205 that have entered a silica-based PLC 202 propagate through the optical waveguide layer of the silica-based PLC 202, exit from the silica-based PLC 202 and enter a silica-based PLC 201, propagate through the optical waveguide layer of the silica-based PLC 201, and exit from the silica-based PLC 201 as output optical signals 204.

Like the silica-based PLC 101, the silica-based PLC 201 has a structure in which an optical waveguide layer 209 configured to transmit the input signal light 205 is formed on a support substrate 210 made of Si. The optical waveguide layer 209 is formed by a clad layer 211 made of $SiO_2$, and cores 212 formed in the clad layer 211. Like the silica-based PLC 101, fitting grooves 207 are formed in the clad layer 211.

Furthermore, in the clad layer 211, warping relaxing grooves 208 are formed for the purpose of relaxing warping of the silica-based PLC 201. Each warping relaxing groove 208 is formed up to a position reaching the support substrate 210 such that the support substrate 210 is exposed to the bottom of the warping relaxing groove 208. When the clad layer 211 is cut until the support substrate 210 is exposed, the effect of relaxing the warping of the silica-based PLC 201 can be maximized.

Additionally, in this embodiment, the longitudinal direction of the fitting grooves 207 and the longitudinal direction of the warping relaxing grooves 208 are set in parallel to the Z-axis direction (the optical axis direction of light that exits from the silica-based PLC 202 to the silica-based PLC 201 and the optical axis direction of light that enters the silica-based PLC 201 or the left-right direction of FIGS. 17A to 17C). The warping relaxing grooves 208 are arranged so as not to intersect the cores 212 of the optical waveguide layer 209 and not to impede optical transmission in the optical waveguide layer 209.

The structure of the silica-based PLC 202 is the same as that of the silica-based PLC 201. In this embodiment, two fitting grooves 207 and two warping relaxing grooves 208 are formed in one PLC.

A glass layer 214 made of the same material as the clad layers 211 of the silica-based PLCs 201 and 202 is formed on the surface of a support substrate 213 made of Si in the base substrate 203 on which the silica-based PLCs 201 and 202 are mounted. In the glass layer 214, fitting grooves 215 having the same shape as the fitting grooves 207 are formed at positions that face the fitting grooves 207 of the silica-based PLCs 201 and 202 when mounting the silica-based PLCs 201 and 202 on the base substrate 203.

To manufacture the PPCP according to this embodiment, spacer optical fibers 206 (spacer members) are respectively fitted in the four fitting grooves 215 formed in the glass layer 214 of the base substrate 203. Then, the two spacer optical fibers 206 fitted in the fitting grooves 215 of the glass layer 214 are fitted in the two fitting grooves 207 formed in the optical waveguide layer 209 of the silica-based PLC 201 such that the joint surface of the glass layer 214 and the joint surface of the optical waveguide layer 209 (clad layer 211) of the silica-based PLC 201 face each other, thereby mounting the silica-based PLC 201 on the base substrate 203.

Similarly, the two spacer optical fibers 206 fitted in the fitting grooves 215 of the glass layer 214 are fitted in the two fitting grooves 207 formed in the optical waveguide layer 209 of the silica-based PLC 202 such that the joint surface of the glass layer 214 and the joint surface of the optical waveguide layer 209 of the silica-based PLC 202 face each other, thereby mounting the silica-based PLC 202 on the base substrate 203.

In this way, the silica-based PLCs 201 and 202 can be mounted on the base substrate 203 such that a connection end face 21 of the silica-based PLC 201 and a connection end face 22 of the silica-based PLC 202 face each other at close range, and simple optical connection at an accuracy of submicron level and size reduction of the optical circuit described in the 10th embodiment can be implemented.

Furthermore, in this embodiment, since the warping relaxing grooves 208 reaching the support substrate 210 are formed in the optical waveguide layer 209 of each of the silica-based PLCs 201 and 202, it is possible to relax warping of the silica-based PLCs 201 and 202 caused by the difference in the thermal expansion coefficient between the support substrate 210 made of Si and the optical waveguide layer 209 (clad layer 211), and suppress an increase in the loss of optical connection due to the axis deviation and gap expansion between the silica-based PLCs 201 and 202 caused by the warping of the silica-based PLCs 201 and 202.

12th Embodiment

Figure 18:
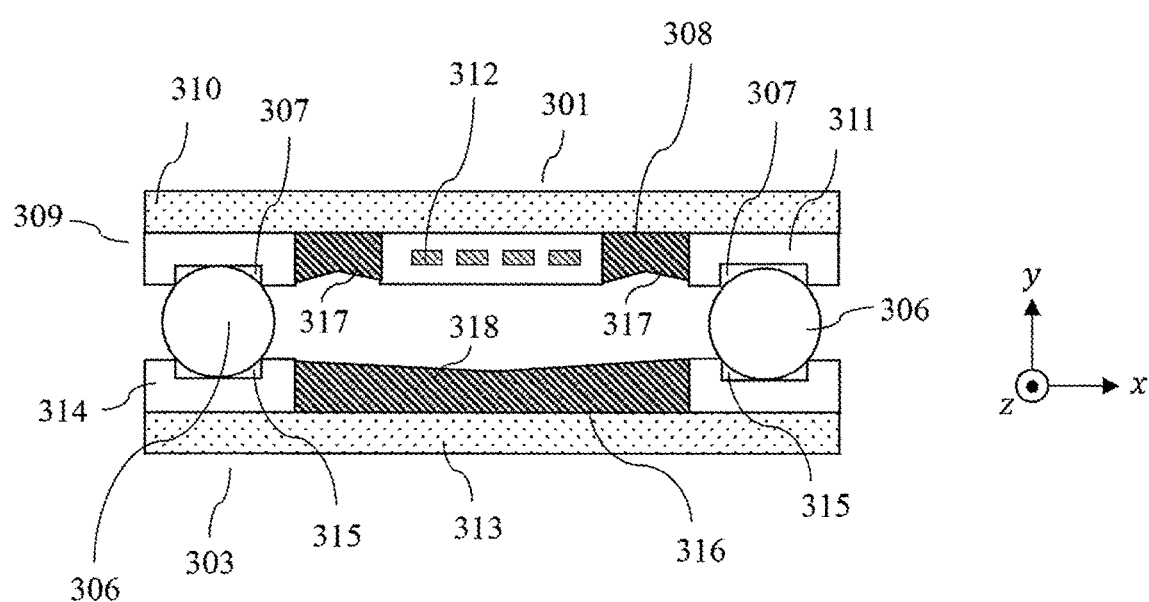
FIG. 18 is a sectional view showing a connection structure of optical waveguide chips according to the 12th embodiment of the present invention.

The 12th embodiment of the present invention will be described next. FIG. 18 is a sectional view showing a connection structure of optical waveguide chips according to the 12th embodiment of the present invention.

Like the silica-based PLC 201, a silica-based PLC 301 has a structure in which an optical waveguide layer 309 is formed on a support substrate 310 made of Si. The optical waveguide layer 309 is formed by a clad layer 311 made of $SiO_2$, and cores 312 formed in the clad layer 311. Fitting grooves 307 similar to the fitting grooves 107 and 207 and warping relaxing grooves 308 similar to the warping relaxing grooves 208 are formed in the clad layer 311.

A glass layer 314 made of the same material as the clad layer 311 is formed on the surface of a support substrate 313 made of Si in a base substrate 303 on which the silica-based PLC 301 is mounted. In the glass layer 314, fitting grooves 315 having the same shape as the fitting grooves 307 are formed at positions that face the fitting grooves 307 of the silica-based PLC 301 when mounting the silica-based PLC 301 on the base substrate 303. In addition, a warping relaxing groove 316 similar to the warping relaxing groove 108 is formed.

A method of mounting the silica-based PLC 301 on the base substrate 303 using spacer optical fibers 306 (spacer members) is the same as in the 10th and 11th embodiments, and a description thereof will be omitted. Although FIG. 18 shows only one silica-based PLC 301, a connection method of a plurality of silica-based PLCs is also the same as described in the 10th and 11th embodiments.

In this embodiment, in addition to the arrangement described in the 10th and 11th embodiments, the warping relaxing grooves 308 and 316 formed in the clad layer 311 and the glass layer 314 are filled with filling materials 317 and 318 having a thermal expansion coefficient different from the thermal expansion coefficient of the constituent substance ($SiO_2$) of the clad layer 311 and the glass layer 314.

Accordingly, in this embodiment, it is possible to relax the warping of the silica-based PLC 301 and the base substrate 303 and suppress an increase in the loss of optical connection due to the axis deviation and gap expansion between the two PLCs (only one of them is shown in FIG. 18). At the same time, it is possible to prevent dust and the like from being collected in the warping relaxing grooves 308 and 316 and achieve satisfactory junction of the PPCP.

As the filling materials 317 and 318, a substance whose hardness is lower than that of the constituent substance ($SiO_2$) of the clad layer 311 and the glass layer 314 is used. An example of the substance is silicone.

In addition, as the filling materials 317 and 318, a substance whose thermal expansion coefficient is higher than the thermal expansion coefficient of the constituent substance ($SiO_2$) of the clad layer 311 and the glass layer 314 may be used. An example of the substance is silicon (Si).

Note that in this embodiment, a case in which both the silica-based PLC and the base substrate include the warping relaxing grooves has been described. However, the present invention is not limited to this, and the warping relaxing groove may be filled with the filling material when the warping relaxing groove is present only on the base substrate side, as in the 10th embodiment. Alternatively, the warping relaxing groove may be filled with the filling material when the warping relaxing groove is present only on the silica-based PLC side, as in the 11th embodiment.

13th Embodiment

Figure 19A:
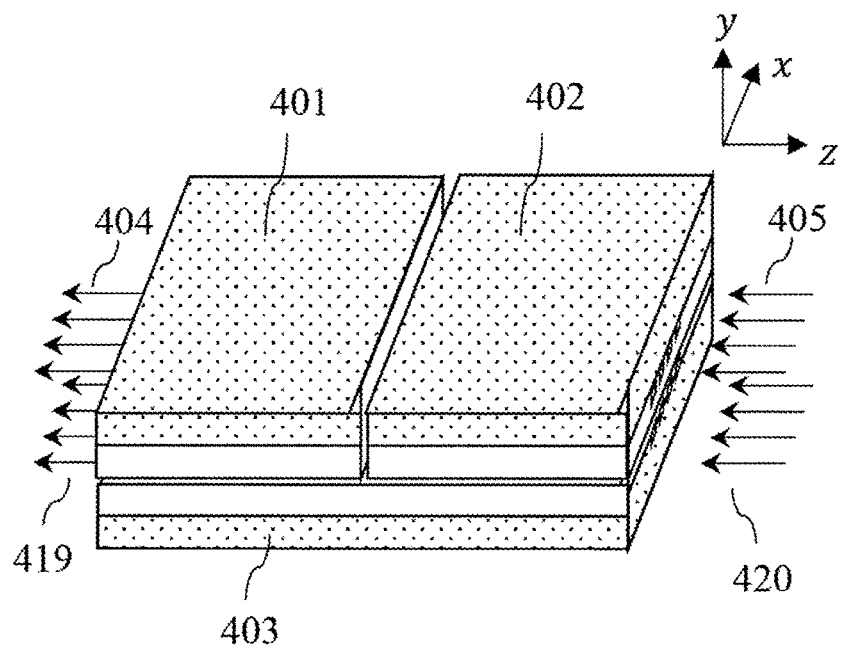
Figure 19B:
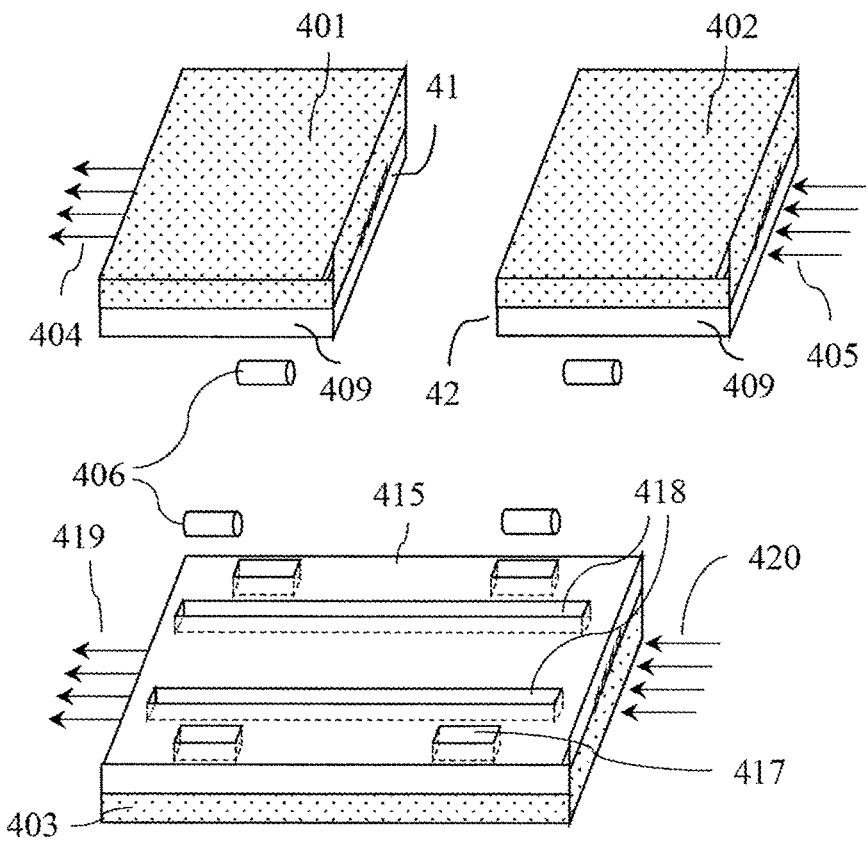

The 13th embodiment of the present invention will be described next. FIGS. 19A to 19D are schematic views showing a connection structure of optical waveguide chips according to the 13th embodiment of the present invention. FIG. 19A is a perspective view of the connection structure of optical waveguide chips, FIG. 19B is an exploded view of parts of the connection structure, FIG. 19C is a view showing the joint surfaces of three optical waveguide chips, and FIG. 19D is a sectional view of the connection structure taken along an xy plane.

In the 10th to 12th embodiments, the silica-based PLCs (optical waveguide chips) are mounted on a base substrate without an optical waveguide layer. In this embodiment, an example in which a plurality of other silica-based PLCs are mounted on a silica-based PLC will be described.

As shown in FIG. 19A, input optical signals 405 that have entered a silica-based PLC 402 propagate through the optical waveguide layer of the silica-based PLC 402, exit from the silica-based PLC 402 and enter a silica-based PLC 401, propagate through the optical waveguide layer of the silica-based PLC 401, and exit from the silica-based PLC 401 as output optical signals 404. In addition, input optical signals 420 that have entered a silica-based PLC 403 propagate through the optical waveguide layer of the silica-based PLC 403, and exit from the silica-based PLC 403 as output optical signals 419.

Like the silica-based PLC 101, the silica-based PLC 401 has a structure in which an optical waveguide layer 409 configured to transmit the input signal light 405 is formed on a support substrate 410 made of Si. The optical waveguide layer 409 is formed by a clad layer 411 made of $SiO_2$, and cores 412 formed in the clad layer 411. Like the silica-based PLC 101, fitting grooves 407 are formed in the clad layer 411.

Furthermore, in the clad layer 411, warping relaxing grooves 408 are formed for the purpose of relaxing warping of the silica-based PLC 401. A depth D1 of the fitting groove 407 is 5 µm, and a depth D2 of the warping relaxing groove 408 is 15 µm. The depth D2 need only be 1 µm or more. In this embodiment, each warping relaxing groove 408 is formed up to a position reaching the support substrate 410 such that the support substrate 410 is exposed to the bottom of the warping relaxing groove 408. When the clad layer 411 is cut until the support substrate 410 is exposed, the effect of relaxing the warping of the silica-based PLC 401 can be maximized. An interval D3 between the fitting groove 407 and the warping relaxing groove 408 is 70 µm. The interval D3 need only be 1 µm or more.

In this embodiment, the longitudinal direction of the fitting grooves 407 and the longitudinal direction of the warping relaxing grooves 408 are set in parallel to the Z-axis direction (the optical axis direction of light that exits from the silica-based PLC 402 to the silica-based PLC 401 and the optical axis direction of light that enters the silica-based PLC 401 or the left-right direction of FIGS. 19A to 19C). The silica-based PLC 401 is designed with priority on warping relaxation more than reduction of transmission loss of an optical signal. That is, as shown in FIG. 19C, the warping relaxing groove 408 has a shape including not only a portion extending in the Z-axis direction but also a portion extending in the X-axis direction (the direction perpendicular to the optical axis direction in the substrate plane), and the portion extending in the X-axis direction divides the optical waveguide layer 409.

Figure 20:
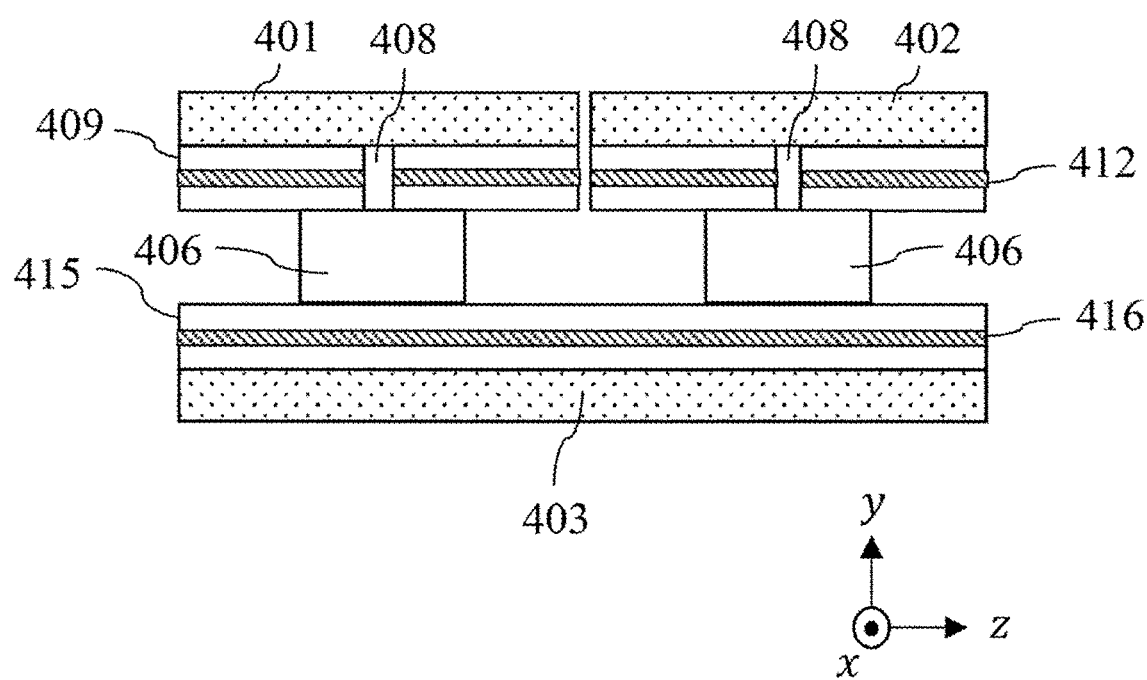
FIG. 20 is a sectional view showing the structure of a portion in which an optical waveguide layer is divided in the 13th embodiment of the present invention.

FIG. 20 shows the structure of the PPCP in which the optical waveguide layer 409 is divided. FIG. 20 is a sectional view of the PPCP taken along a yz plane. Light beams that have exited from the cores 412 on one side of the optical waveguide layer 409 divided by the warping relaxing groove 408 enter the cores 412 on the other side across the warping relaxing groove 408. Hence, in this embodiment, the transmission loss of the optical signal increases, as described above. However, since the warping relaxing groove 408 is provided not only in the Z-axis direction but also in the X-axis direction, warping of the silica-based PLC 401 can more effectively be suppressed. The structure of the silica-based PLC 402 is the same as that of the silica-based PLC 401.

The silica-based PLC 403 has a structure in which an optical waveguide layer 415 configured to transmit the input signal light 420 is formed on a support substrate 413 made of Si. The optical waveguide layer 415 is formed by a clad layer 414 made of $SiO_2$, and cores 416 formed in the clad layer 414. In the clad layer 414, fitting grooves 417 having the same shape as the fitting grooves 407 are formed at positions that face the fitting grooves 407 of the silica-based PLCs 401 and 402 when mounting the silica-based PLCs 401 and 402 on the silica-based PLC 403.

Furthermore, in the clad layer 414, warping relaxing grooves 418 are formed for the purpose of relaxing warping of the silica-based PLC 403. As in the silica-based PLCs 401 and 402, the depth D1 of the fitting groove 417 is 5 µm, and the depth D2 of the warping relaxing groove 418 is 15 µm. As described above, the depth D2 need only be 1 µm or more. Each warping relaxing groove 418 is formed up to a position reaching the support substrate 413 such that the support substrate 413 is exposed to the bottom of the warping relaxing groove 418. When the clad layer 414 is cut until the support substrate 413 is exposed, the effect of relaxing the warping of the silica-based PLC 403 can be maximized. In addition, the interval D3 between the fitting groove 417 and the warping relaxing groove 418 is 70 µm. The interval D3 need only be 1 µm or more.

In this embodiment, the two warping relaxing grooves 418 are formed to extend along the Z-axis direction from positions facing the silica-based PLC 401 to positions facing the silica-based PLC 402. The warping relaxing grooves 418 are arranged so as not to intersect the cores 416 of the optical waveguide layer 415 and not to impede optical transmission in the optical waveguide layer 415.

To manufacture the PPCP according to this embodiment, spacer optical fibers 406 (spacer members) are respectively fitted in the four fitting grooves 417 formed in the clad layer 414 of the silica-based PLC 403. Then, the two spacer optical fibers 406 fitted in the fitting grooves 417 of the clad layer 414 are fitted in the two fitting grooves 407 formed in the optical waveguide layer 409 of the silica-based PLC 401 such that the joint surface of the clad layer 414 and the joint surface of the optical waveguide layer 409 (clad layer 411) of the silica-based PLC 401 face each other, thereby mounting the silica-based PLC 401 on the silica-based PLC 403.

Similarly, the two spacer optical fibers 406 fitted in the fitting grooves 417 of the clad layer 414 are fitted in the two fitting grooves 407 formed in the optical waveguide layer 409 of the silica-based PLC 402 such that the joint surface of the clad layer 414 and the joint surface of the optical waveguide layer 409 of the silica-based PLC 402 face each other, thereby mounting the silica-based PLC 402 on the silica-based PLC 403.

In this way, the silica-based PLCs 401 and 402 can be mounted on the silica-based PLC 403 such that a connection end face 41 of the silica-based PLC 401 and a connection end face 42 of the silica-based PLC 402 face each other at close range, and simple optical connection at an accuracy of submicron level and size reduction of the optical circuit can be implemented.

Furthermore, in this embodiment, since the warping relaxing grooves 408 and 418 reaching the support substrates 410 and 413 are formed in the optical waveguide layers 409 and 415 of the silica-based PLCs 401, 402, and 403, it is possible to relax warping of the silica-based PLCs 401, 402, and 403 caused by the difference in the thermal expansion coefficient between the support substrates 410 and 413 made of Si and the optical waveguide layers 409 and 415 (clad layers 411 and 414), and suppress an increase in the loss of optical connection due to the axis deviation and gap expansion between the silica-based PLCs 401 and 402 caused by the warping of the silica-based PLCs 401, 402, and 403.

Note that the warping relaxing grooves 408 and 418 according to this embodiment may be filled with filling materials described in the 12th embodiment.

14th Embodiment

Figure 21A:
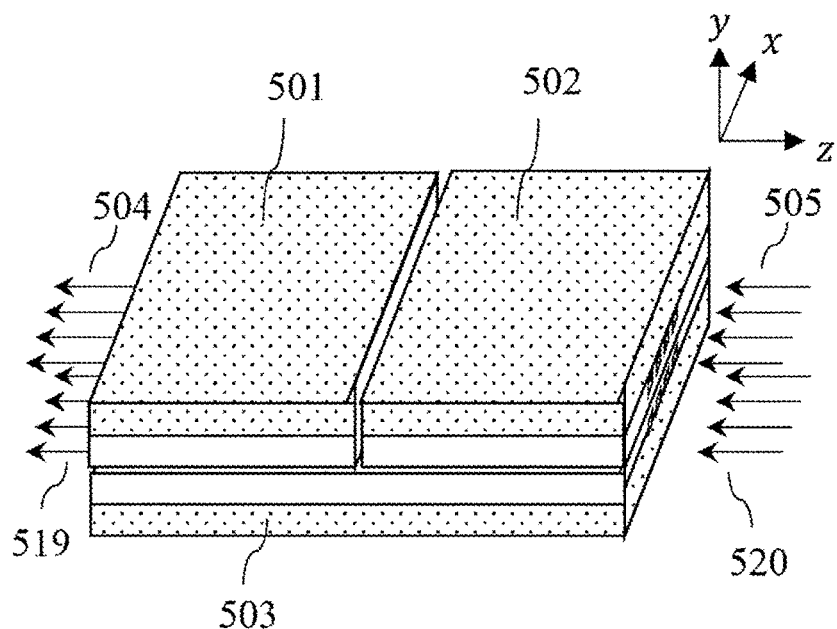
FIGS. 21A to 21D are schematic views showing a connection structure of optical waveguide chips according to the 14th embodiment of the present invention.
Figure 21B:
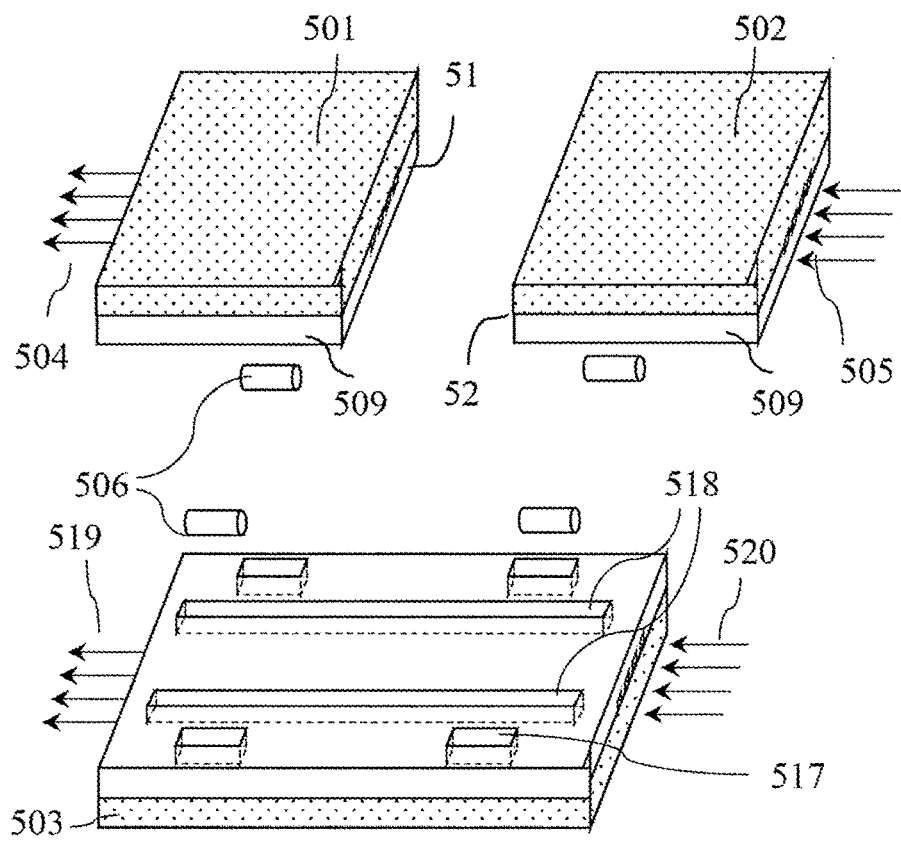
Figure 21C:
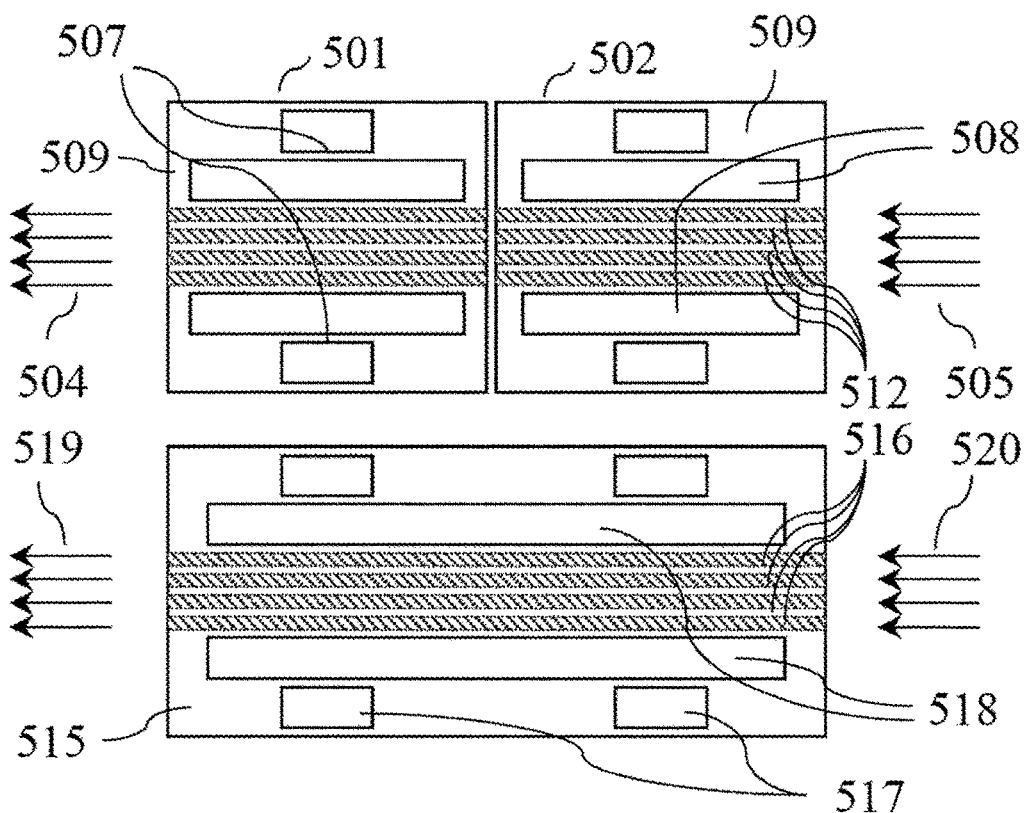
Figure 21D:
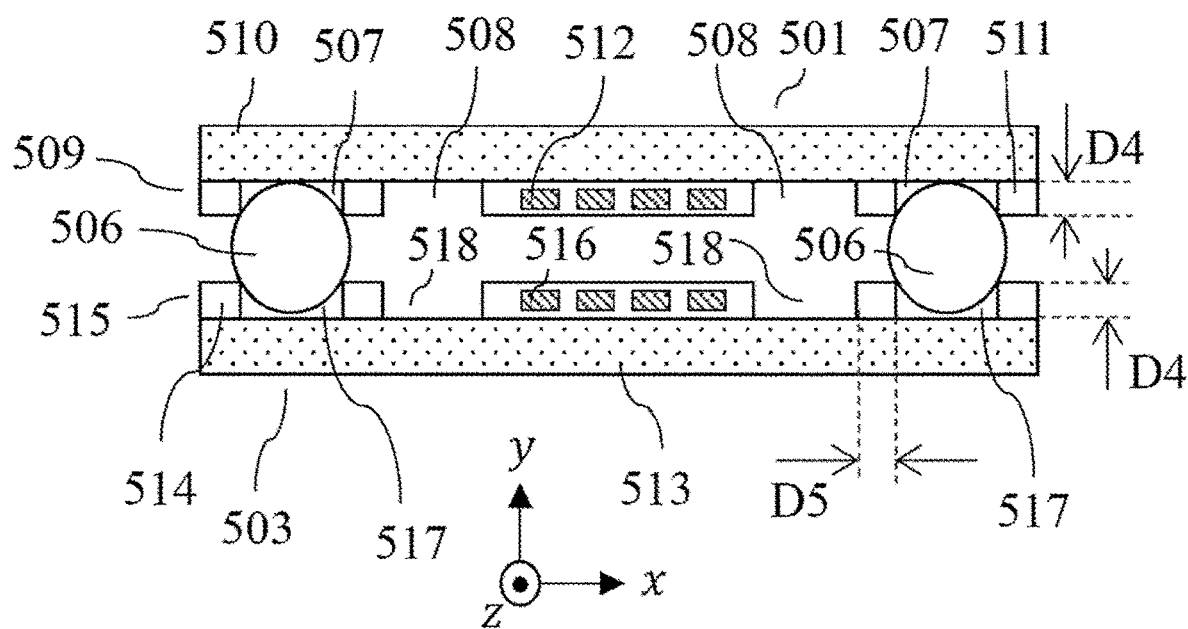

The 14th embodiment of the present invention will be described next. FIGS. 21A to 21D are schematic views showing a connection structure of optical waveguide chips according to the 14th embodiment of the present invention. FIG. 21A is a perspective view of the connection structure of optical waveguide chips, FIG. 21B is an exploded view of parts of the connection structure, FIG. 21C is a view showing the joint surfaces of three optical waveguide chips, and FIG. 21D is a sectional view of the connection structure taken along an xy plane. This embodiment shows the best mode of a case in which a plurality of other silica-based PLCs are mounted on a silica-based PLC.

As shown in FIG. 21A, input optical signals 505 that have entered a silica-based PLC 502 propagate through the optical waveguide layer of the silica-based PLC 502, exit from the silica-based PLC 502 and enter a silica-based PLC 501, propagate through the optical waveguide layer of the silica-based PLC 501, and exit from the silica-based PLC 501 as output optical signals 504. In addition, input optical signals 520 that have entered a silica-based PLC 503 propagate through the optical waveguide layer of the silica-based PLC 503, and exit from the silica-based PLC 503 as output optical signals 519.

Like the silica-based PLC 401, the silica-based PLC 501 has a structure in which an optical waveguide layer 509 configured to transmit the input signal light 505 is formed on a support substrate 510 made of Si. The optical waveguide layer 509 is formed by a clad layer 511 made of $SiO_2$, and cores 512 formed in the clad layer 511. Like the silica-based PLC 401, fitting grooves 507 are formed in the clad layer 511. Furthermore, in the clad layer 511, warping relaxing grooves 508 are formed for the purpose of relaxing warping of the silica-based PLC 501.

A depth D4 of both the fitting groove 507 and the warping relaxing groove 508 is 15 μm. The depth of the warping relaxing groove 508 need only be 1 μm or more. In this embodiment, the fitting grooves 507 and the warping relaxing grooves 508 are formed up to positions reaching the support substrate 510 such that the support substrate 510 is exposed to the bottoms of the grooves 507 and 508. When the clad layer 511 is cut until the support substrate 510 is exposed, the effect of relaxing the warping of the silica-based PLC 501 can be maximized. In addition, the fitting grooves 507 and the warping relaxing grooves 508 are manufactured by a simultaneous process, thereby lowering the manufacturing cost. An interval D5 between the fitting groove 507 and the warping relaxing groove 508 is 70 μm. The interval D5 need only be 1 μm or more.

In this embodiment, the longitudinal direction of the fitting grooves 507 and the longitudinal direction of the warping relaxing grooves 508 are set in parallel to the Z-axis direction (the optical axis direction of light that exits from the silica-based PLC 502 to the silica-based PLC 501 and the optical axis direction of light that enters the silica-based PLC 501 or the left-right direction of FIGS. 21A to 21C). The silica-based PLC 501 is designed with priority on reduction of transmission loss of an optical signal more than warping relaxation. That is, the two warping relaxing grooves 508 are arranged so as not to intersect the cores 512 of the optical waveguide layer 509 and not to impede optical transmission in the optical waveguide layer 509. The structure of the silica-based PLC 502 is the same as that of the silica-based PLC 501.

The silica-based PLC 503 has a structure in which an optical waveguide layer 515 configured to transmit the input signal light 520 is formed on a support substrate 513 made of Si. The optical waveguide layer 515 is formed by a clad layer 514 made of $SiO_2$, and cores 516 formed in the clad layer 514. In the clad layer 514, fitting grooves 517 having the same shape as the fitting grooves 507 are formed at positions that face the fitting grooves 507 of the silica-based PLCs 501 and 502 when mounting the silica-based PLCs 501 and 502 on the silica-based PLC 503. Furthermore, in the clad layer 514, warping relaxing grooves 518 are formed for the purpose of relaxing warping of the silica-based PLC 503.

As in the silica-based PLCs 501 and 502, the depth D4 of both the fitting groove 517 and the warping relaxing groove 518 is 15 μm. The fitting grooves 517 and the warping relaxing grooves 518 are formed up to positions reaching the support substrate 513 such that the support substrate 513 is exposed to the bottoms of the grooves 517 and 518. When the clad layer 514 is cut until the support substrate 513 is exposed, the effect of relaxing the warping of the silica-based PLC 503 can be maximized. In addition, the fitting grooves 517 and the warping relaxing grooves 518 are manufactured by a simultaneous process, thereby lowering the manufacturing cost. The interval D5 between the fitting groove 517 and the warping relaxing groove 518 is 70 μm.

A method of mounting the silica-based PLCs 501 and 502 on the silica-based PLC 503 using the spacer optical fibers 506 (spacer members) is the same as in the 13th embodiment, and a description thereof will be omitted.

In this way, the silica-based PLCs 501 and 502 can be mounted on the silica-based PLC 503 such that a connection end face 51 of the silica-based PLC 501 and a connection end face 52 of the silica-based PLC 502 face each other at close range, and simple optical connection at an accuracy of submicron level and size reduction of the optical circuit can be implemented.

Furthermore, in this embodiment, since the warping relaxing grooves 508 and 518 reaching the support substrates 510 and 513 are formed in the optical waveguide layers 509 and 515 of the silica-based PLCs 501, 502, and 503, it is possible to relax warping of the silica-based PLCs 501, 502, and 503 caused by the difference in the thermal expansion coefficient between the support substrates 510 and 513 made of Si and the optical waveguide layers 509 and 515 (clad layers 511 and 514), and suppress an increase in the loss of optical connection due to the axis deviation and gap expansion between the silica-based PLCs 501 and 502 caused by the warping of the silica-based PLCs 501, 502, and 503.

Additionally, in this embodiment, since the fitting grooves 507 and 517 are formed up to such a depth that the spacer optical fibers 506 come into contact with the support substrates 510 and 513, the interval between the silica-based PLCs 501 and 502 and the silica-based PLC 503 can be guaranteed at an accuracy similar to the accuracy of the diameter of the spacer optical fibers 506.

Note that the warping relaxing grooves 508 and 518 according to this embodiment may be filled with filling materials described in the 12th embodiment.

15th Embodiment

Figure 22A:
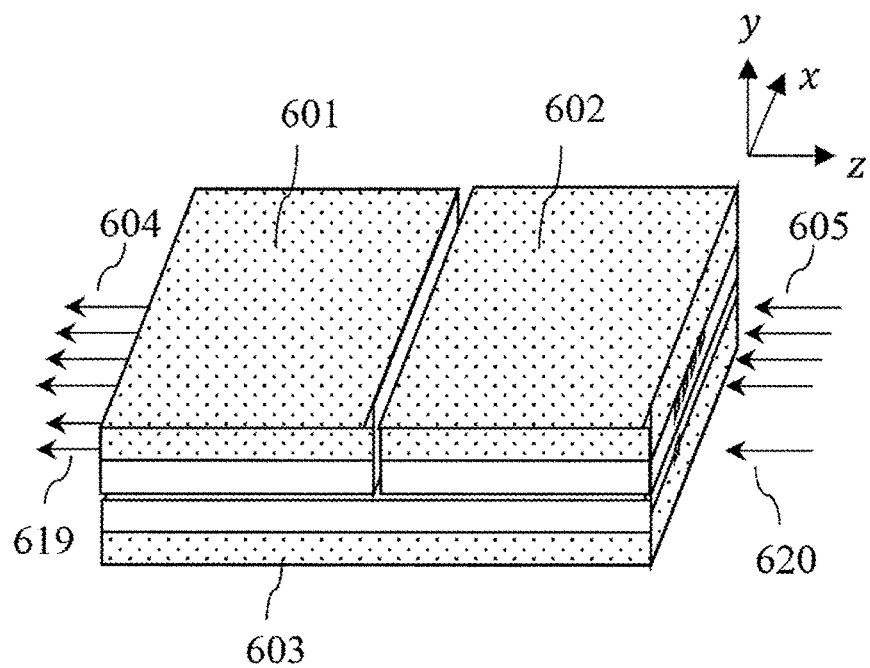
FIGS. 22A to 22D are schematic views showing a connection structure of optical waveguide chips according to the 15th embodiment of the present invention.
Figure 22B:
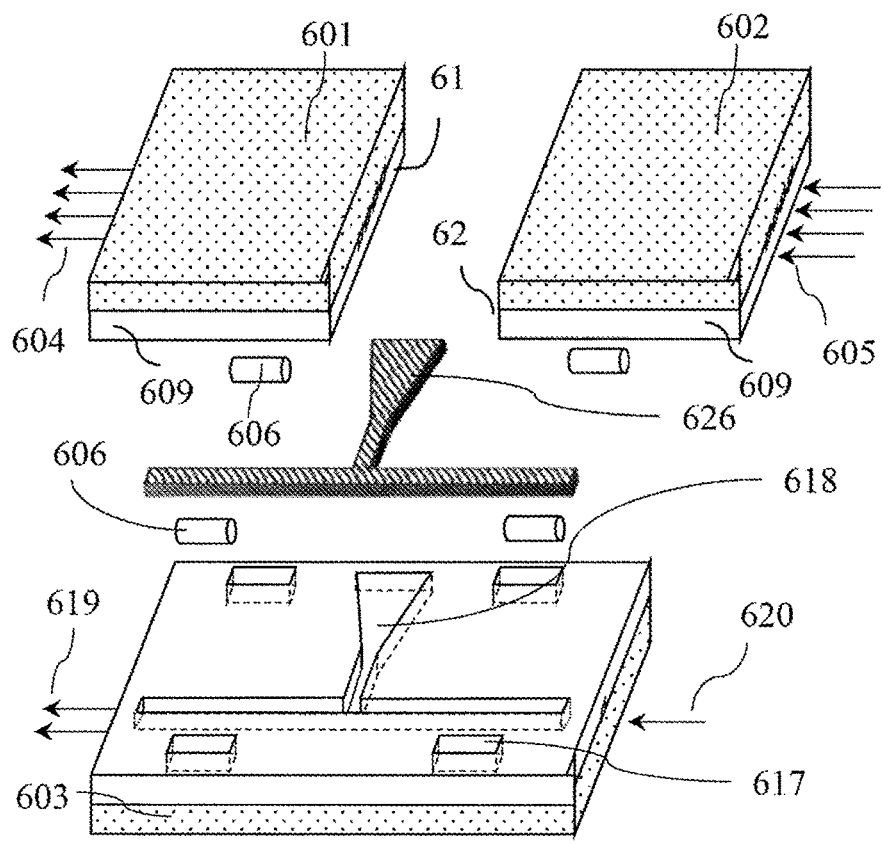
Figure 22C:
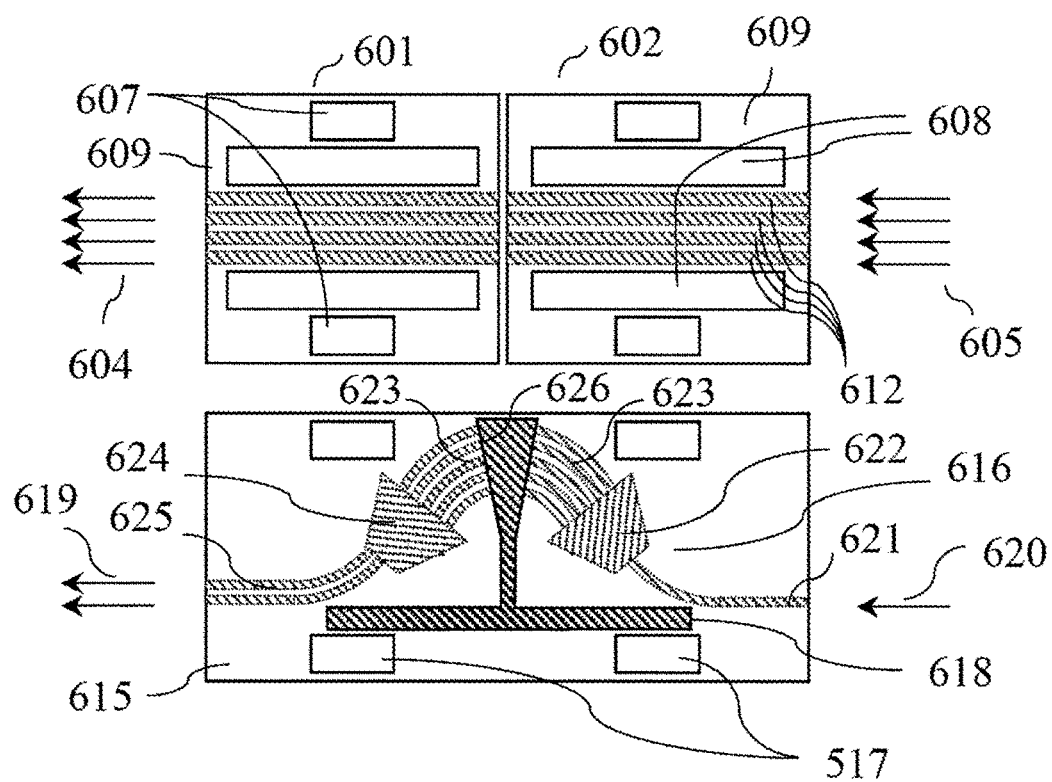
Figure 22D:
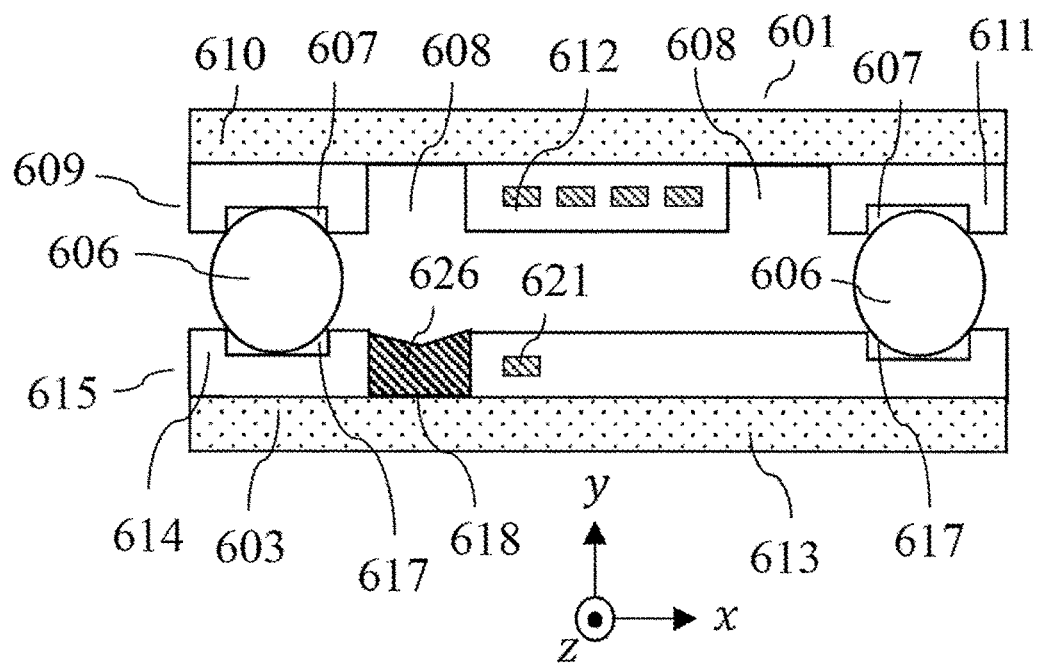

The 15th embodiment of the present invention will be described next. FIGS. 22A to 22D are schematic views showing a connection structure of optical waveguide chips according to the 15th embodiment of the present invention. FIG. 22A is a perspective view of the connection structure of optical waveguide chips, FIG. 22B is an exploded view of parts of the connection structure, FIG. 22C is a view showing the joint surfaces of three optical waveguide chips, and FIG. 22D is a sectional view of the connection structure taken along an xy plane.

As shown in FIG. 22A, input optical signals 605 that have entered a siica-based PLC 602 propagate through the optical waveguide layer of the silica-based PLC 602, exit from the siica-based PLC 602 and enter a siica-based PLC 601, propagate through the optical waveguide layer of the silica-based PLC 601, and exit from the silica-based PLC 601 as output optical signals 604. In addition, an input optical signal 620 that has entered a siica-based PLC 603 propagates through the optical waveguide layer of the silica-based PLC 603, and exits from the silica-based PLC 603 as output optical signals 619.

Like the silica-based PLC 501, the silica-based PLC 601 has a structure in which an optical waveguide layer 609 configured to transmit the input signal light 605 is formed on a support substrate 610 made of Si. The optical waveguide layer 609 is formed by a clad layer 611 made of SiO$_2$, and cores 612 formed in the clad layer 611. Like the silica-based PLC 501, fitting grooves 607 are formed in the clad layer 611.

Furthermore, in the clad layer 611, warping relaxing grooves 608 are formed for the purpose of relaxing warping of the silica-based PLC 601. The warping relaxing grooves 608 are formed up to positions reaching the support substrate 610 such that the support substrate 610 is exposed to the bottoms of the warping relaxing grooves 608. When the clad layer 611 is cut until the support substrate 610 is exposed, the effect of relaxing the warping of the silica-based PLC 601 can be maximized.

In this embodiment, the longitudinal direction of the fitting grooves 607 and the longitudinal direction of the warping relaxing grooves 608 are set in parallel to the Z-axis direction (the optical axis direction of light that exits from the silica-based PLC 602 to the silica-based PLC 601 and the optical axis direction of light that enters the silica-based PLC 601 or the left-right direction of FIGS. 22A to 22C). The silica-based PLC 601 is designed with priority on reduction of transmission loss of an optical signal more than warping relaxation. That is, the two warping relaxing grooves 608 are arranged so as not to intersect the cores 612 of the optical waveguide layer 609 and not to impede optical transmission in the optical waveguide layer 609. The structure of the silica-based PLC 602 is the same as that of the silica-based PLC 601.

The silica-based PLC 603 has a structure in which an optical waveguide layer 615 configured to transmit the input signal light 620 is formed on a support substrate 613 made of Si. In the optical waveguide layer 615, an AWG (Arrayed Waveguide Grating) 616 is formed. The AWG 616 is formed by an input waveguide 621, an input-side slab waveguide 622, an array channel waveguide 623, an output-side slab waveguide 624, and an output waveguide 625 formed in a clad layer 614 made of SiO$_2$.

Additionally, in the clad layer 614, fitting grooves 617 having the same shape as the fitting grooves 607 are formed at positions that face the fitting grooves 607 of the silica-based PLCs 601 and 602 when mounting the silica-based PLCs 601 and 602 on the silica-based PLC 603. Furthermore, in the clad layer 614, a warping relaxing groove 618 is formed for the purpose of relaxing warping of the silica-based PLC 603.

The warping relaxing groove 618 is formed up to a position reaching the support substrate 613 such that the support substrate 613 is exposed to the bottom of the warping relaxing groove 618. When the clad layer 614 is cut until the support substrate 613 is exposed, the effect of relaxing the warping of the silica-based PLC 603 can be maximized.

As shown in FIG. 22C, the warping relaxing groove 618 has a shape including not only a portion extending in the Z-axis direction (the optical axis direction of light that exits from the silica-based PLC 602 to the silica-based PLC 601 and the optical axis direction of light that enters the silica-based PLC 601 or the left-right direction of FIGS. 22A to 22C) but also a portion extending in the X-axis direction (the direction perpendicular to the optical axis direction in the substrate plane), and the portion extending in the X-axis direction divides the array channel waveguide 623 of the AWG 616. Light beams that have exited from one side of the array channel waveguide 623 divided by the warping relaxing groove 618 enter the array channel waveguide 623 on the other side across the warping relaxing groove 618.

Additionally, in this embodiment, the warping relaxing groove 618 is filled with a filling material 626 having a thermal expansion coefficient different from the thermal expansion coefficient of the constituent substance (SiO$_2$) of the clad layer 614. As the filling material 626, a substance whose hardness is lower than that of the constituent substance (SiO$_2$) of the clad layer 614 is used. An example of the substance is silicone. When the temperature dependence of silicone is used, the temperature dependence of the AWG 616 can be canceled. Hence, the warping relaxing groove 618 filled with the filling material 626 simultaneously provides two functions of relaxing warping of the silica-based PLC 603 and athermalizing the AWG 616.

A method of mounting the silica-based PLCs 601 and 602 on the silica-based PLC 603 using the spacer optical fibers 606 (spacer members) is the same as in the 13th embodiment, and a description thereof will be omitted.

In this way, the silica-based PLCs 601 and 602 can be mounted on the silica-based PLC 603 such that a connection end face 61 of the silica-based PLC 601 and a connection end face 62 of the silica-based PLC 602 face each other at close range, and simple optical connection at an accuracy of submicron level and size reduction of the optical circuit can be implemented.

Additionally, in this embodiment, since the warping relaxing grooves 608 and 618 reaching the support substrates 610 and 613 are formed in the optical waveguide layers 609 and 615 of the silica-based PLCs 601, 602, and 603, it is possible to relax warping of the silica-based PLCs 601, 602, and 603 caused by the difference in the thermal expansion coefficient between the support substrates 610 and 613 made of Si and the optical waveguide layers 609 and 615 (clad layers 611 and 614), and suppress an increase in the loss of optical connection due to the axis deviation and gap expansion between the silica-based PLCs 601 and 602 caused by the warping of the silica-based PLCs 601, 602, and 603. Furthermore, in this embodiment, the warping relaxing groove 618 is filled with the filling material 626, thereby simultaneously implementing relaxation of warping of the silica-based PLC 603 and athermalization of the AWG 616.

Note that in the present invention, in what kind of form the input signal light is input to the PPCP or in what kind of form the output signal light is output not particularly limited. That is, for the input signal light, an arbitrary input method such as input by a spatial optical system, input by an optical fiber via optical fiber block adhesion, or input from a light-emitting element/modulation element such as a laser diode that includes no optical signal input surface on the end face of the PLC and is arranged on or inside the PLC can be used. For the output signal light, an arbitrary output method such as output by a spatial optical system, output by an optical fiber via optical fiber block adhesion, or output to a light-receiving element such as a photodiode that includes no optical signal output surface on the end face of the PLC and is arranged on or inside the PLC can be used.

Additionally, in the present invention, what kind of optical circuit the PLC that constitutes the PPCP includes is not particularly limited. The optical circuit shown in each of the 10th to 15th embodiments includes only a simple linear optical waveguide or an AWG. This is merely an example, and possible examples are not limited to the two circuits. That is, the PPCP technique and the present invention are independent of the type and arrangement of the optical circuit.

In the 10th to 15th embodiments, spacer optical fibers are used as all the members used to join the PLC or the base substrate. As the spacer member, a member or a material or a shape other than the spacer optical fiber may be used as long as it can appropriately be fitted in a groove. More specifically, as the material of the spacer member, a metal, a ceramic, a polymer, or the like can arbitrarily be employed other than glass. In addition, as the shape of the spacer member, a spherical shape, a trapezoidal shape, a polygonal columnar shape, an ellipsoidal shape, or the like can arbitrarily be employed other than the cylindrical shape.

In the 10th to 15th embodiments, two or more fitting grooves 107, 115, 207, 215, 307, 315, 407, 417, 507, 517, 607, or 617 suffice per PLC (or per base substrate). The spacer optical fibers 106, 206, 306, 406, 506, or 606 need only be provided in number according to the fitting grooves 107, 115, 207, 215, 307, 315, 407, 417, 507, 517, 607, or 617.

At least one warping relaxing groove 108, 208, 308, 316, 408, 418, 508, 518, 608, or 618 suffices per PLC (or per base substrate).

Additionally, in the 10th to 15th embodiments, the height of the spacer optical fibers 106, 206, 306, 406, 506, or 606 is preferably higher than the sum of the depths of upper and lower fitting grooves in which the spacer optical fibers 106, 206, 306, 406, 506, or 606 are fitted.

16th Embodiment

Figure 35A:
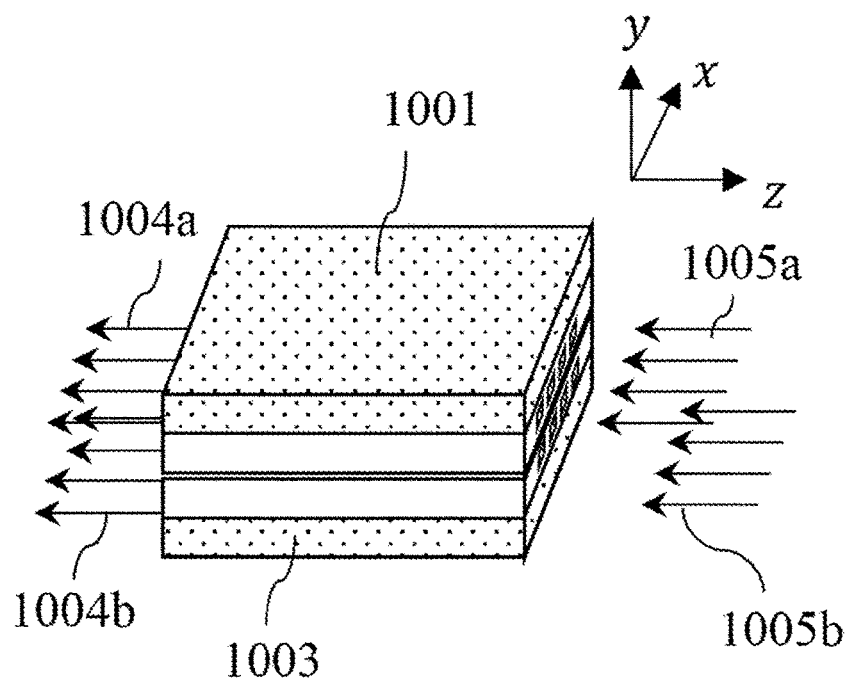
Figure 35B:
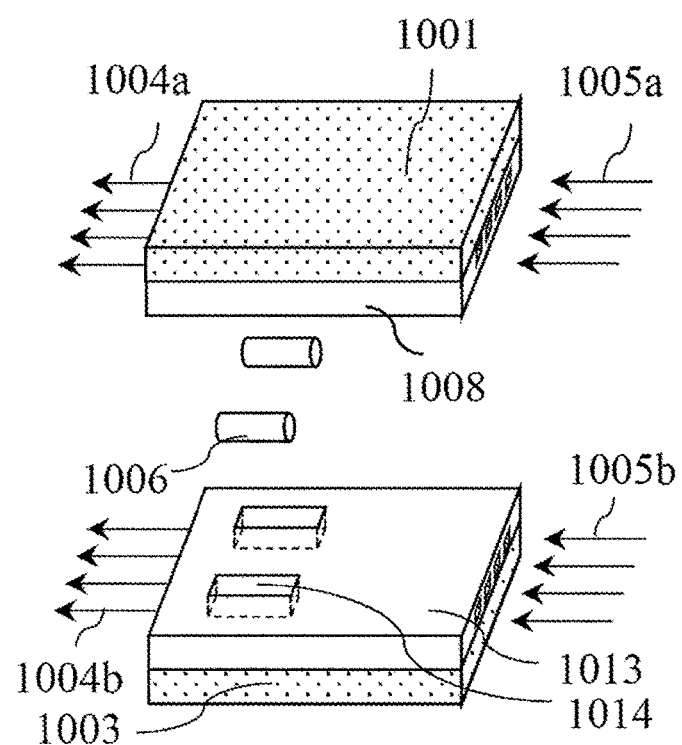

In a PPCP, the spacer optical fibers and the fitting grooves in the base substrate and the spacer optical fibers and the fitting grooves in the silica-based PLC need to be in tangential contact. Normally, when the silica-based PLC is mounted on the base substrate, fitting itself between the fitting grooves and the spacer optical fibers is established. However, perfect fitting as shown in FIG. 35D cannot always be implemented because of an internal factor such as warping of the silica-based PLC and the base substrate or an external factor such as dust or vibration, and an error is generated in the mounting accuracy.

For example, in an optical waveguide chip such as a silica-based PLC, an optical waveguide layer is formed on a substrate. Since the substrate, the clad, the core, and the like are made of different materials into different thicknesses, the optical waveguide chip itself has a bimetal structure, and warping occurs in actuality. If warping of the optical waveguide chip is large, sufficient tangential contact cannot be implemented on one side of a groove only by mounting the optical waveguide chip on the base substrate such that the spacers are fitted in two grooves of the optical waveguide chip. This insufficient fitting influences the floating of the optical waveguide chip, that is, the disturbance of height from the base substrate. In addition, if slight dust exists in the groove of the optical waveguide chip, the dust impedes the tangential contact between the groove and the spacer.

Furthermore, to make the optical waveguide chip have a structure detachable from the base substrate using the PPCP technique, the base substrate and the optical waveguide chip cannot be fixed by an adhesive or the like. For this reason, if a vibration, impact, heat, or the like is applied from the outside, tangential contact between the grooves and the spacers is disturbed, as described above, and an error is generated in the mounting accuracy.

The 16th to 19th embodiments of the present invention arm at stably implementing a high mounting accuracy even if warping of a chip, dust, or vibration impact after mounting exists when an optical waveguide chip is mounted by passive alignment mounting using the PPCP technique.

Figure 23:
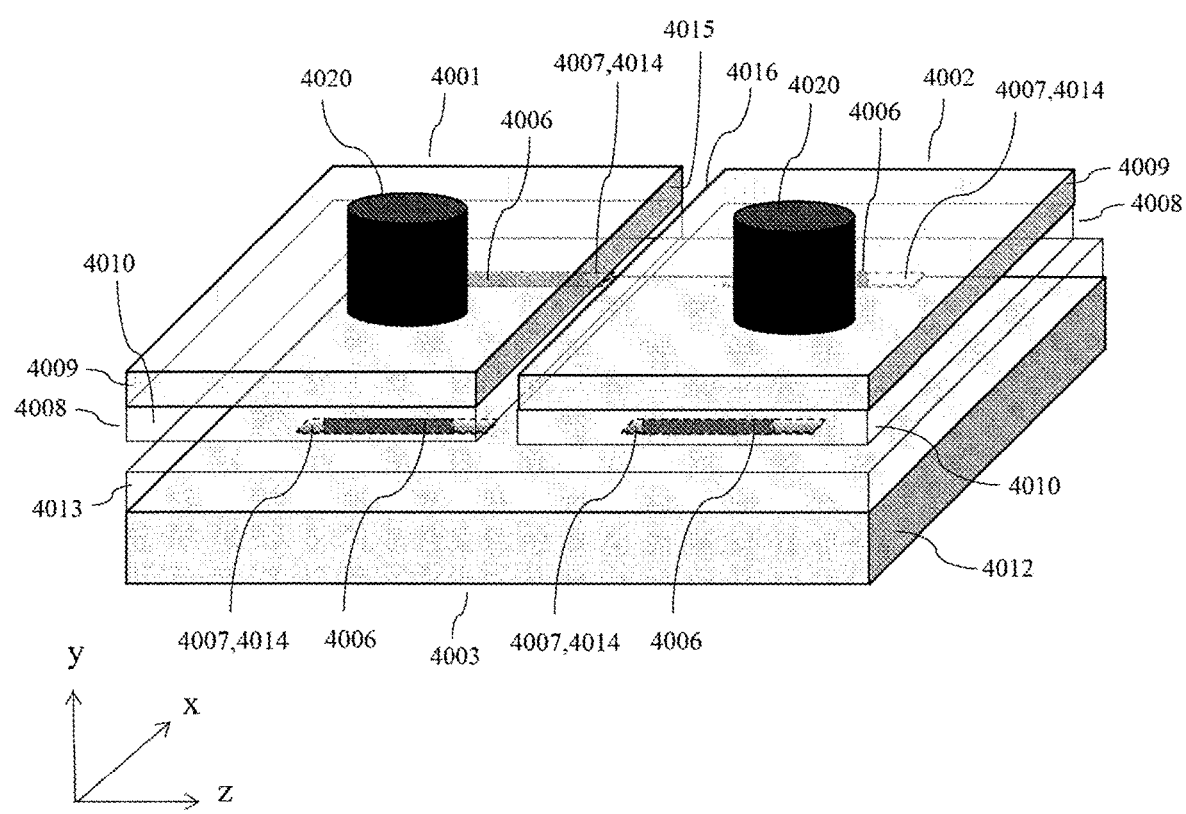
FIG. 23 is a perspective view showing a connection structure of optical waveguide chips according to the 16th embodiment of the present invention.

FIG. 23 is a perspective view showing a connection structure of optical waveguide chips according to the 16th embodiment of the present invention. In this embodiment as well, the structures of silica-based PLCs 4001 and 4002 that are two optical waveguide chips and a silica-based base substrate 4003 on which the silica-based PLCs 4001 and 4002 are mounted are the same as in the first embodiment.

Note that various kinds of functional circuits configured to process a signal, such as a switch and a wavelength multiplexer/demultiplexer, are mounted as needed on an optical waveguide chip. However, the present invention does not depend on the circuit arrangement in the optical waveguide chip and the functions of the circuits. In fact, an appropriate optical circuit is formed in the optical waveguide chip in an arrangement to avoid fitting grooves to be described later. However, since the present invention does not depend on the arrangement of the circuit, as described above, FIG. 23 shows an example including only a linear waveguide, and other circuit arrangements are omitted for the sake of simple description.

In this embodiment, a total of nine members, that is, the silica-based PLCs 4001 and 4002 that are two optical waveguide chips, the silica-based base substrate 4003 that is manufactured by the same method as the silica-based PLCs 4001 and 4002 and includes no waveguide, four spacer optical fibers (spacer members) 4006, and pressing mechanisms 4020 that press the silica-based PLCs 4001 and 4002, respectively, are combined, thereby forming a connection structure of the optical waveguide chips.

As in the first embodiment, the silica-based PLC 4001 has a structure in which an optical waveguide layer 4008 is formed on an Si substrate 4009. The optical waveguide layer 4008 is formed by a clad layer 4010 made of silica glass, and cores (not shown) formed in the clad layer 4010. In addition, fitting grooves 4007 (second grooves) are formed in the clad layer 4010. The structure of the silica-based PLC 4002 is the same as that of the silica-based PLC 4001. In this embodiment, two fitting grooves 4007 are formed in one PLC.

As in the first embodiment, a silica glass layer 4013 made of the same material as the clad layers 4010 of the silica-based PLCs 4001 and 4002 is formed on the surface of an Si substrate 4012 of the silica-based base substrate 4003 on which the silica-based PLCs 4001 and 4002 are mounted. In the silica glass layer 4013, fitting grooves 4014 (first grooves) are formed at positions that face the fitting grooves 4007 of the silica-based PLCs 4001 and 4002 when mounting the silica-based PLCs 4001 and 4002 on the silica-based base substrate 4003. Since two fitting grooves 4007 are formed in one PLC, as described above, a total of four fitting grooves 4014, that is, two fitting grooves 4014 formed at positions facing the fitting grooves 4007 of the silica-based PLC 4001 and two fitting grooves 4014 formed at positions facing the fitting grooves 4007 of the silica-based PLC 4002 are formed in the silica glass layer 4013.

To manufacture the connection structure according to this embodiment, the spacer optical fibers 4006 are respectively fitted in the four fitting grooves 4014 formed in the silica glass layer 4013 of the silica-based base substrate 4003. Then, the two spacer optical fibers 4006 fitted in the fitting grooves 4014 of the silica glass layer 4013 are fitted in the two fitting grooves 4007 formed in the optical waveguide layer 4008 of the silica-based PLC 4001 such that the joint surface of the silica glass layer 4013 and the joint surface of the optical waveguide layer 4008 (clad layer 4010) of the silica-based PLC 4001 face each other, that is, such that the Si substrate 4009 is located on the upper side, and the optical waveguide layer 4008 is located on the lower side, thereby mounting the silica-based PLC 4001 on the silica-based base substrate 4003.

Similarly, the two spacer optical fibers 4006 fitted in the fitting grooves 4014 of the silica glass layer 4013 are fitted in the two fitting grooves 4007 formed in the optical waveguide layer 4008 of the silica-based PLC 4002 such that the joint surface of the silica glass layer 4013 and the joint surface of the optical waveguide layer 4008 (clad layer 4010) of the silica-based PLC 4002 face each other, thereby mounting the silica-based PLC 4002 on the silica-based base substrate 4003.

In this way, the silica-based PLCs 4001 and 4002 can be mounted on the silica-based base substrate 4003 by passive alignment mounting, as in the first embodiment, and the optical connection between the silica-based PLC 4001 and the silica-based PLC 4002 can be implemented.

The fitting grooves 4007 and 4014 are formed by photolithography and etching such that a direction (the optical axis direction of light that exits from the silica-based PLC 4002 to the silica-based PLC 4001) in which the gap between a connection end face (incident/exit end face) 4015 of the silica-based PLC 4001 and a connection end face (incident/exit end face) 4016 of the silica-based PLC 4002 becomes small becomes the longitudinal direction.

The fitting grooves 4007 of the silica-based PLCs 4001 and 4002 are formed up to positions reaching the Si substrate 4009 such that the Si substrate 4009 is exposed to the bottoms of the fitting grooves 4007. Similarly, the fitting grooves 4014 of the silica-based base substrate 4003 are formed up to positions reaching the Si substrate 4012 such that the Si substrate 4012 is exposed to the bottoms of the fitting grooves 4014. This reduces the influence of the error in the height direction of the optical waveguide layers 4008 of the silica-based PLCs 4001 and 4002 on the silica-based substrate 4003, as in the first embodiment.

The four spacer optical fibers 4006 each form a columnar spacer member having a diameter of, for example, 125 μm.

As the characteristic feature of this embodiment, the pressing mechanism 4020 is mounted at the gravity center position of each of the silica-based PLCs 4001 and 4002 to press the gravity center position. The pressing mechanisms 4020 press, by the weight of their own, the silica-based PLCs 4001 and 4002 in the direction of the silica-based base substrate 4003.

Figure 24A:
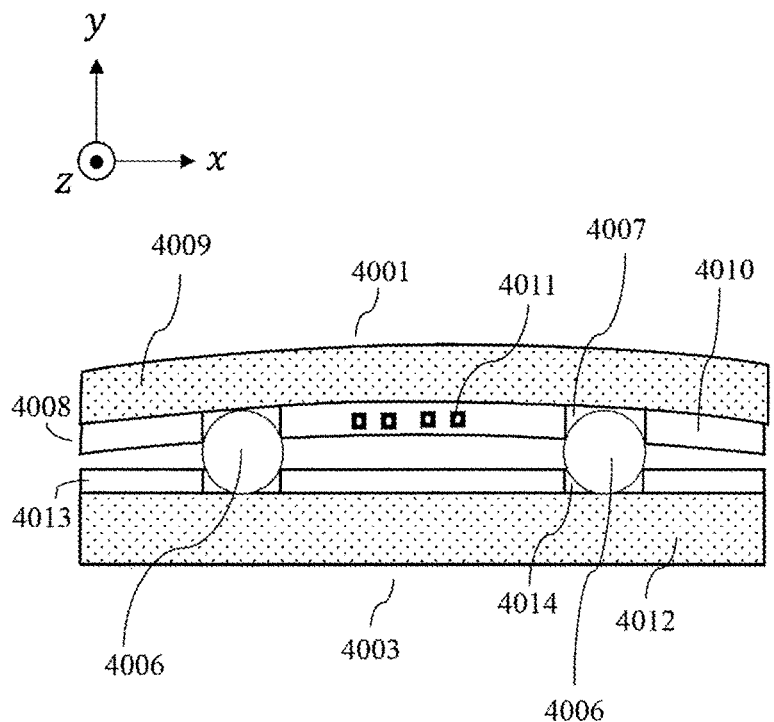
FIGS. 24A and 24B are sectional views showing a connection structure of optical waveguide chips before and after providing a pressing mechanism according to the 16th embodiment of the present invention.
Figure 24B:
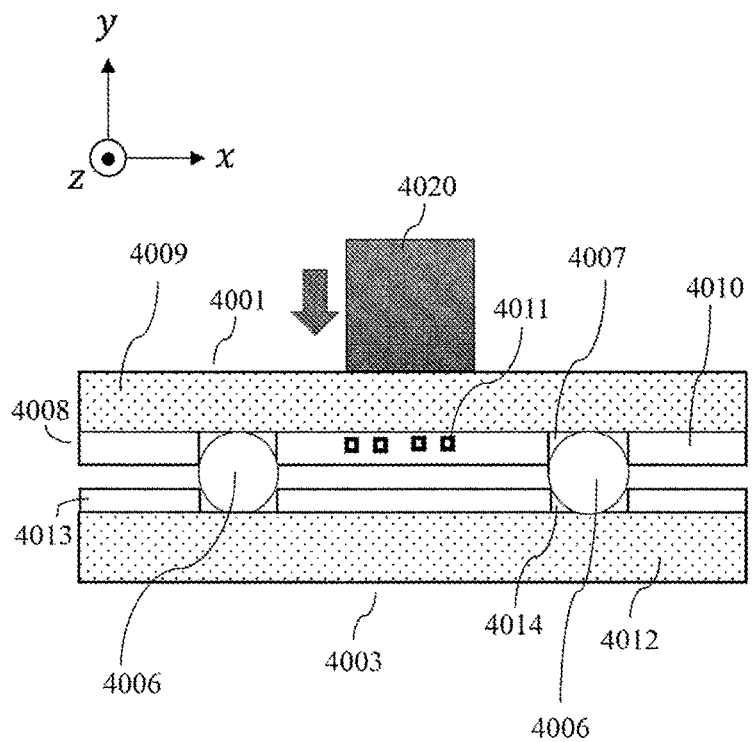

FIG. 24A is a sectional view showing the connection structure of the optical waveguide chips before providing the pressing mechanism 4020. FIG. 24B is a sectional view showing the connection structure of the optical waveguide chips after providing the pressing mechanism 4020.

As in the first embodiment, in the optical waveguide chips such as the silica-based PLCs 4001 and 4002, the optical waveguide layer 4008 is formed on the Si substrate 4009. The Si substrate 4009, the clad layer 4010, cores 4011, and the like are manufactured by different materials into different thicknesses. For this reason, unique warping occurs in the optical waveguide chip. The direction of warping of the optical waveguide chip changes depending on the materials and types of the optical waveguide and the substrate. FIG. 24A shows an example in which the warping of the optical waveguide layer 4008 is convex with respect to the Si substrate 4009.

In a case in which such warping exists, for example, as shown in FIG. 24A, microscopically, the bottom surfaces of the fitting grooves 4007 and 4014 of the silica-based PLC 4001 and the silica-based base substrate 4003 are not parallel, and tilts are generated between the bottom surface.

Even if the silica-based PLC 4001 is mounted on the silica-based base substrate 4003 by fitting the spacer optical fibers 4006 in the fitting grooves 4014 on the side of the silica-based base substrate 4003 and fitting the spacer optical fibers 4006 in the fitting grooves 4007 on the side of the silica-based PLC 4001, as in the first embodiment, tangential contact between the bottom surfaces of the fitting grooves 4007 and the spacer optical fibers 4006 cannot be implemented because of the above-described tilts between the bottom surfaces. Hence, floating of the silica-based PLC 4001, that is, an increase in the height from the silica-based base substrate 4003 occurs. This also applies to the silica-based PLC 4002.

If the material, the size, and the waveguide structure are completely the same in the silica-based PLCs 4001 and 4002, the amounts of increase in the height are the same in the two silica-based PLCs 4001 and 4002. That is, the floatings of the two silica-based PLCs 4001 and 4002 are the same, the relative positional shifts between connected core positions cancel each other, and the two silica-based PLCs 4001 and 4002 can be optically connected without positional shifts.

However, cases in which the material, the size, and the waveguide structure are the same in two optical waveguide chips are very limited cases. In fact, optical waveguide chips made of different materials in different sizes are often connected. For example, even in optical waveguide chips similarly based on silica, if the refractive index difference between the core material and the clad material is changed, warping or the like also changes, as a matter of course. In this case, the above-described floating amount of the optical waveguide chip changes, and the positions of cores in the optical waveguide shift between the two optical waveguide chips. In particular, in a case of an array waveguide or the like, loss in each waveguide channel increases, resulting in a problem in mounting.

Here, when the pressing mechanism 4020 according to this embodiment is used, the following remarkable effect can be obtained. FIG. 24B shows the positional relationship between the fitting grooves 4007 and 4014 and the spacer optical fibers 4006 after the pressing mechanism 4020 is mounted on the silica-based PLC 4001. As is apparent from FIG. 24B, the pressing mechanism 4020 mounted at the position of the gravity center of the silica-based PLC 4001 presses the silica-based PLC 4001 by an appropriate load in the direction of the silica-based base substrate 4003, and the warping of the silica-based PLC 4001 is eliminated.

As a result, in this embodiment, the silica-based PLC 4001 can be prevented from floating with respect to the silica-based base substrate 4003. For the silica-based PLC 4002 as well, floating can be prevented using the pressing mechanism 4020. In this embodiment, a large effect of eliminating the shift of the core position between the silica-based PLC 4001 and the silica-based PLC 4002 and implementing low-loss connection is thus implemented.

Additionally, when the gap between the connection end faces 4015 and 4016 of the silica-based PLCs 4001 and 4002 is filled with a refractive index matching resin or the like, Fresnel reflection of light caused by air existing in the gap between the silica-based PLCs 4001 and 4002 can be suppressed, and the connection loss between the silica-based PLCs 4001 and 4002 can be made smaller.

Figure 25A:
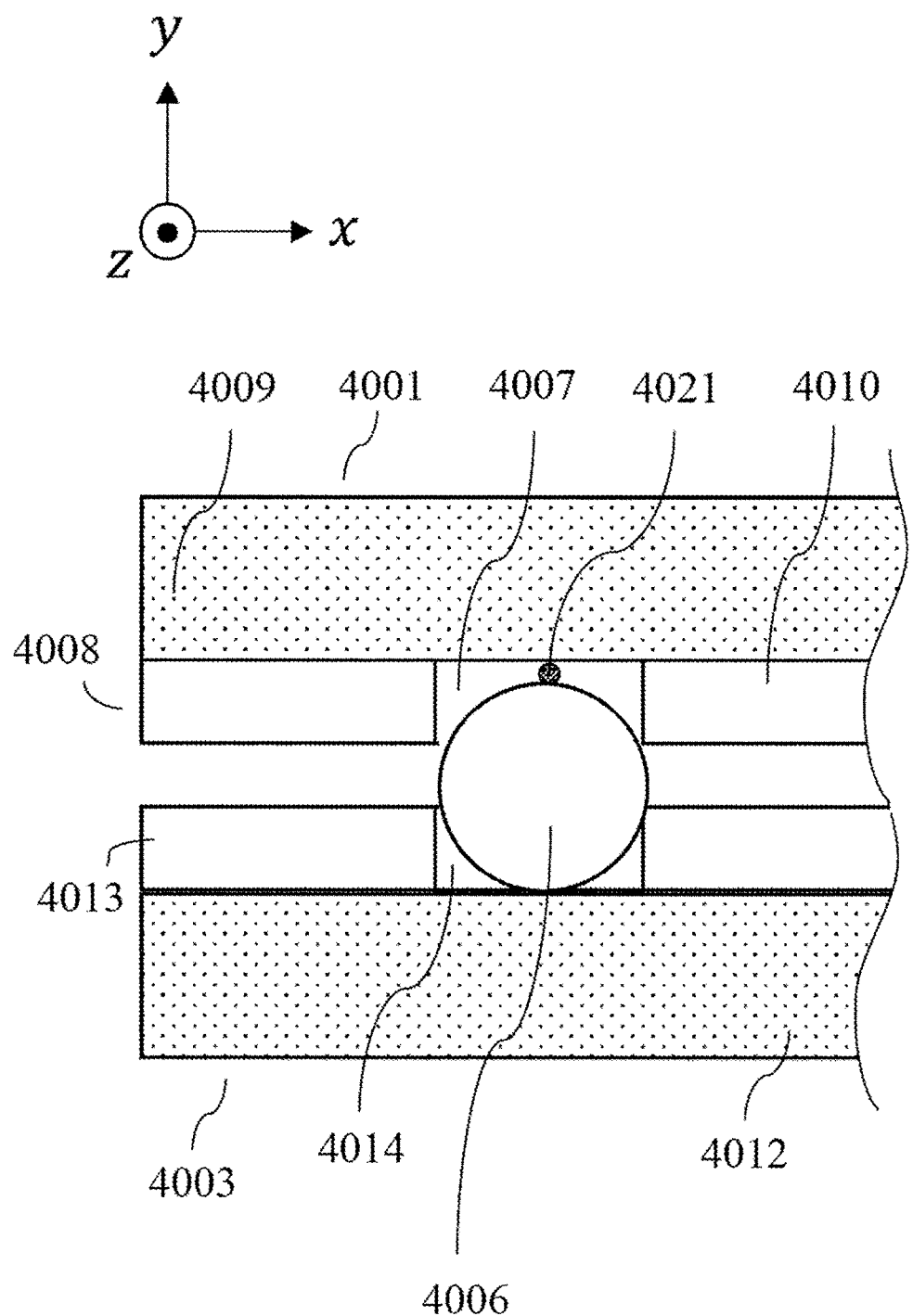
FIGS. 25A and 25B are sectional views for explaining the effect of the 16th embodiment of the present invention.
Figure 25B:
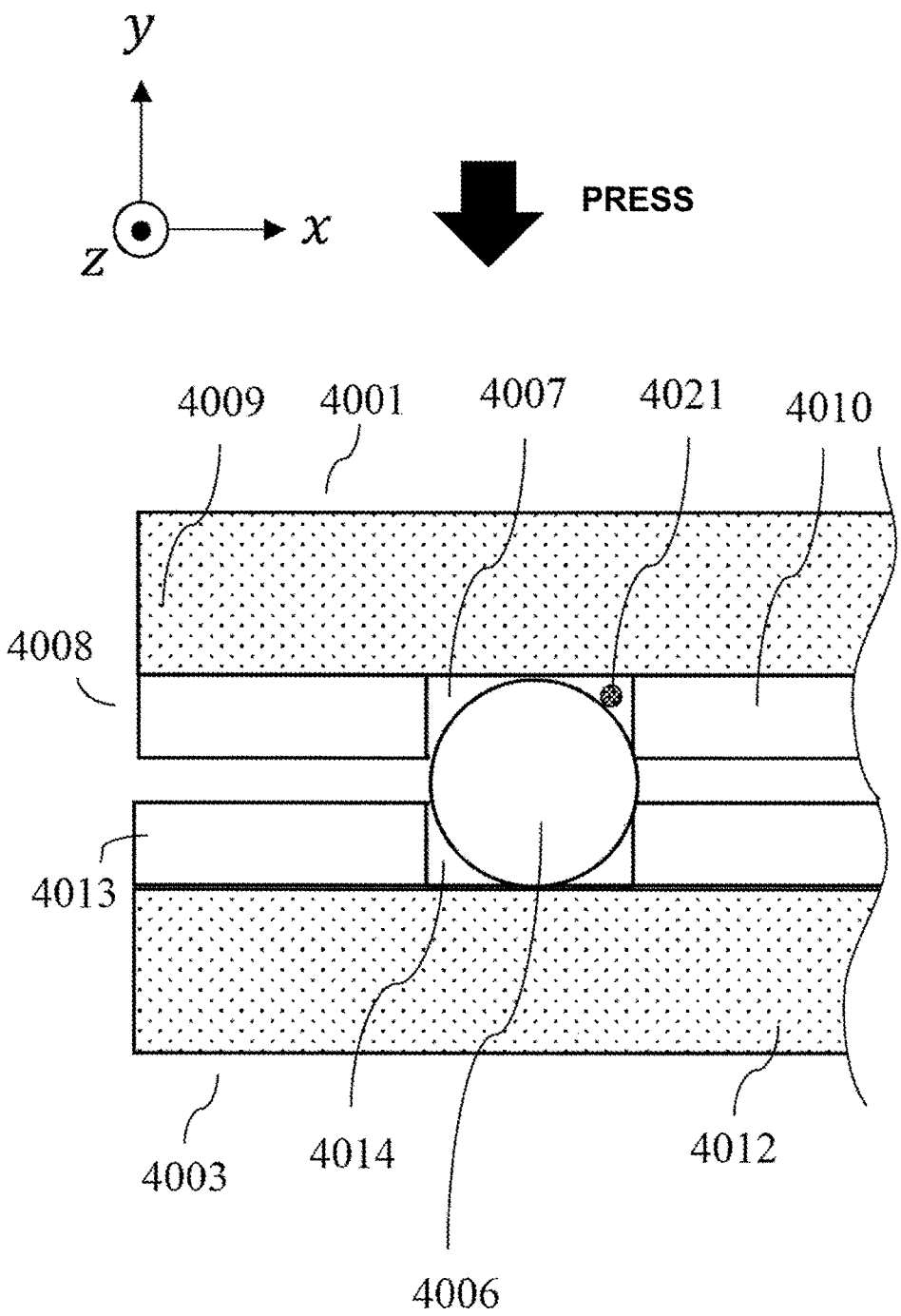

FIGS. 25A and 25B are sectional views for explaining an effect other than warping elimination according to this embodiment, and are views for explaining the effect of eliminating a contact failure between the fitting groove 4007 or 4014 and the spacer optical fiber 4006 in a case in which dust sticks to the fitting groove 4007 or 4014 or the spacer optical fiber 4006.

In the example shown in FIG. 25A, small dust 4021 sticks on the spacer optical fiber 4006 fitted in the fitting groove 4007 of the silica-based PLC 4001. If the silica-based PLC 4001 is mounted on the silica-based base substrate 4003 in this state, the dust 4021 enters between the spacer optical fiber 4006 and the fitting groove 4007, and the silica-based PLC 4001 floats with respect to the silica-based base substrate 4003.

To solve this, in this embodiment, when the pressing mechanism 4020 presses the silica-based PLC 4001 in the direction of the silica-based base substrate 4003, the dust 4021 on the spacer optical fiber 4006 moves, as shown in FIG. 25B. It is therefore possible to obtain the effect of implementing tangential contact between the spacer optical fiber 4006 and the fitting groove 4007 and implementing low-loss connection.

At the time of the manufacture of the connection structure, a process of appropriately applying a vibration to make the silica-based PLCs 4001 and 4002 swing in the horizontal direction while pressing the silica-based PLCs 4001 and 4002 by the pressing mechanisms 4020 is preferably added because the dust 4021 can readily move. Note that this embodiment is effective not only in a case in which the dust 4021 sticks to the spacer optical fiber 4006 but also in a case in which the dust 4021 sticks to the fitting grooves 4007 or 4014.

Additionally, in this embodiment, since the pressing mechanisms 4020 are provided, it is also possible to obtain the effect of preventing resonance or disengagement of the connection portion, which occurs when a vibration or impact is applied to the silica-based PLCs 4001 and 4002, and maintaining a stable connection structure.

The pressing mechanism 4020 is preferably a pressing mechanism that can apply, to the silica-based PLC 4001 or 4002, an appropriate load capable of eliminating the above-described contact failure between the fitting grooves 4007 or 4014 and the spacer optical fiber 4006. In the example shown in FIG. 23, a mechanism that presses the silica-based PLC 4001 or 4002 by the weight of the pressing mechanism 4020 itself is used. A pressing mechanism of another structure may be used as long as it can prevent floating of the silica-based PLC 4001 or 4002 with respect to the silica-based base substrate 4003, as described with reference to FIG. 24B.

Figure 26A:
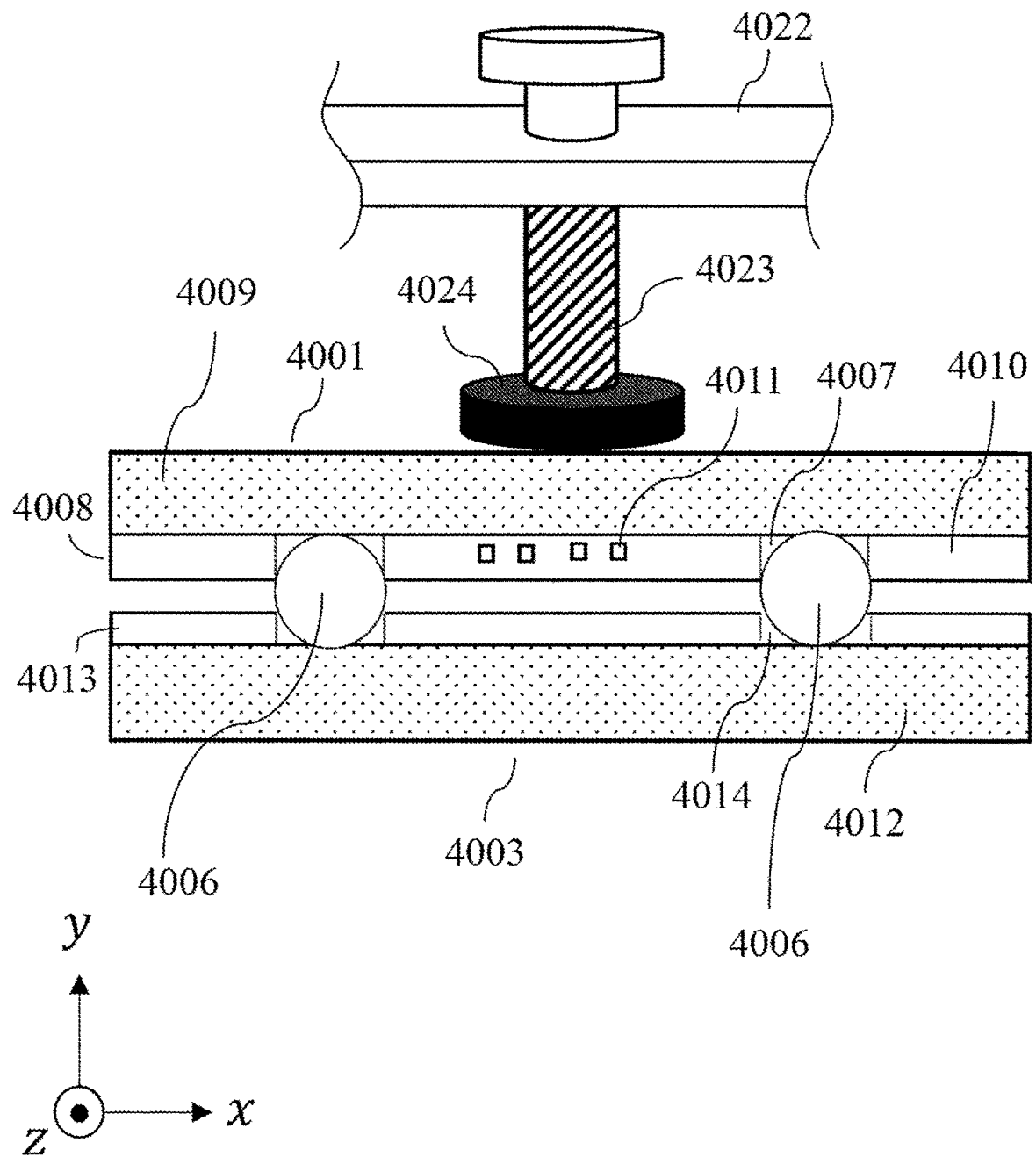
FIGS. 26A and 26B are schematic views showing another example of the pressing mechanism according to the 16th embodiment of the present invention.

For example, in an example shown in FIG. 26A, a pressing mechanism 4020a is formed by a fixed member 4022 that holds the pressing mechanism 4020a, a screw 4023 that threadably engages with the screw hole of the fixed member 4022, and a pressing member 4024 attached to the distal end of the screw 4023. In the example shown in FIG. 26A, when the screw 4023 threadably engaging with the fixed member 4022 is rotated with respect to the fixed member 4022 whose X-, Y-, and Z-direction positions are fixed, the pressing member 4024 presses the silica-based PLC 4001.

Figure 26B:
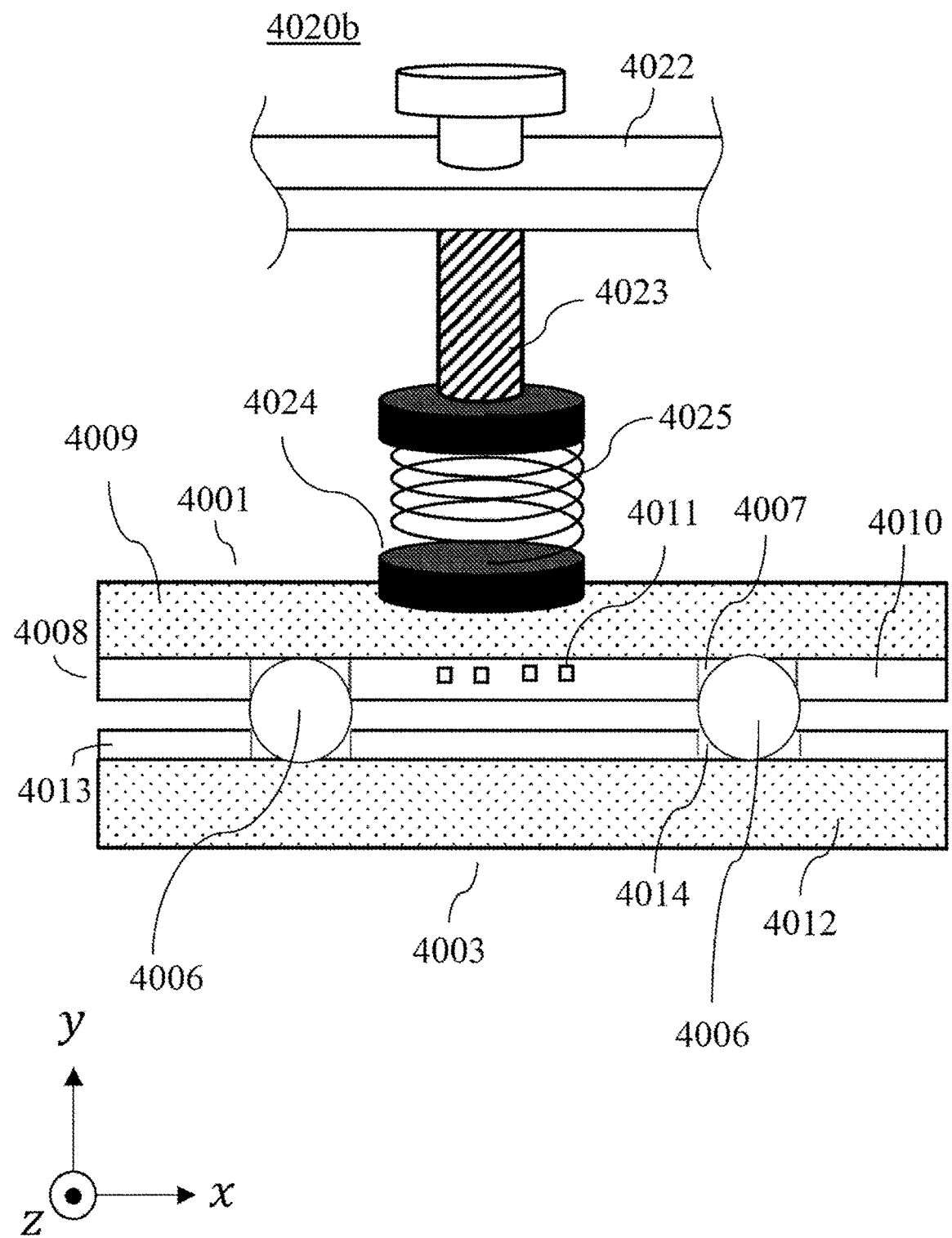

Additionally, in an example shown in FIG. 26B, a pressing mechanism 4020b is formed by the fixed member 4022, the screw 4023, the pressing member 4024, and a spring mechanism 4025 such as a coil spring or a plunger provided between the screw 4023 and the pressing member 4024. In the example shown in FIG. 26B, instead of directly pressing the pressing member 4024 by the screw 4023, the pressing member 4024 is pressed by the restoring force of the spring mechanism 4025, thereby pressing the silica-based PLC 4001.

In addition, the pressing mechanism may have a structure for applying a pressure to the whole structure via an elastic resin or the like.

Furthermore, each of the pressing mechanism 4020, 4020a, and 4020b is preferably integrated with a mechanism that coarsely aligns the silica-based base substrate 4003 and the silica-based PLCs 4001 and 4002. To implement accurate alignment by fitting using the PPCP technique, three steps are needed. That is, a first step of fixing the silica-based base substrate 4003 and coarsely aligning the positions of the silica-based base substrate 4003 and all the silica-based PLCs 4001 and 4002 such that the spacer optical fibers 4006 are almost fitted in the fitting grooves 4007 and 4014, a second step of performing accurate alignment by passive alignment mounting of fitting the spacer optical fibers 4006 in the fitting grooves 4007 and 4014, and a third step of preventing floating and the like at the time of fitting by the pressing mechanism 4020, 4020a, or 4020b are needed.

Hence, it is preferable to integrate a holding mechanism that holds the silica-based base substrate 4003, an alignment mechanism integrated with the holding mechanism and configured to align the mounting positions of the silica-based PLCs 4001 and 4002, and the pressing mechanism 4020, 4020a, or 4020b. By this integration, more efficient mounting can be implemented.

These mechanisms can be implemented by a mechanical jig structure. For example, the holding mechanism can be implemented as a mechanism configured to hold the silica-based base substrate 4003 by a means such as a screw, suction, or abutment. Similarly, the alignment mechanism can be implemented as a mechanism configured to hold and align the silica-based PLCs 4001 and 4002.

When employing the pressing mechanism 4020, the pressing mechanism 4020 is suspended from the holding mechanism and the alignment mechanism by a wire or the like, and the silica-based PLC 4001 is pressed by the weight of the pressing mechanism 4020 itself. In addition when employing the pressing mechanism 4020a or 4020b, the fixed member 4022 is attached to the holding mechanism and the alignment mechanism.

Note that in this embodiment, an example in which the silica glass layer 4013 of the silica-based base substrate 4003 is manufactured by the same process as that of the optical waveguide layers 4008 of the silica-based PLCs 4001 and 4002 has been described. However, the silica glass layer 4013 may be manufactured by another manufacturing method. For example, the same effect as described above can be obtained even by V-groove machining or machining using dicing or the like or laser machining as long as uniform fitting grooves 4007 and 4014 can be formed. In addition, the silica-based base substrate 4003 need not always include a waveguide layer, and the width and depth of the fitting grooves 4014 need only be the same as those of the fitting grooves 4007 on the chip side. For example, as for the silica-based base substrate 4003, the fitting grooves 4014 may be formed by machining such as dicing or an etching technique on an Si substrate, a glass substrate, a ceramic substrate, or a metal substrate. This also applies to the subsequent embodiments.

Additionally, in this embodiment, an example of connection of two optical waveguide chips has been described. However, the present invention can also be applied to connection of a plurality of, for example, three or four or more optical waveguides.

17th Embodiment

Figure 27:
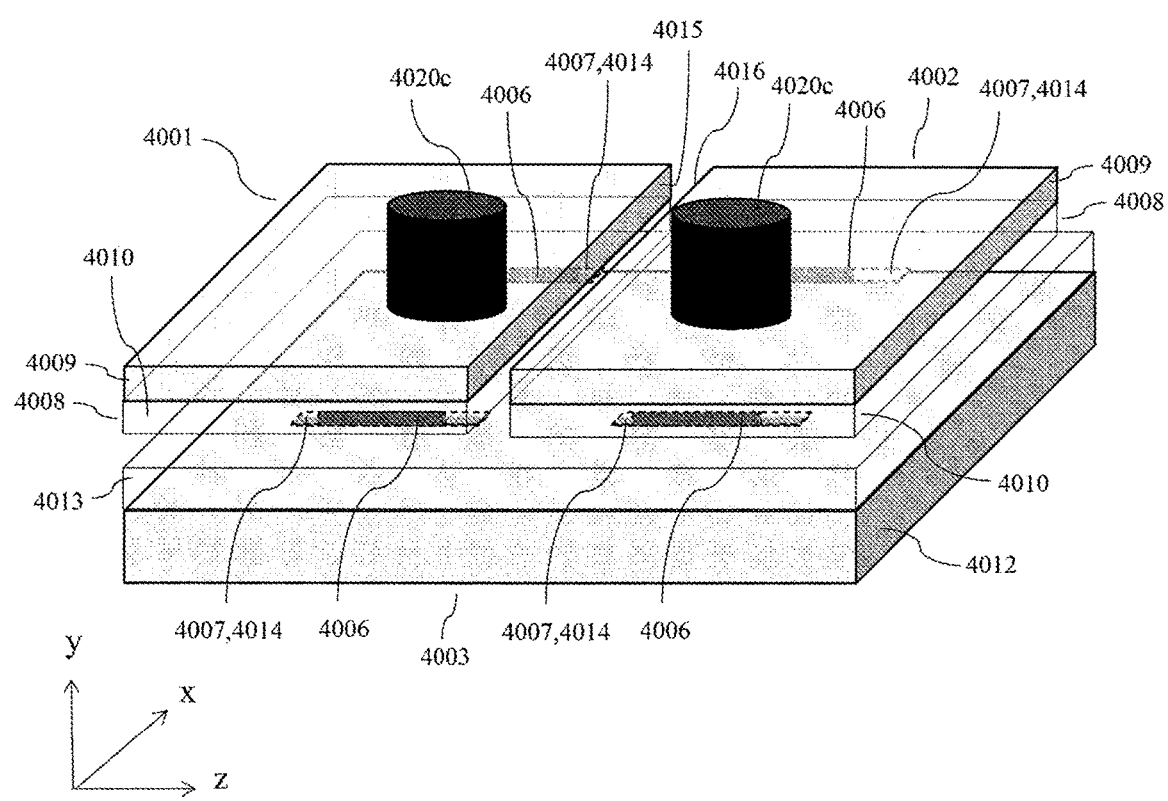
FIG. 27 is a perspective view showing a connection structure of optical waveguide chips according to the 17th embodiment of the present invention.

The 17th embodiment of the present invention will be described next. FIG. 27 is a perspective view showing a connection structure of optical waveguide chips according to the 17th embodiment of the present invention, and the same reference numerals as in FIG. 23 denote the same components in FIG. 27. A form similar to the connection structure of optical waveguide chips according to the 16th embodiment will be described as an example with reference to FIG. 27. Pressing positions of pressing mechanisms 4020c are not the gravity center positions of silica-based PLCs 4001 and 4002, and are shifted to positions near connection end faces 4015 and 4016 of the silica-based PLCs 4001 and 4002.

Additionally, in the 16th embodiment, an example of warping in which the optical waveguide layer 4008 of the silica-based PLC 4001 or 4002 becomes convex with respect to the Si substrate 4009 has been described. In this embodiment, a case in which an optical waveguide layer 4008 becomes concave with respect to an Si substrate 4009 is assumed.

When the positions near the connection end faces 4015 and 4016 of the silica-based PLCs 4001 and 4002 are pressed, as in this embodiment, the following effect can be obtained. That is, in this embodiment, the two silica-based PLCs 4001 and 4002 are connected using the PPCP technique, as in the 16th embodiment. In the silica-based PLCs 4001 and 4002 themselves, slight warping occurs such that the optical waveguide layers 4008 become concave with respect to the Si substrate 4009. The warping occurs not only in the chip width direction (X direction) in FIG. 27 but also similarly in the chip longitudinal direction (Z direction).

In the 16th embodiment, by the structure in which two columnar spacer optical fibers 4006 whose longitudinal direction is the Z direction are arranged per chip along the X-axis direction, and the gravity center position of each of the silica-based PLCs 4001 and 4002 is pressed to the side of the silica-based base substrate 4003, warping of the silica-based PLCs 4001 and 4002 along two axes, that is, in the X direction and the Z direction can be relaxed.

On the other hand, in this embodiment, since the direction of warping in the silica-based PLCs 4001 and 4002 is reverse to that in the 16th embodiment, the pressing mechanisms configured to press the silica-based PLCs 4001 and 4002 to the side of the silica-based base substrate 4003 are pressed to the gravity center positions of the silica-based PLCs 4001 and 4002, so that pressing is performed in a direction of increasing the warping.

To prevent this, in this embodiment, the positions to be pressed by the pressing mechanisms 4020c are shifted from the gravity center positions of the silica-based PLCs 4001 and 4002 to positions near the connection end faces 4015 and 4016.

Figure 28A:
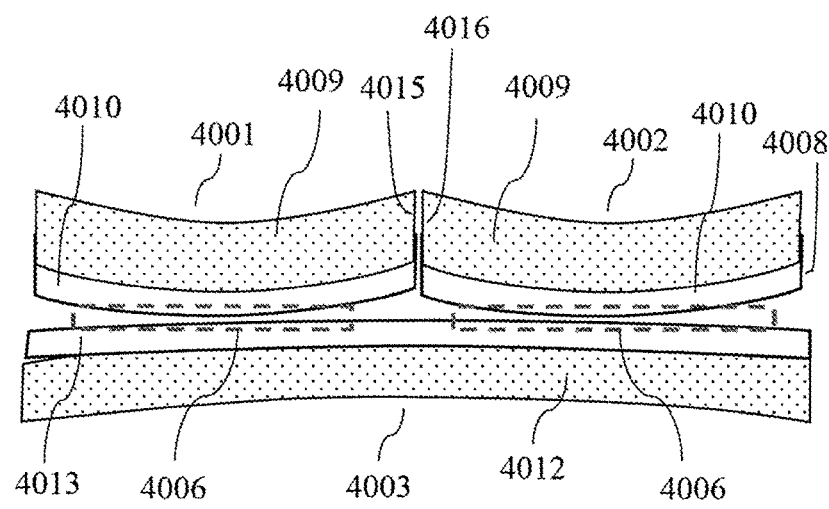
FIGS. 28A and 28B are sectional views showing a connection structure of optical waveguide chips before and after providing a pressing mechanism according to the 17th embodiment of the present invention.
Figure 28A:
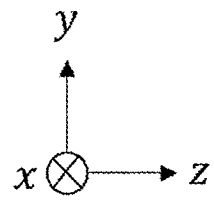
Figure 28B:
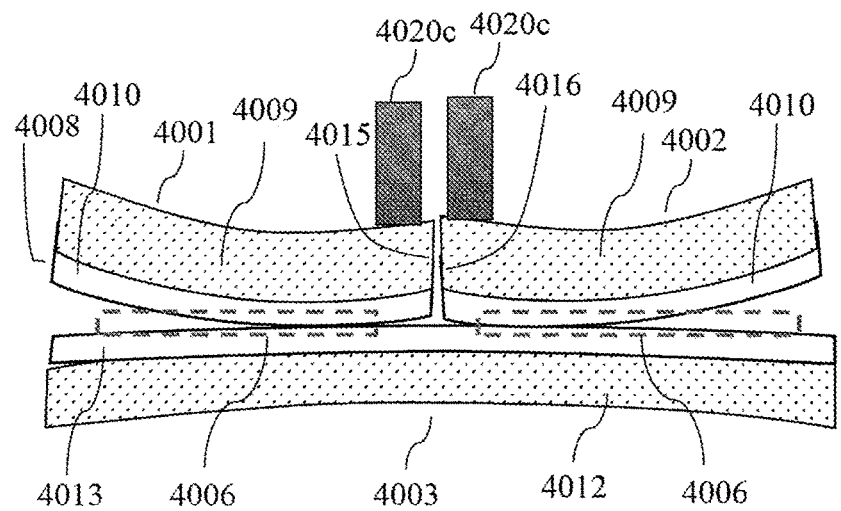
Figure 28B:
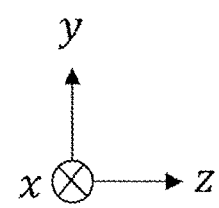

FIG. 28A is a sectional view showing the connection structure of the optical waveguide chips before providing the pressing mechanisms 4020c. FIG. 28B is a sectional view showing the connection structure of the optical waveguide chips after providing the pressing mechanisms 4020c.

When the positions near the connection end faces 4015 and 4016 of the silica-based PLCs 4001 and 4002 are pressed, as shown in FIG. 28B, the silica-based PLCs 4001 and 4002 tilt, the fitting grooves 4007 and 4014 can be brought into tangential contact with the spacer optical fibers 4006 near the connection end faces 4015 and 4016, and a state in which the silica-based PLCs 4001 and 4002 float with respect to the silica-based base substrate 4003 near the connection end faces 4015 and 4016 can be eliminated.

Here, portions that need to be actually aligned for the purpose of the present invention are portions near the connection end faces 4015 and 4016 of the two silica-based PLCs 4001 and 4002. For this reason, the silica-based PLCs 4001 and 4002 are tilted by pressing of the pressing mechanisms 4020c, and the fitting between the fitting grooves 4007 and 4014 and the spacer optical fibers 4006 is correctly established near the connection end faces 4015 and 4016, thereby largely reducing the loss of optical connection between the silica-based PLCs 4001 and 4002.

Additionally, in this embodiment, the fitting between the fitting grooves 4007 and 4014 and the spacer optical fibers 4006 is correctly established only near the connection end faces 4015 and 4016 of the silica-based PLCs 4001 and 4002. This can implement a low connection loss even if warping exists in the silica-based base substrate 4003.

Note that in this embodiment, the optical axes of the optical waveguides in the two silica-based PLCs 4001 and 4002 slightly tilt in the thickness direction (Y direction). However, when the gap between the connection end faces 4015 and 4016 of the silica-based PLCs 4001 and 4002 is filled with a refractive index matching resin or the like, the connection loss caused by the tilts of the optical axes becomes sufficiently small.

Additionally, in this embodiment, even if dust or the like exists between the fitting grooves 4007 and 4014 and the spacer optical fibers 4006, the dust can be moved, as in the 16th embodiment. In addition, only the fitting between the fitting grooves 4007 and 4014 and the spacer optical fibers 4006 near the connection end faces 4015 and 4016 is important. For this reason, even if dust exists at a portion other than near the connection end faces 4015 and 4016, fitting near the connection end faces 4015 and 4016 has no problem, and the resistance against dust can be increased.

Furthermore, in this embodiment, since the pressing mechanisms 4020c are provided, it is also possible to obtain the effect of preventing resonance or disengagement of the connection portion, which occurs when a vibration or impact is applied to the silica-based PLCs 4001 and 4002, and maintaining a stable connection structure.

As the pressing mechanism 4020c, the form of the pressing mechanism 4020 using the weight may be employed, as in the 16th embodiment, or the form of the pressing mechanism 4020a or 4020b described with reference to FIG. 26A or 26B may be employed.

Figure 29A:
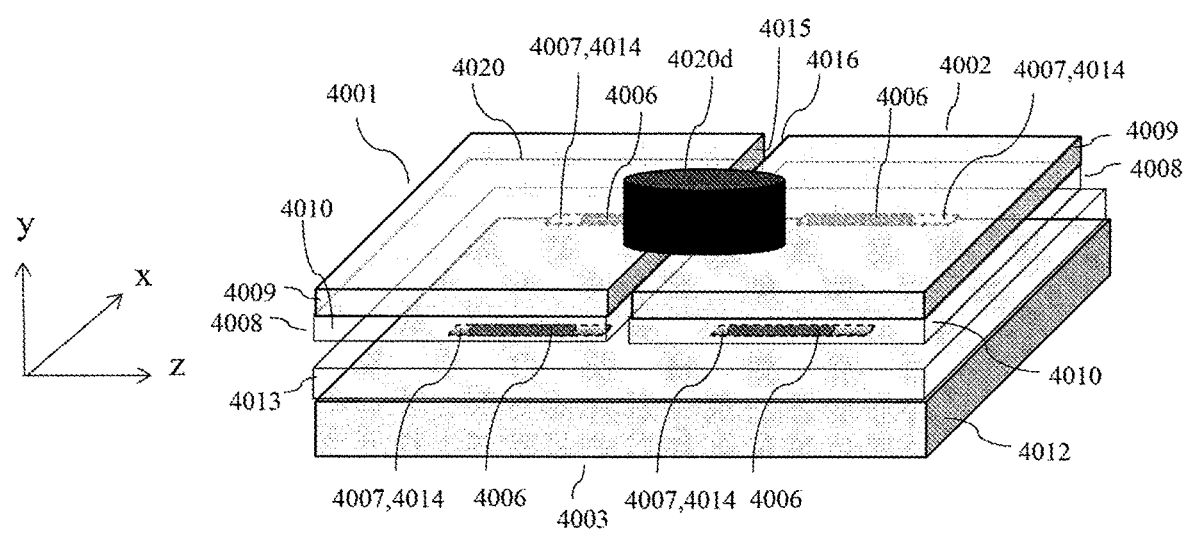
FIGS. 29A and 29B are a perspective view and a sectional view showing another example of the pressing mechanism according to the 17th embodiment of the present invention.
Figure 29B:
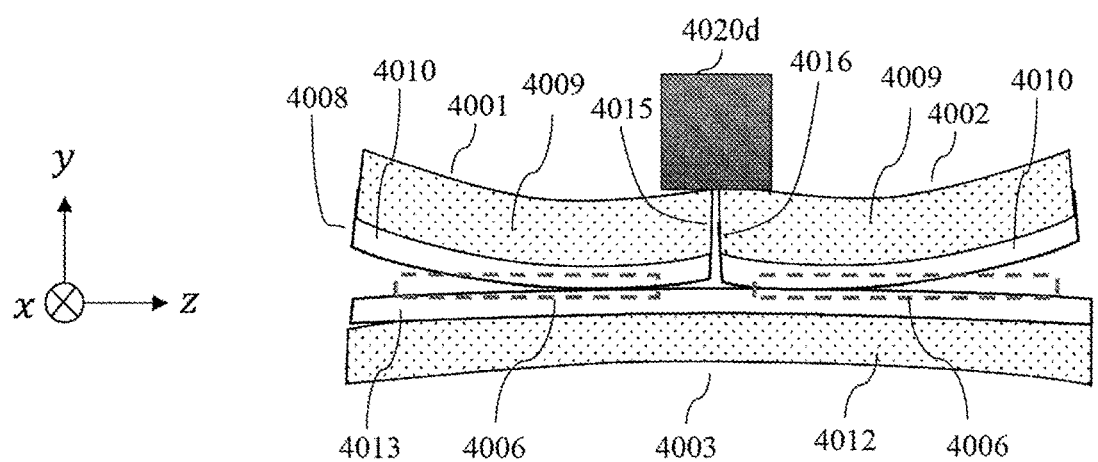

In the 16th and 17th embodiments, an example in which the pressing mechanism is provided for each of the silica-based PLCs 4001 and 4002 has been described. However, the same effect as described above can be obtained even when a common pressing mechanism 4020d is arranged near the connection end faces 4015 and 4016 of the silica-based PLCs 4001 and 4002, as shown in the perspective view of FIG. 29A and the sectional view of FIG. 29B.

When three optical waveguide chips are connected by the PPCP, for example, when another silica-based PLC is further arranged next to the right of the silica-based PLC 4002 in FIGS. 27 to 29 and optically connected, pressing mechanisms configured to press positions near the connection end faces of this silica-based PLC and the silica-based PLC 4002 are provided as described above. This can relax the state in which these silica-based PLCs float near the connection end faces, and the same effect as described above can be obtained.

18th Embodiment

Figure 30:
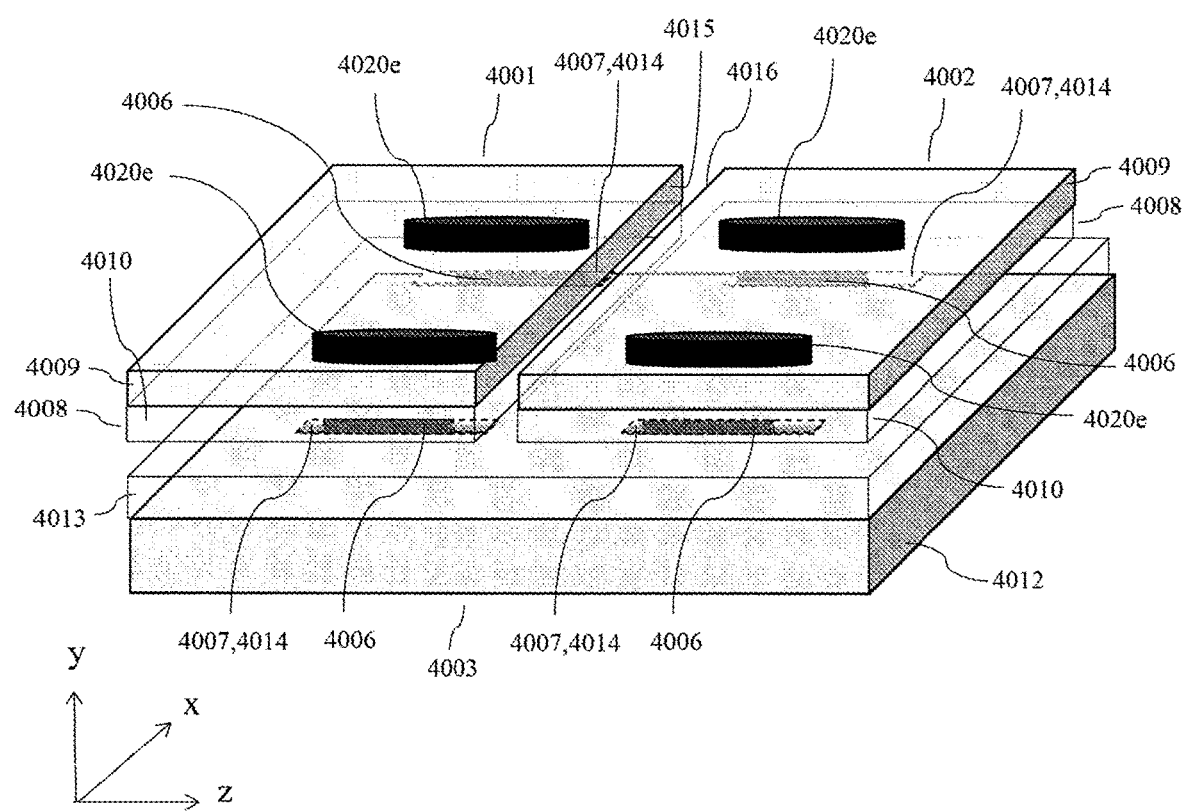
FIG. 30 is a perspective view showing a connection structure of optical waveguide chips according to the 18th embodiment of the present invention.

The 18th embodiment of the present invention will be described next. FIG. 30 is a perspective view showing a connection structure of optical waveguide chips according to the 18th embodiment of the present invention, and the same reference numerals as in FIG. 23 denote the same components in FIG. 30. A form similar to the connection structure of optical waveguide chips according to the 16th embodiment will be described as an example with reference to FIG. 30. The pressing positions of pressing mechanisms 4020e are not the gravity center positions of silica-based PLCs 4001 and 4002. The pressing mechanisms 4020e are mounted at positions immediately above spacer optical fibers 4006 fitted in fitting grooves 4007 of the silica-based PLCs 4001 and 4002.

In the example shown in FIG. 30, two fitting grooves 4007 and two fitting grooves 4014, which extend in the chip longitudinal direction (Z direction) are formed per chip. One pressing mechanism 4020e is mounted on each fitting groove. A total of two pressing mechanisms 4020e are mounted in each chip. Note that when fitting grooves extending in the chip width direction (X direction) are provided, the pressing mechanisms 4020e are mounted immediately above them along the spacer optical fibers fitted in the grooves.

Figure 31:
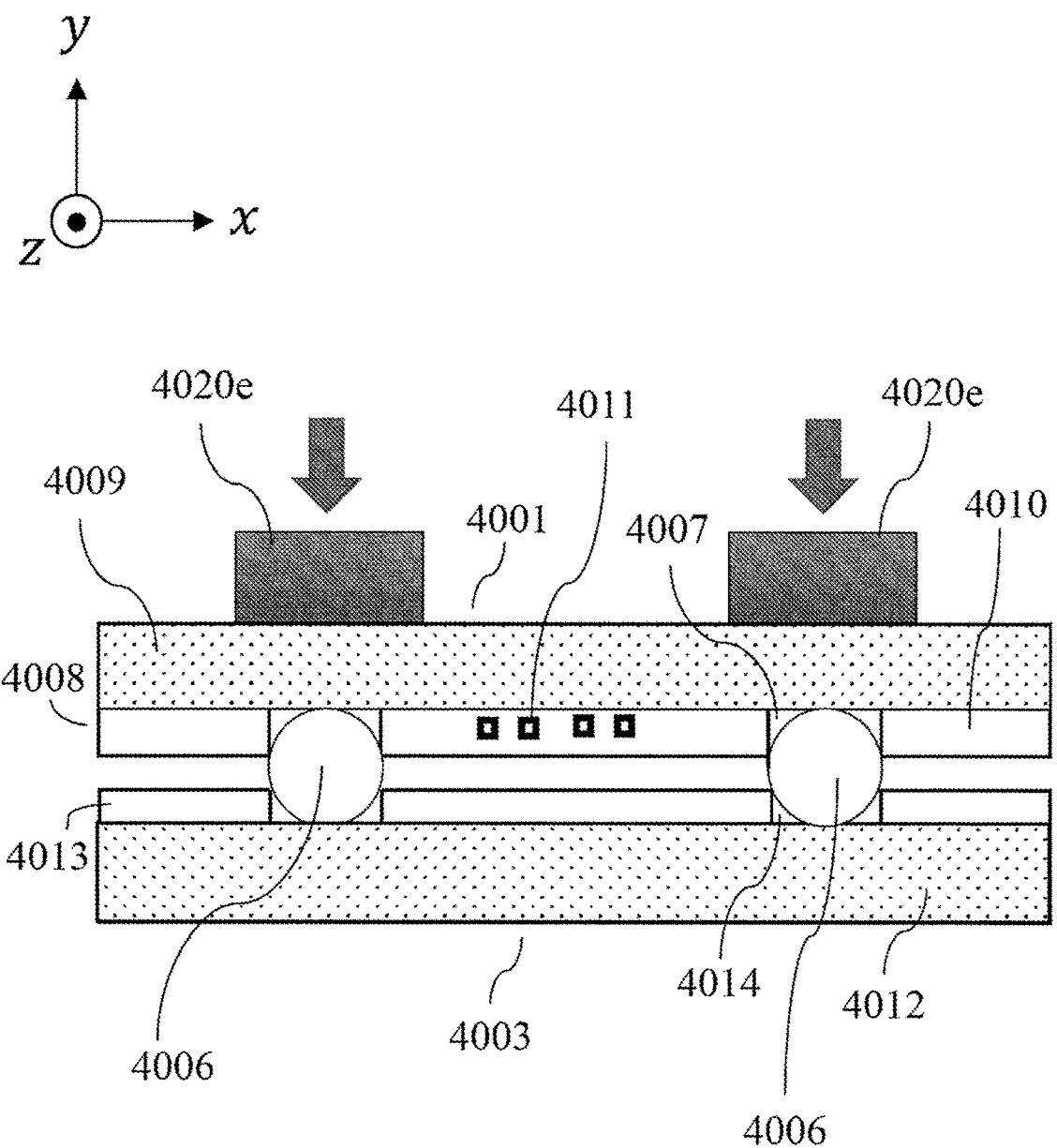
FIG. 31 is a sectional view showing the connection structure of the optical waveguide chips after providing pressing mechanisms according to the 18th embodiment of the present invention.

FIG. 31 is a sectional view showing the connection structure of the optical waveguide chips after providing the pressing mechanisms 4020e. In this example, the positions immediately above the spacer optical fibers 4006 (fitting grooves 4007 and 4014) are pressed, thereby obtaining the following effect. That is, in this embodiment, in both a case in which an optical waveguide layer 4008 has warping convex with respect to an Si substrate 4009 and a case in which the optical waveguide layer 4008 has concave warping, tangential contact between the fitting grooves 4007 and 4014 and the spacer optical fibers 4006 can be implemented by pressing of the pressing mechanisms 4020e, as in FIG. 24B, and a state in which the silica-based PLCs 4001 and 4002 float with respect to a silica-based base substrate 4003 can be solved. Accordingly, in this embodiment, a large effect of eliminating the shift of the core positions between the silica-based PLCs 4001 and 4002 and implementing low-loss connection is implemented.

In the 16th and 17th embodiments, positions that are not immediately above the spacer optical fibers 4006 (fitting grooves 4007 and 4014) are pressed. For this reason, excessive pressing leads to reverse warping of the silica-based PLCs 4001 and 4002 or degradation in optical characteristics because of a phenomenon similar to that in a case in which the center of a beam with fixed ends is pressed. Hence, it is necessary to appropriately set the pressing force.

On the other hand, in this embodiment, the load is directly applied to the spacer optical fibers 4006 and the fitting grooves 4007 and 4014. Since the spacer optical fibers 4006 intervene at portions where the load is applied, the above-described reverse warping of the silica-based PLCs 4001 and 4002 need not be feared, and pressing force setting is easy. In addition, since it is unnecessary to largely correct the warping of the silica-based PLCs 4001 and 4002, tangential contact between the fitting grooves 4007 and 4014 and the spacer optical fibers 4006 can be implemented by a relatively small force, and floating of the silica-based PLCs 4001 and 4002 can be prevented.

Furthermore, as in the 16th and 17th embodiments, if dust or the like exists between the fitting grooves 4007 and 4014 and the spacer optical fibers 4006, the dust can be moved. In this embodiment, since the load concentrated to the fitting grooves 4007 and 4014 and the spacer optical fibers 4006 is large, the effect of removing dust between the fitting grooves 4007 and 4014 and the spacer optical fibers 4006 is large, and the resistance against dust can be increased.

Furthermore, in this embodiment, since the pressing mechanisms 4020e are provided, it is also possible to obtain the effect of preventing resonance or disengagement of the connection portion, which occurs when a vibration or impact is applied to the silica-based PLCs 4001 and 4002, and maintaining a stable connection structure.

As the pressing mechanism 4020e, the form of the pressing mechanism 4020 using the weight may be employed, as in the 16th embodiment, or the form of the pressing mechanism 4020a or 4020b described with reference to FIG. 26A or 26B may be employed.

Note that in the 16th to 18th embodiments, the description has been made by exemplifying, as an optical waveguide chip, a planar lightwave circuit (PLC) of a thin glass film formed on a silicon substrate. However, the present invention can be applied to any optical waveguide chip including a waveguide mechanism. For example, as the material of the substrate or the optical waveguide, quartz, a polymer made of an organic substance, a semiconductor or a compound semiconductor waveguide using Si, silicon nitride (SiN), gallium arsenide, indium phosphide (InP), or the like, and a dielectric such as lithium niobate (LN), periodically poled lithium niobate (PPLN), or lithium tantalate (LT) can be used in addition to silica glass. These materials can similarly be applied to the following 19th embodiment.

19th Embodiment

Figure 32:
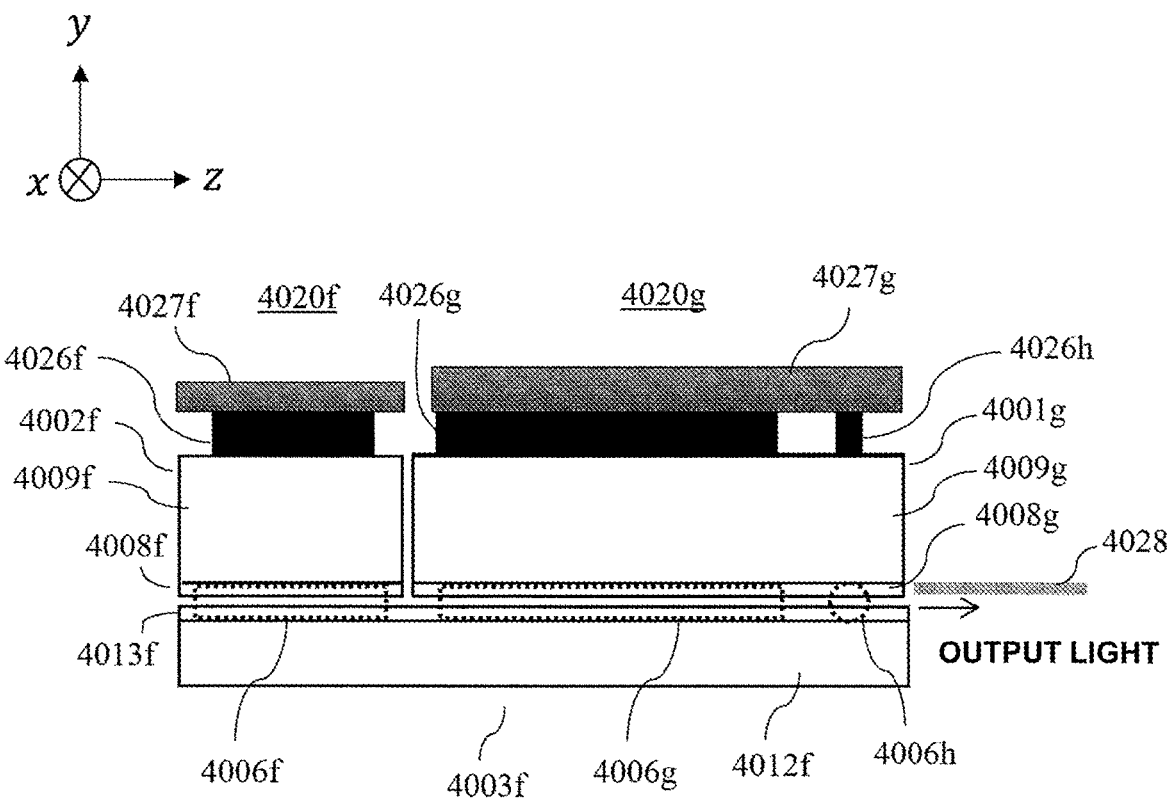
FIG. 32 is a side view showing a connection structure of optical waveguide chips according to the 19th embodiment of the present invention.
Figure 33A:
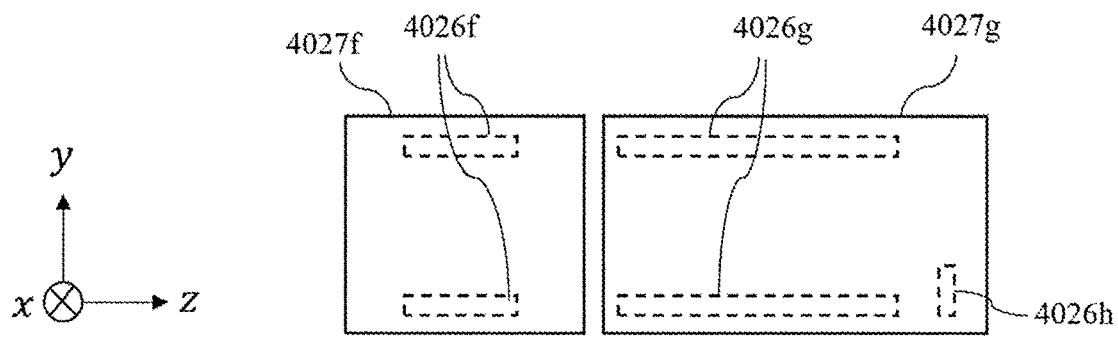
FIGS. 33A and 33B are a plan view of pressing mechanisms and a view showing the joint surfaces of optical waveguide chips and a base substrate according to the 19th embodiment of the present invention, respectively.
Figure 33B:
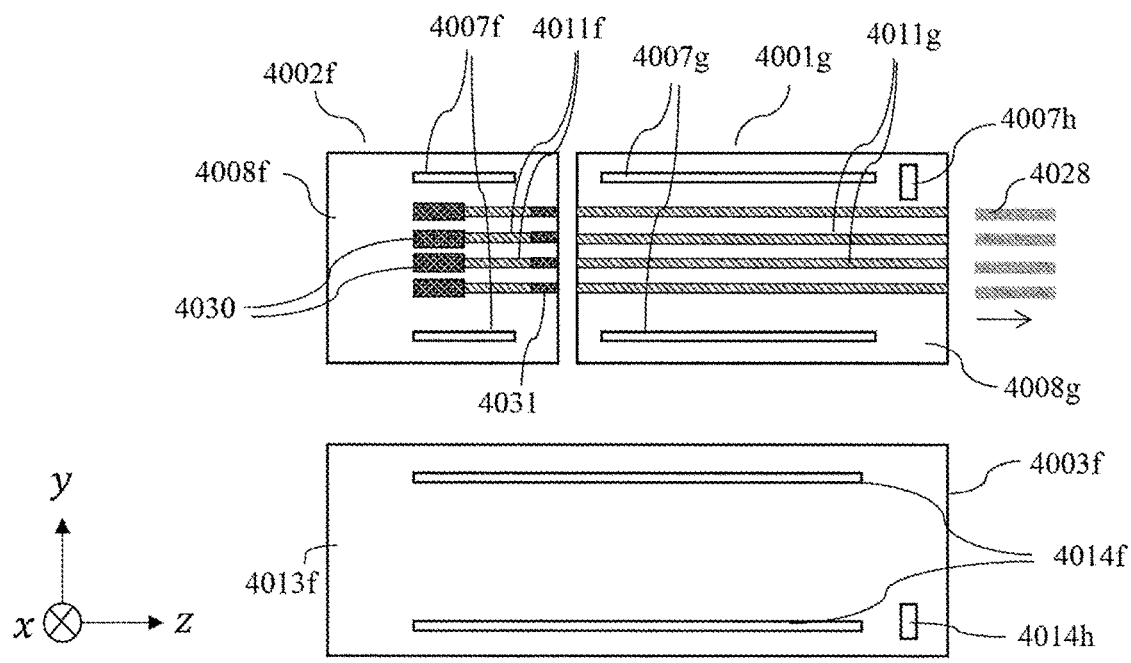
Figure 34:
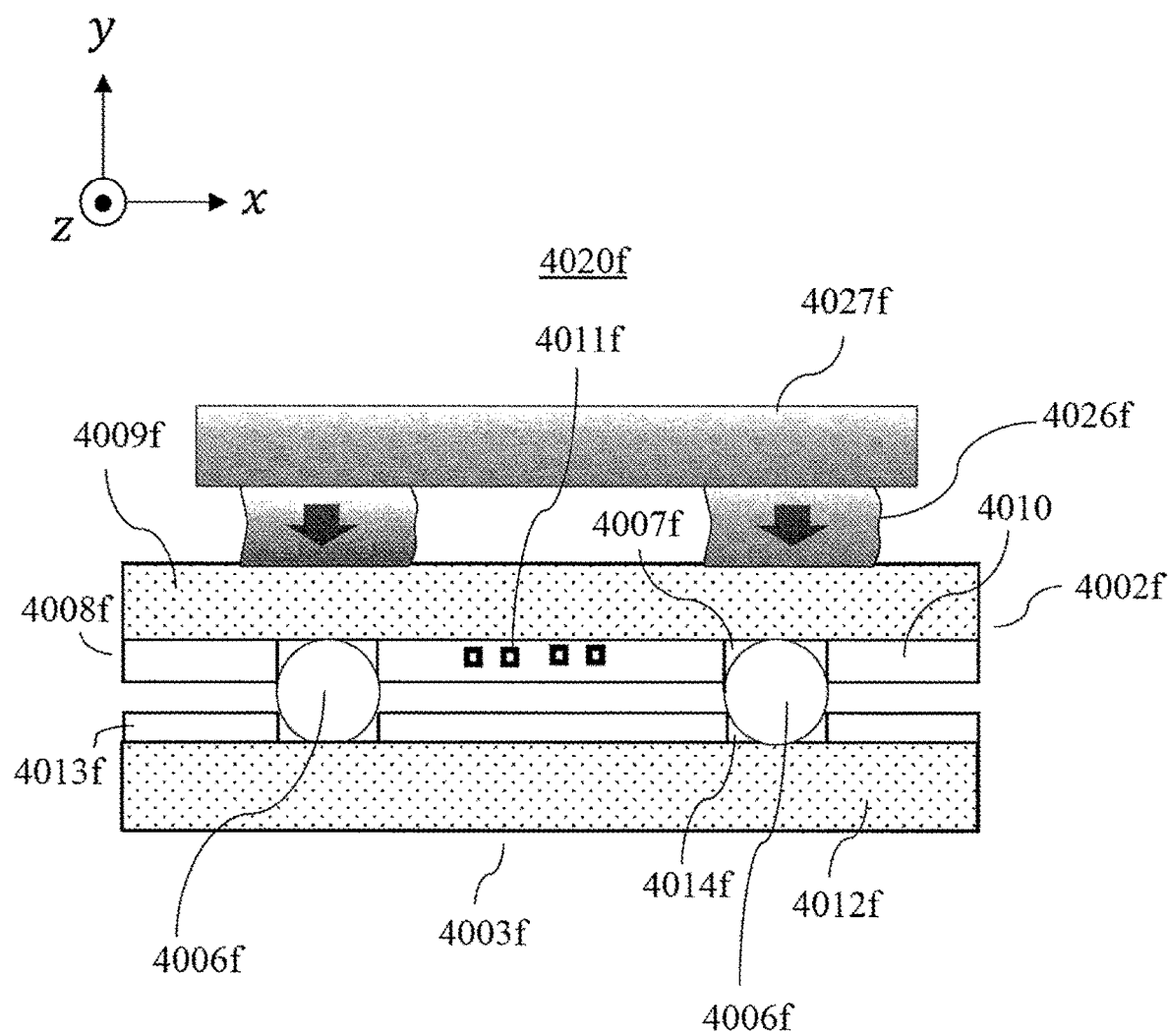
FIG. 34 is a sectional view showing a connection structure of optical waveguide chips after providing the pressing mechanism according to the 19th embodiment of the present invention.

The 19th embodiment of the present invention will be described next. FIG. 32 is a side view showing a connection structure of optical waveguide chips according to the 19th embodiment of the present invention, FIG. 33A is a plan view of pressing mechanisms according to this embodiment viewed from the upper side, FIG. 33B is a view showing the joint surfaces of optical waveguide chips and a base substrate, and FIG. 34 is a sectional view showing a connection structure of optical waveguide chips. This embodiment shows an example of a mounting form using the PPCP of a light-emitting element and a waveguide as another example of the present invention.

In this embodiment, an optical waveguide chip (laser waveguide chip) 4002f and an optical waveguide chip 4001g that transmits light from the optical waveguide chip 4002f to an optical fiber 4028 are mounted on a silica-based base substrate 4003f. As the optical waveguide chip 4002f, a DFB (Distributed Feedback) laser chip made of a III-V material such as InP is used. Other than a DFB laser, a DBR (Distributed Bragg Reflector) laser, an SOA (Semiconductor Optical Amplifier), or the like may be used. An electrical wire and a connection pad, which electrically connect a driver configured to drive the DFB laser, are not illustrated in the drawing.

Here, the optical waveguide chip 4002f includes an Si substrate 4009f, above-described DFB lasers 4030 formed on the Si substrate 4009f, and an optical waveguide layer 4008f. A structure in which fitting grooves 4007f are formed in the clad layer of the optical waveguide layer 4008f is the same as in the 16th embodiment. Cores 4011f configured to guide light beams from the DFB lasers 4030 are formed in the optical waveguide layer 4008f. Furthermore, spot size converters 4031 that make the diameter of the light beams from the DFB lasers 4030 close to the diameter of the cores 4011g in the optical waveguide layer 4008g of the optical waveguide chip 4001g are integrated near the connection end face of the optical waveguide layer 4008f to the optical waveguide chip 4001g.

The optical waveguide chip 4002f is mounted such that output light is connected to cores 4011g in the connection end face of the optical waveguide chip 4001g by the PPCP technique of the present invention.

The optical waveguide chip 4001g includes an Si substrate 4009g, and an optical waveguide layer 4008g formed on the Si substrate 4009g. The structure in which fitting grooves 4007g are formed in the clad layer of the optical waveguide layer 4008g is the same as in the 16th embodiment. In addition, one fitting groove 4007h whose longitudinal direction is perpendicular in the surface to the optical axis direction (Z direction) of light that enters from the optical waveguide chip 4002f to the optical waveguide chip 4001g is added in the clad layer of the optical waveguide layer 4008g.

Light propagated through the optical waveguide layer 4008g of the optical waveguide chip 4001g is output from an connection end face on the opposite side of the optical waveguide chip 4002f to each optical fiber 4028 via a lens (not shown) or directly output to each optical fiber 4028.

The base substrate 4003f according to this embodiment is made of Si, a ceramic such as LTCC (Low Temperature Co-fired Ceramics), aluminum nitride, or the like. In one of the manufacturing process of the base substrate 4003f and the post-process (etching or machining), fitting grooves 4014f to be fitted on spacer optical fibers 4006f and 4006g are formed. In addition, a fitting groove 4014h is formed in the base substrate 4003f at a position facing the fitting grooves 4007h of the optical waveguide chip 4001g.

When manufacturing the connection structure of the optical waveguide chips 4001g and 4002f, the spacer optical fibers 4006f are fitted in the fitting grooves 4014f on the side of the base substrate 4003f. Then, the spacer optical fibers 4006f fitted in the fitting grooves 4014f are fitted in the fitting grooves 4007f on the side of the optical waveguide chip 4002f such that the joint surface of the base substrate 4003f and the joint surface of the optical waveguide chip 4002f face each other, thereby mounting the optical waveguide chip 4002f on the base substrate 4003f.

Similarly, the spacer optical fibers 4006g are fitted in the fitting grooves 4014f on the side of the base substrate 4003f, and a spacer optical fiber 4006h is fitted in the fitting groove 4014h. The spacer optical fibers 4006g fitted in the fitting grooves 4014f are fitted in the fitting grooves 4007g on the side of the optical waveguide chip 4001g such that the joint surface of the base substrate 4003f and the joint surface of the optical waveguide chip 4001g face each other, and the spacer optical fibers 4006h fitted in the fitting groove 4014h is fitted in the fitting groove 4007h on the side of the optical waveguide chip 4001g, thereby mounting the optical waveguide chip 4001g on the base substrate 4003f. The positions of the two optical waveguide chips 4001g and 4002f can thus uniquely be decided.

In this embodiment, pressing mechanisms 4020f and 4020g are mounted on the optical waveguide chips 4002f and 4001g, respectively.

The pressing mechanism 4020f is formed by first pressing members 4026f made of an elastic resin and mounted on the optical waveguide chip 4002f such that the pressing positions are set immediately above the spacer optical fibers 4006f fitted in the fitting grooves 4007f, and a second pressing member 4027f mounted on the first pressing members 4026f and configured to press the first pressing members 4026f.

The pressing mechanism 4020g is formed by first pressing members 4026g and 4026h made of an elastic resin and mounted on the optical waveguide chip 4001g such that the pressing positions are set immediately above the spacer optical fibers 4006g and 4006h fitted in the fitting grooves 4007g and 4007h, and second pressing member 4027g mounted on the first pressing members 4026g and 4026h and configured to press the first pressing members 4026g and 4026h.

In this embodiment, the pressing mechanisms 4020f and 4020g are provided, thereby obtaining the following remarkable effect. That is, in this embodiment, in both a case in which the optical waveguide layers 4008f and 4008g have warping convex with respect to the Si substrates 4009f and 4009g and a case in which the optical waveguide layers 4008f and 4008g have concave warping, tangential contact between the fitting grooves 4007f, 4007g, 4007h, 4014f, and 4014h and the spacer optical fibers 4006f, 4006g, and 4006h can be implemented by pressing of the pressing mechanisms 4020f and 4020g, as in FIG. 24B, and a state in which the optical waveguide chips 4002f and 4001g float with respect to the base substrate 4003f can be solved. Accordingly, in this embodiment, a large effect of eliminating the shift of the core positions between the optical waveguide chips 4002f and 4001g and implementing low-loss connection is implemented.

Additionally, in the 18th embodiment, the pressing mechanisms 4020e are directly mounted at positions immediately above the spacer optical fibers 4006 fitted in the fitting grooves 4007. A setting needs to be done such that the pressing force of each of the plurality of pressing mechanisms 4020e mounted on one optical waveguide chip becomes constant.

On the other hand, as in this embodiment, when members of an elastic resin, for example, silicone rubber are used as the first pressing members 4026f, 4026g, and 4026h, and the common second pressing member 4027f that presses the plurality of first pressing members 4026f and the common second pressing member 4027g that presses the plurality of first pressing members 4026g and 4026h are used, the pressing mechanisms can be shared.

When the plurality of first pressing members 4026f made of the elastic resin are individually deformed by the load from the second pressing member 4027f in accordance with the presence/absence of dust or the warping or floating of the optical waveguide chip 4002f, an appropriate load is applied to each spacer optical fiber 4006f, as shown in FIG. 34, and the floating of the optical waveguide chip 4002f can be prevented more efficiently. Similarly, when the plurality of first pressing members 4026g and 4026h are individually deformed by the load from the second pressing member 4027g, an appropriate load is applied to each of the spacer optical fibers 4006g and 4006h, and the floating of the optical waveguide chip 4001g can be prevented.

Furthermore, as in the 16th to 18th embodiments, even if dust or the like exists between the fitting grooves 4007f, 4007g, 4007h, 4014f, and 4014h and the spacer optical fibers 4006f, 4006g, and 4006h, the dust can be moved. In this embodiment, since the load concentrated to the fitting grooves 4007f, 4007g, 4007h, 4014f, and 4014h and the spacer optical fibers 4006f, 4006g, and 4006h is large, the effect of removing dust between the fitting grooves 4007f, 4007g, 4007h, 4014f, and 4014h and the spacer optical fibers 4006f, 4006g, and 4006h is large, and the resistance against dust can be increased.

Furthermore, in this embodiment, since the pressing mechanisms 4020f and 4020g are provided, it is also possible to obtain the effect of preventing resonance or disengagement of the connection portion, which occurs when a vibration or impact is applied to the optical waveguide chips 4002f and 4001g, and maintaining a stable connection structure.

As the second pressing members 4027f and 4027g, the form of the pressing mechanism 4020 using the weight may be employed, as in the 16th embodiment, or the form of the pressing mechanism 4020a or 4020b described with reference to FIG. 26A or 26B may be employed.

In the 16th to 19th embodiments, an example of only simple waveguide connection is shown. However, an arbitrary optical function structure may be integrated. For example, a switch function, a wavelength multiplexing/demultiplexing function, a polarization integration function, a Mach-Zehnder interference circuit, a ring resonator, a phase adjustment circuit, or the like may be provided. Alternatively, a laser including a waveguide mechanism, a photodiode, or the like may be provided. In addition, a waveguide with a large nonlinear effect may be used.

In the 16th to 19th embodiments, as for the fitting grooves 4007 and 4007f to 4007h, two or more fitting grooves suffice per optical waveguide chip. The fitting grooves 4014, 4014f, or 4014h formed in the silica-based base substrate 4003 or 4003f need only be provided in number according to the fitting grooves 4007 and 4007f to 4007h. As for the spacer optical fibers 4006 and 4006f to 4006h, the spacer optical fibers need only be provided in number according to the fitting grooves 4007, 4007f to 4007h, 4014, 4014f, and 4014h.

In the 16th to 19th embodiments, the height of the spacer optical fibers 4006 and 4006f to 4006h is preferably larger than the sum of the depth of the fitting grooves 4014, 4014f, and 4014h on the base substrate side and the depth of the fitting grooves 4007 and 4007f to 4007h on the optical waveguide chip side. This can provide a gap between the base substrate and the optical waveguide chip.

In the 16th 19th embodiments, an example in which the fitting grooves 4007, 4007f to 4007h, 4014, 4014f, and 4014h are grooves each having a rectangular section has been described. However, grooves whose groove widths become narrow toward the substrates 4009, 4009f, 4009g, 4012, and 4012f, for example, grooves each having a V-shaped or W-shaped section or grooves each having a U-shaped section may be used.

In the 16th to 19th embodiments, the planar shapes of the fitting grooves 4007, 4007f to 4007h, 4014, 4014f, and 4014h viewed from the upper side are rectangular shapes. However, if the same effect can be obtained, the planar shape may be an arbitrary shape such as a round, polygonal, or elliptical shape. That is, the fitting grooves 4007, 4007f to 4007h, 4014, 4014f, and 4014h may change the widths along the longitudinal direction.

Additionally, in the 16th to 19th embodiments, the cylindrical spacer optical fibers 4006 and 4006f to 4006h are used as spacer members. However, the present invention is not limited to this. The material of the spacer member can be an arbitrary material such as an inorganic substance such as glass, a metal, or a polymer. In addition, the shape is not limited as long as it can appropriately be fitted in one of the fitting grooves 4007, 4007f to 4007h, 4014, 4014f, and 4014h. That is, the spacer member may have a cylindrical shape, a parallelopiped shape, a spherical shape, or a similar shape.

In addition, if the height of the spacer member changes when it is fitted in the fitting groove, the optical waveguide chip may tilt with respect to the base substrate. Hence, the material, dimensions, and shape of the spacer member are preferably set such that the height of the spacer member is difficult to change when it is fitted in the fitting groove and pressed from above.

INDUSTRIAL APPLICABILITY

The present invention can be applied to a technique of connecting optical waveguide chips. Explanation of the Reference Numerals and Signs 11, 11b, 12, 12b . . . connection end face, 13-17 . . . notch, 108, 208, 308, 316, 408, 418, 508, 518, 608, 618 . . . warping relaxing groove, 317, 318, 626 . . . filling material, 2001, 2001a-2001c, 2002, 2002a-2002c, 2017-2019, 2017a-2019a, 3001a-3001d, 3002a-3002d, 3016, 3017, 101, 102, 201, 202, 301, 401-403, 501-503, 601-603, 4001, 4002 . . . silica-based PLC, 2003, 2003a-2003c, 3003, 3003c, 3003d, 103, 203, 303, 4003, 4003f . . . base substrate, 2006, 2006a, 2016, 3006, 106, 206, 306, 406, 506, 606, 4006, 4006f-4006h . . . spacer optical fiber, 2007, 2007a, 2013, 2013a, 2014, 2015, 3007, 3007c, 3007d, 3013, 3013c, 3013d, 107, 115, 207, 215, 307, 315, 407, 417, 507, 517, 607, 617, 4007, 4007f-4007h, 4014, 4014f, 4014h . . . fitting groove, 2008, 2024, 3008, 109, 209, 309, 409, 415, 509, 515, 609, 615, 4008, 4008f, 4008g . . . optical waveguide layer, 2009, 3009, 4009, 4009f, 4009g, 4012, 4012f . . . Si substrate, 2010, 111, 211, 311, 411, 414, 511, 514, 611, 614, 4010 . . . clad layer, 2011, 3011, 112, 212, 312, 412, 416, 512, 516, 612, 4011, 4011f, 4011g . . . core, 2012, 3012, 114, 214, 314, 4013, 4013f . . . glass layer, 2020, 2021 . . . optical waveguide chip, 2022 . . . optical fiber, 2023 . . . DFB laser, 2025 . . . spot size converter, 2026 . . . base substrate, 3014, 3015, 3018, 3019 . . . pitch conversion portion, 4020, 4020a-4020g . . . pressing mechanism, 4022 . . . fixed member, 4023 . . . screw, 4024, 4026f, 4026g, 4026h, 4027f, 4027g . . . pressing member, 4025 . . . spring mechanism.

The invention claimed is:

1. A connection structure of optical waveguide chips, comprising:
 a base substrate in which a plurality of first grooves are formed;
 a plurality of first spacer members respectively fitted in the plurality of first grooves while partially projecting from the base substrate; and
 a plurality of optical waveguide chips in each of which an optical waveguide layer is formed on a substrate, and second grooves fitted on the projecting portions of the first spacer members are formed at positions of the optical waveguide layer facing the first grooves, and each of which is mounted on the base substrate while being supported by the first spacer members,
 wherein the plurality of optical waveguide chips are mounted on the base substrate such that incident/exit end faces of optical waveguide layers of two adjacent optical waveguide chips face each other,
 wherein each optical waveguide chip includes at least two second grooves formed in a surface of the optical waveguide layer facing the base substrate such that one of an optical axis direction of light that enters from another adjacent optical waveguide chip and an optical axis direction of light that exits to the other optical waveguide chip becomes a longitudinal direction,
 the base substrate includes at least two first grooves formed in a surface facing the plurality of optical waveguide chips such that the first grooves correspond to the at least two second grooves, respectively, and each of the first grooves and the second grooves is fitted on a first spaces member at a central portion, and width becomes wider than the first spacer member as a point separates from the central portion along the longitudinal direction.

2. The connection structure of the optical waveguide chips according to claim 1, wherein the second grooves formed in the optical waveguide layer of the optical waveguide chip are formed up to a depth at which the substrate of the optical waveguide hip is exposed, and the first spacer members fitted in the second grooves come into contact with the substrate of the optical waveguide chip.

3. The connection structure of the optical waveguide chips according to claim 1, wherein a height of the first spacer members is higher than a sum of a depth of the first grooves and a depth of the second grooves.

4. The connection structure of the optical waveguide chips according to claim 1, wherein each of two adjacent optical waveguide chips further comprises a pitch conversion portion configured to make an interval between cores in the incident/exit end face of an optical waveguide array formed in the optical waveguide layer narrower than an interval between cores in a portion far apart from the incident/exit end face.

5. The connection structure of the optical waveguide chips according to claim 4, wherein each optical waveguide chip has a shape with a notch in at least one of corner portions of the incident/exit end face facing the other adjacent optical waveguide chip.

6. The connection structure of the optical waveguide chips according to claim 1, wherein a planar shape of each of both-side ends of the first grooves and the second grooves in the longitudinal direction is such a shape that a distance from a groove center is substantially constant, and a distance between the both-side ends is set such that the both-side ends of the first grooves and the second grooves when fitted on the first spacer members come into contact with both-side ends of the first spacer members in the longitudinal direction.

* * * * *